US012632663B1

(12) United States Patent (10) Patent No.: US 12,632,663 B1

Galvin (45) Date of Patent: May 19, 2026

(54) PERSISTENT COGNITIVE MACHINE WITH AN ADVANCED DISTRIBUTED THOUGHT CACHE

(71) Applicant: AtomBeam Technologies Inc., Moraga, CA (US)

(72) Inventor: Brian Galvin, Silverdale, WA (US)

(73) Assignee: ATOMBEAM TECHNOLOGIES INC., Moraga, CA (US)

( * ) Notice: Subject to any disclaimer, the term of this patent is extended or adjusted under 35 U.S.C. 154(b) by 0 days.

(21) Appl. No.: 19/328,094

(22) Filed: Sep. 12, 2025

Related U.S. Application Data

(63) Continuation-in-part of application No. 19/321,173, filed on Sep. 6, 2025, which is a continuation-in-part (Continued)

(51) Int. Cl.
 *G06F 40/30* (2020.01)
 *G06F 16/332* (2019.01)
 (Continued)

(52) U.S. Cl.
 CPC .......... *G06F 40/30* (2020.01); *G06F 16/3325* (2019.01); *G06F 16/3329* (2019.01)

(58) Field of Classification Search
 CPC .... G06F 40/211; G06F 40/253; G06F 40/268; G06F 40/284; G06F 40/30; G06F 16/3329; G06F 16/3325; G06N 3/08
 See application file for complete search history.

(56) References Cited

U.S. PATENT DOCUMENTS

| | | | |
|---|---|---|---|
| 10,083,009 B2 * | 9/2018 | Gabel | G06F 40/284 |
| 11,037,531 B2 * | 6/2021 | Kaplanyan | G06F 3/147 |

(Continued)

FOREIGN PATENT DOCUMENTS

| | | | | |
|---|---|---|---|---|
| AU | 2021105030 A4 * | 6/2022 | ............ | G06F 40/30 |
| CN | 112732939 A * | 4/2021 | ............ | G06N 5/04 |

(Continued)

OTHER PUBLICATIONS

Sanchez-Karhunen et al, title={Interpretation of the intent detection problem as dynamics in a low-dimensional space}, journal={arXiv preprint arXiv:2408.02838}, year={2024}, pp. 1-8 (Year: 2024).*

(Continued)

*Primary Examiner* — Lamont M Spooner
(74) *Attorney, Agent, or Firm* — GALVIN PATENT LAW LLC; Brian R. Galvin; Alec L. Perry

(57) ABSTRACT

A system and method for implementing persistent cognitive computation through geometric representation of thought in a dynamic latent manifold. The system encodes inputs into a curved space characterized by time-evolving metric tensors, compression pressure fields derived from Ricci curvature, and goal potential fields that shape attention flow. Cognition occurs through geodesic traversal of this manifold, with attention following paths that minimize cognitive action while balancing semantic density and goal relevance. A Cognitive Dynamics Engine maintains manifold geometry, computing optimal trajectories and managing thought bundle operations including consolidation, expansion, and higher-order abstraction. During idle periods, autonomous dreaming processes reorganize the manifold through perturbation, recombination, and topological surgery. This architecture enables persistent memory through geometric encoding, where frequently accessed concepts develop high-curvature regions and cognitive shortcuts emerge from usage patterns, transforming artificial intelligence from stateless computation to structured motion through shaped memory space.

12 Claims, 21 Drawing Sheets

Related U.S. Application Data of application No. 19/284,115, filed on Jul. 29, 2025, which is a continuation of application No. 19/051, 193, filed on Feb. 12, 2025, now Pat. No. 12,387,050.

(60) Provisional application No. 63/847,082, filed on Jul. 19, 2025, provisional application No. 63/847,096, filed on Jul. 19, 2025, provisional application No. 63/847,091, filed on Jul. 19, 2025, provisional application No. 63/847,101, filed on Jul. 19, 2025.

(51) Int. Cl.
  *G06F 16/3329*  (2025.01)
  *G06N 3/08*  (2023.01)

(56) References Cited

U.S. PATENT DOCUMENTS

| | | | | |
|---|---|---|---|---|
| 11,234,006 | B2 * | 1/2022 | Wang | G06T 3/4053 |
| 11,436,246 | B2 * | 9/2022 | Lee | G16H 10/20 |
| 11,973,724 | B2 * | 4/2024 | Sundaravadivel | G06F 40/30 |
| 12,223,456 | B1 * | 2/2025 | Manohar | G06F 40/30 |
| 2002/0091801 | A1 * | 7/2002 | Lewin | H04L 63/08 |
| | | | | 709/219 |
| 2014/0005986 | A1 * | 1/2014 | Aish | G06F 30/13 |
| | | | | 703/1 |
| 2018/0018557 | A1 * | 1/2018 | Esser | G06N 3/049 |
| 2018/0174055 | A1 * | 6/2018 | Tirumale | H04L 51/04 |
| 2019/0174514 | A1 * | 6/2019 | Ramesh | G06Q 10/02 |
| 2019/0179896 | A1 * | 6/2019 | Anisimovich | G06N 3/084 |
| 2019/0325342 | A1 * | 10/2019 | Sikka | G06N 3/08 |
| 2020/0034914 | A1 * | 1/2020 | Boss | G06Q 30/0633 |
| 2020/0073983 | A1 * | 3/2020 | Sen | G06F 16/243 |
| 2020/0285704 | A1 * | 9/2020 | Rajani | G06N 3/09 |
| 2020/0336562 | A1 * | 10/2020 | Luft | H04L 67/2885 |
| 2020/0351344 | A1 * | 11/2020 | Das Gupta | H04L 41/16 |
| 2021/0027862 | A1 * | 1/2021 | Wei | G06N 20/00 |
| 2021/0073808 | A1 * | 3/2021 | Gu | G06Q 20/3221 |
| 2021/0406224 | A1 * | 12/2021 | Neufeld | G06F 16/1873 |
| 2022/0138156 | A1 * | 5/2022 | Wang | H04L 67/568 |
| | | | | 707/740 |
| 2022/0318831 | A1 * | 10/2022 | Marvaniya | G06N 5/022 |
| 2023/0142467 | A1 * | 5/2023 | Kaplanyan | G06T 1/20 |
| | | | | 345/592 |
| 2023/0177281 | A1 * | 6/2023 | Kamath | G06N 3/091 |
| | | | | 704/2 |
| 2023/0229722 | A1 * | 7/2023 | Ishii | G06F 40/20 |
| | | | | 345/419 |
| 2023/0316006 | A1 * | 10/2023 | Tunstall-Pedoe | G06N 3/0442 |
| | | | | 704/9 |
| 2024/0036599 | A1 * | 2/2024 | Bowen | G06N 3/0675 |
| 2024/0046318 | A1 * | 2/2024 | Muriqi | G06Q 30/0277 |
| 2024/0104391 | A1 * | 3/2024 | Higgins | G06F 16/3329 |
| 2024/0126811 | A1 * | 4/2024 | Law | G06F 16/9024 |
| 2024/0160955 | A1 * | 5/2024 | Zhao | G06F 16/3329 |
| 2024/0256965 | A1 * | 8/2024 | Chung | G06N 20/00 |
| 2024/0354320 | A1 * | 10/2024 | Procter | G06F 40/103 |
| 2024/0386015 | A1 * | 11/2024 | Crabtree | G06F 16/9024 |
| 2024/0406166 | A1 * | 12/2024 | Bell | G06N 3/045 |
| 2024/0411809 | A1 * | 12/2024 | Najafirad | G06F 16/7837 |
| 2024/0428008 | A1 * | 12/2024 | Abraham | G06F 40/35 |
| 2025/0028882 | A1 * | 1/2025 | Ataei | G06F 30/12 |
| 2025/0094455 | A1 * | 3/2025 | Bista | G06F 16/3329 |
| 2025/0148203 | A1 * | 5/2025 | Pan | G10L 15/26 |
| 2025/0156633 | A1 * | 5/2025 | Auchar | G06N 3/084 |
| 2025/0165718 | A1 * | 5/2025 | Seo | G06F 40/30 |
| 2025/0165865 | A1 * | 5/2025 | Ardis | G06N 5/045 |
| 2025/0191369 | A1 * | 6/2025 | Huang | G06F 40/284 |
| 2025/0232322 | A1 * | 7/2025 | Batts | G06Q 30/0201 |
| 2025/0259043 | A1 * | 8/2025 | Crabtree | G06N 3/047 |
| 2025/0259085 | A1 * | 8/2025 | Crabtree | G06N 5/043 |
| 2025/0259724 | A1 * | 8/2025 | Crabtree | G16H 50/50 |
| 2025/0306680 | A1 * | 10/2025 | Zhou | G06F 3/015 |
| 2025/0363593 | A1 * | 11/2025 | Li | G06F 40/30 |
| 2025/0371354 | A1 * | 12/2025 | Kamkari | G06N 3/088 |
| 2025/0378385 | A1 * | 12/2025 | Koh | G06N 3/006 |
| 2025/0390352 | A1 * | 12/2025 | Crabtree | G06F 9/5027 |
| 2026/0023955 | A1 * | 1/2026 | Fortkort | G06N 3/0455 |
| 2026/0044212 | A1 * | 2/2026 | Zhou | G06F 3/015 |
| 2026/0046317 | A1 * | 2/2026 | Crabtree | H04L 63/20 |

FOREIGN PATENT DOCUMENTS

| | | | | | |
|---|---|---|---|---|---|
| CN | 112905807 | A | * | 6/2021 | G06N 20/00 |
| CN | 113297395 | B | * | 9/2021 | G06F 40/30 |
| CN | 114860884 | A | * | 8/2022 | G06N 5/02 |
| CN | 118673207 | A | * | 9/2024 | G06N 3/084 |
| CN | 119885510 | A | * | 4/2025 | G06N 3/08 |
| CN | 116311503 | B | * | 12/2025 | G06N 3/084 |
| WO | WO-2025124458 | A1 | * | 6/2025 | G06F 40/30 |

OTHER PUBLICATIONS

Sarfati et al.Sarfati et al., title={Lines of thought in large language models}, journal={arXiv preprint arXiv:2410.01545}, year={2024}, pp. 1-20 (Year: 2024).*

Kiihnel et al., title={Latent space non-linear statistics}, journal={arXiv preprint arXiv:1805.07632}, 2018, pp. 1-9 (Year: 2018).*

Marin, title={Optimizing AI Reasoning: A Hamiltonian Dynamics Approach to Multi-Hop Question Answering}, journal={Authorea Preprints}, Jan. 2025}, publisher={Authorea}, pp. 1-23 (Year: 2025).*

Gao, Hang & Zhang, Yongfeng; "Memory Sharing for Large Language Model Based Agents", arXiv:2404.09982v2, Jul. 5, 2024.

Gim, In, et al; "Prompt Cache: Modular Attention Reuse for Low-Latency Inference", arXiv:2311.04934v2, Apr. 2024.

Ramirez, Guillem, et al; "Cache & Distil: Optimising API Calls to Large Language Models", arXiv:2310.13561v1, Oct. 20, 2023.

Schroeder, Luis Gaspar; "VectorQ: Advanced Semantic Prompt Caching with Dynamic Thresholds and Performance-Based Clustering", Technical University of Munich, Nov. 26, 2024.

* cited by examiner

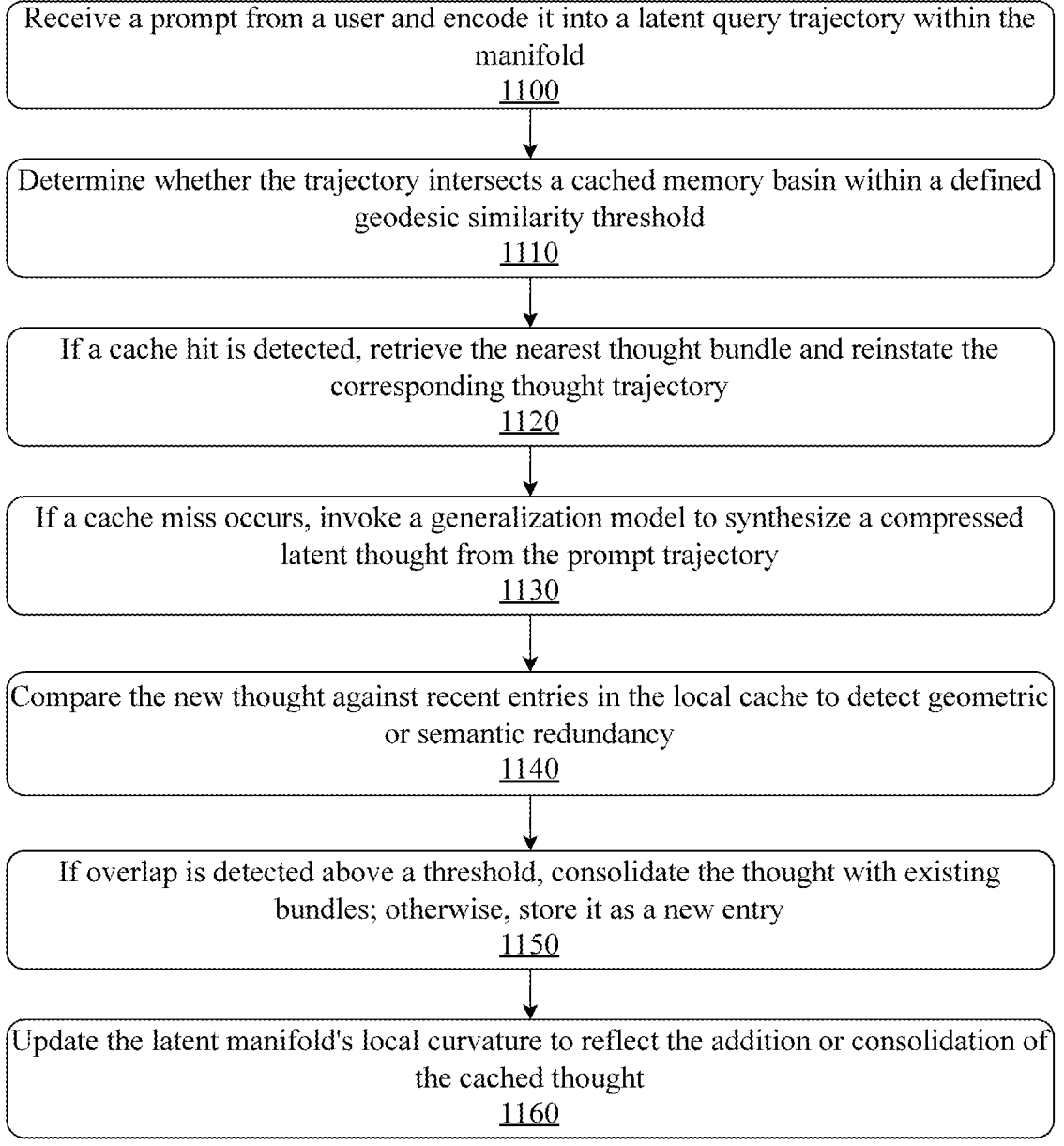

Receive a prompt from a user and encode it into a latent query trajectory within the manifold
1100

Determine whether the trajectory intersects a cached memory basin within a defined geodesic similarity threshold
1110

If a cache hit is detected, retrieve the nearest thought bundle and reinstate the corresponding thought trajectory
1120

If a cache miss occurs, invoke a generalization model to synthesize a compressed latent thought from the prompt trajectory
1130

Compare the new thought against recent entries in the local cache to detect geometric or semantic redundancy
1140

If overlap is detected above a threshold, consolidate the thought with existing bundles; otherwise, store it as a new entry
1150

Update the latent manifold's local curvature to reflect the addition or consolidation of the cached thought
1160

FIG. 11

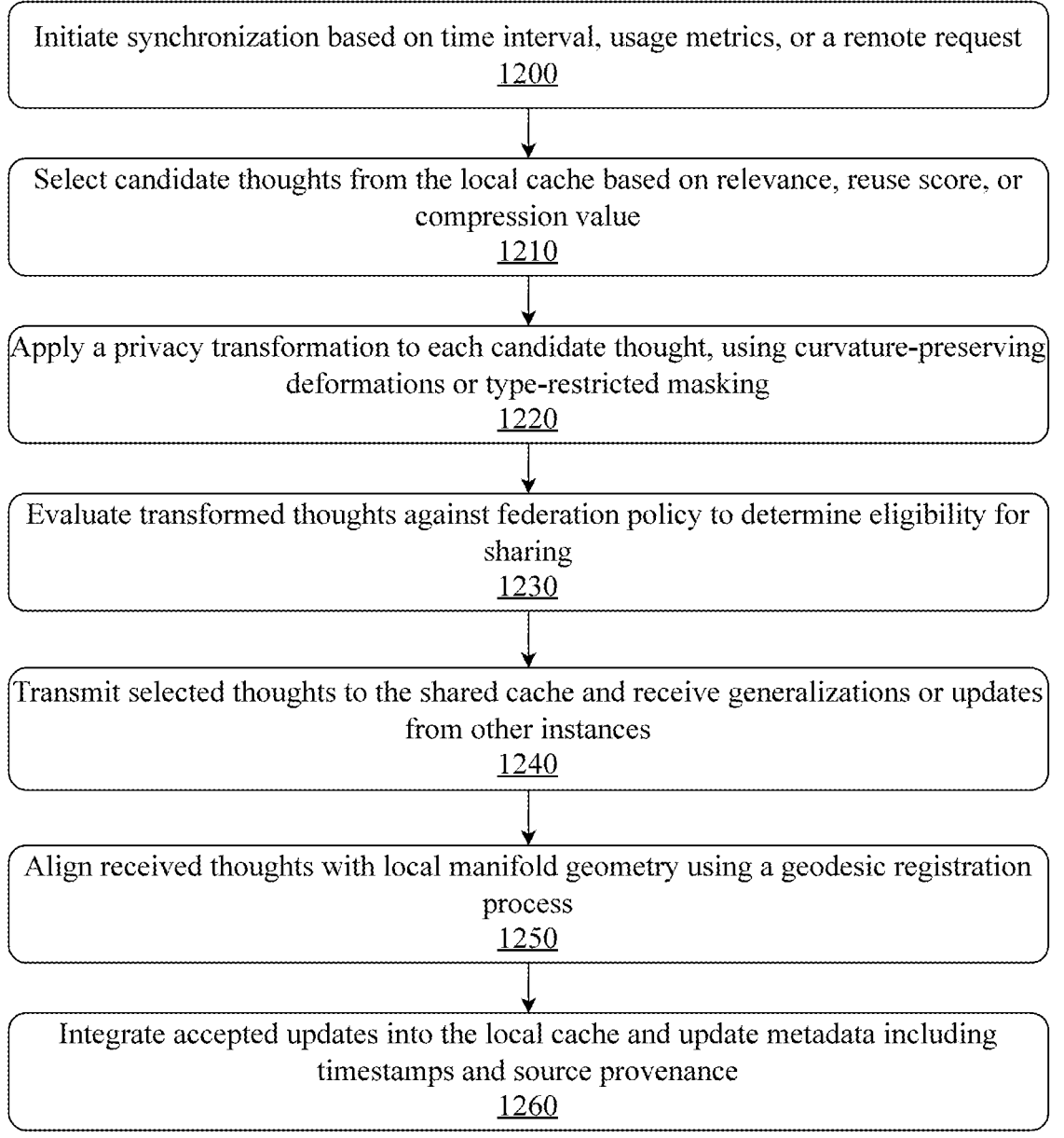

Initiate synchronization based on time interval, usage metrics, or a remote request
1200

Select candidate thoughts from the local cache based on relevance, reuse score, or compression value
1210

Apply a privacy transformation to each candidate thought, using curvature-preserving deformations or type-restricted masking
1220

Evaluate transformed thoughts against federation policy to determine eligibility for sharing
1230

Transmit selected thoughts to the shared cache and receive generalizations or updates from other instances
1240

Align received thoughts with local manifold geometry using a geodesic registration process
1250

Integrate accepted updates into the local cache and update metadata including timestamps and source provenance
1260

FIG. 12

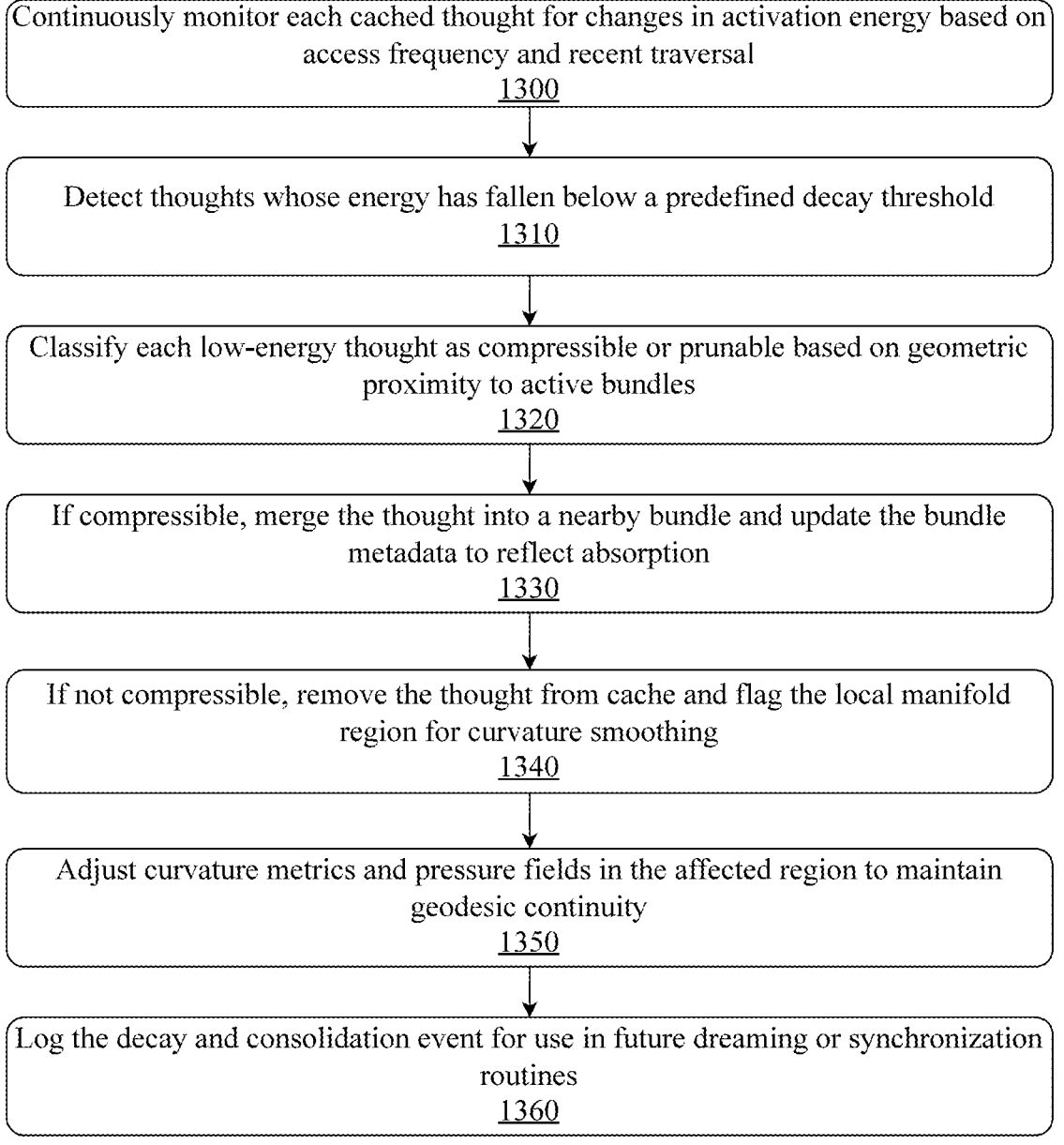

Continuously monitor each cached thought for changes in activation energy based on access frequency and recent traversal
1300

Detect thoughts whose energy has fallen below a predefined decay threshold
1310

Classify each low-energy thought as compressible or prunable based on geometric proximity to active bundles
1320

If compressible, merge the thought into a nearby bundle and update the bundle metadata to reflect absorption
1330

If not compressible, remove the thought from cache and flag the local manifold region for curvature smoothing
1340

Adjust curvature metrics and pressure fields in the affected region to maintain geodesic continuity
1350

Log the decay and consolidation event for use in future dreaming or synchronization routines
1360

FIG. 13

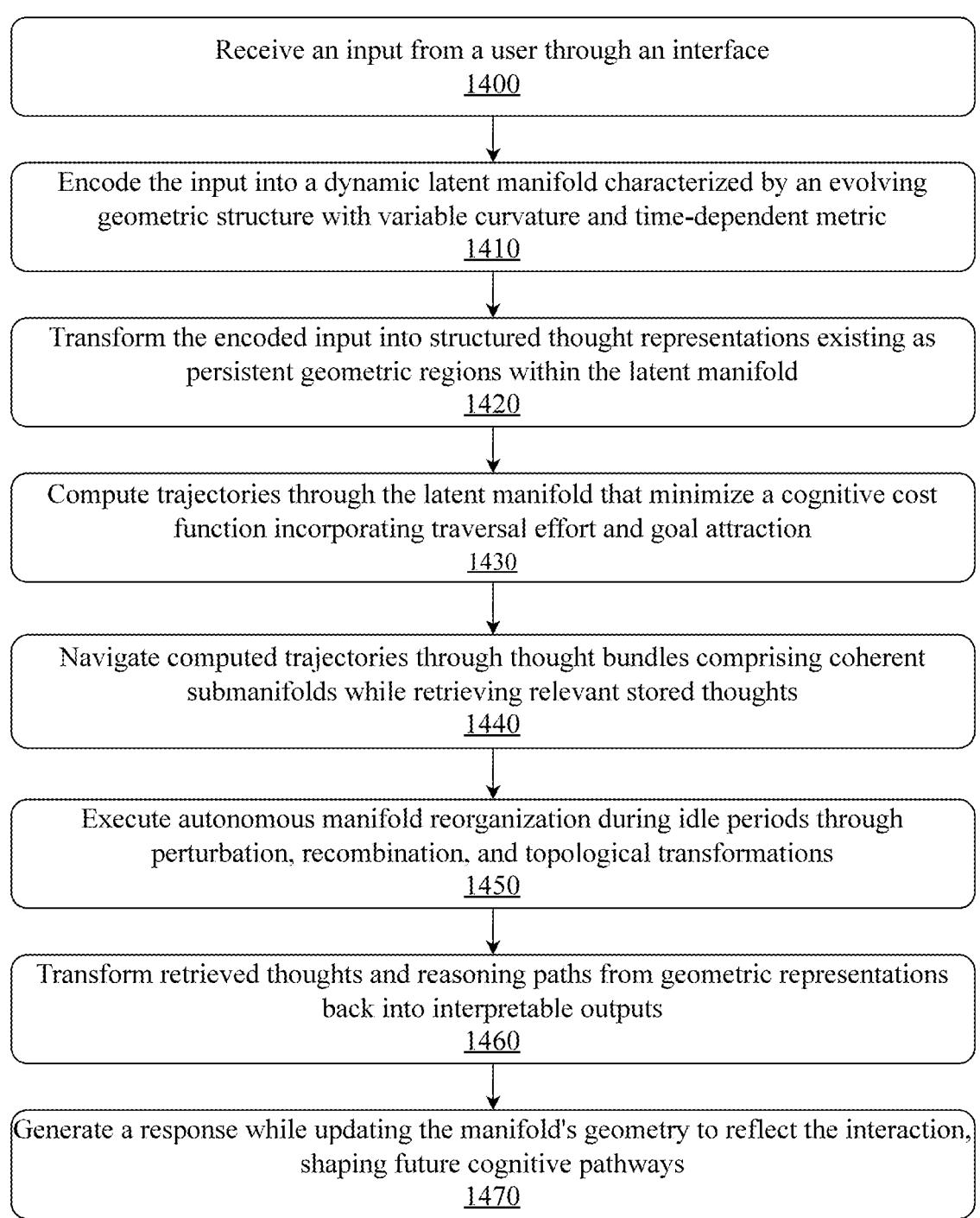

Receive an input from a user through an interface
1400

Encode the input into a dynamic latent manifold characterized by an evolving
geometric structure with variable curvature and time-dependent metric
1410

Transform the encoded input into structured thought representations existing as
persistent geometric regions within the latent manifold
1420

Compute trajectories through the latent manifold that minimize a cognitive cost
function incorporating traversal effort and goal attraction
1430

Navigate computed trajectories through thought bundles comprising coherent
submanifolds while retrieving relevant stored thoughts
1440

Execute autonomous manifold reorganization during idle periods through
perturbation, recombination, and topological transformations
1450

Transform retrieved thoughts and reasoning paths from geometric representations
back into interpretable outputs
1460

Generate a response while updating the manifold's geometry to reflect the interaction,
shaping future cognitive pathways
1470

FIG. 14

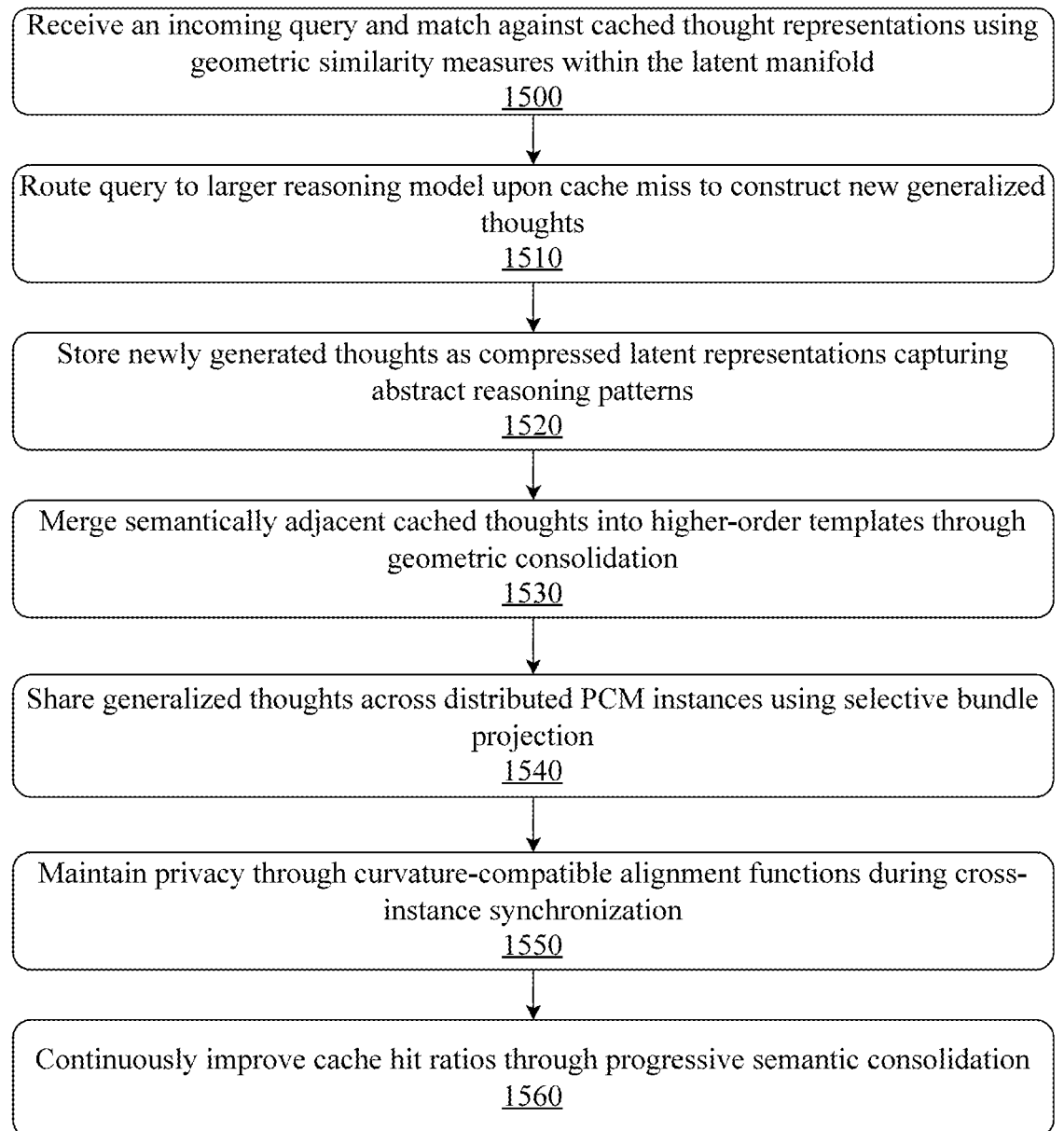

Receive an incoming query and match against cached thought representations using geometric similarity measures within the latent manifold
1500

Route query to larger reasoning model upon cache miss to construct new generalized thoughts
1510

Store newly generated thoughts as compressed latent representations capturing abstract reasoning patterns
1520

Merge semantically adjacent cached thoughts into higher-order templates through geometric consolidation
1530

Share generalized thoughts across distributed PCM instances using selective bundle projection
1540

Maintain privacy through curvature-compatible alignment functions during cross-instance synchronization
1550

Continuously improve cache hit ratios through progressive semantic consolidation
1560

FIG. 15

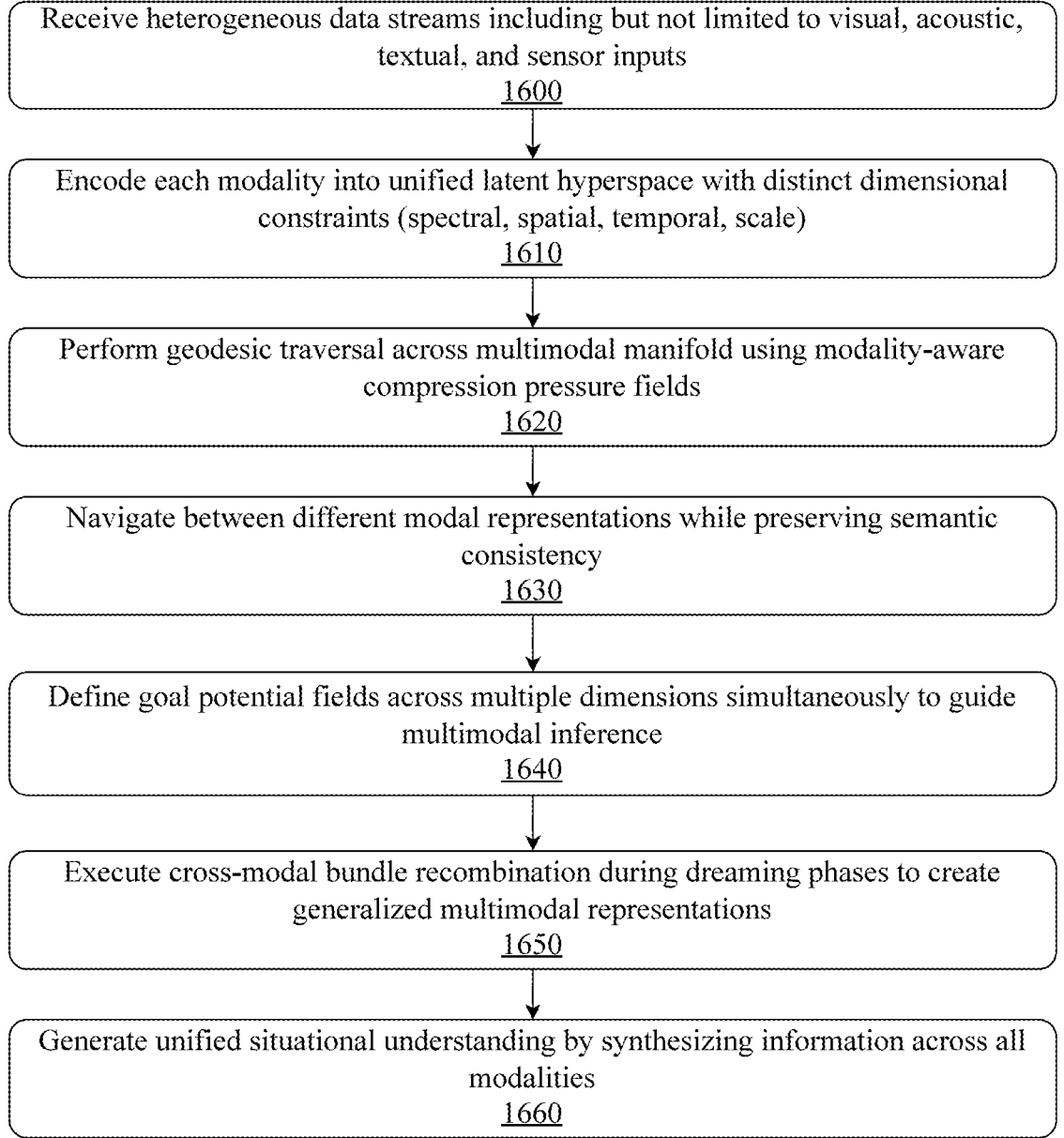

Receive heterogeneous data streams including but not limited to visual, acoustic, textual, and sensor inputs
1600

Encode each modality into unified latent hyperspace with distinct dimensional constraints (spectral, spatial, temporal, scale)
1610

Perform geodesic traversal across multimodal manifold using modality-aware compression pressure fields
1620

Navigate between different modal representations while preserving semantic consistency
1630

Define goal potential fields across multiple dimensions simultaneously to guide multimodal inference
1640

Execute cross-modal bundle recombination during dreaming phases to create generalized multimodal representations
1650

Generate unified situational understanding by synthesizing information across all modalities
1660

FIG. 16

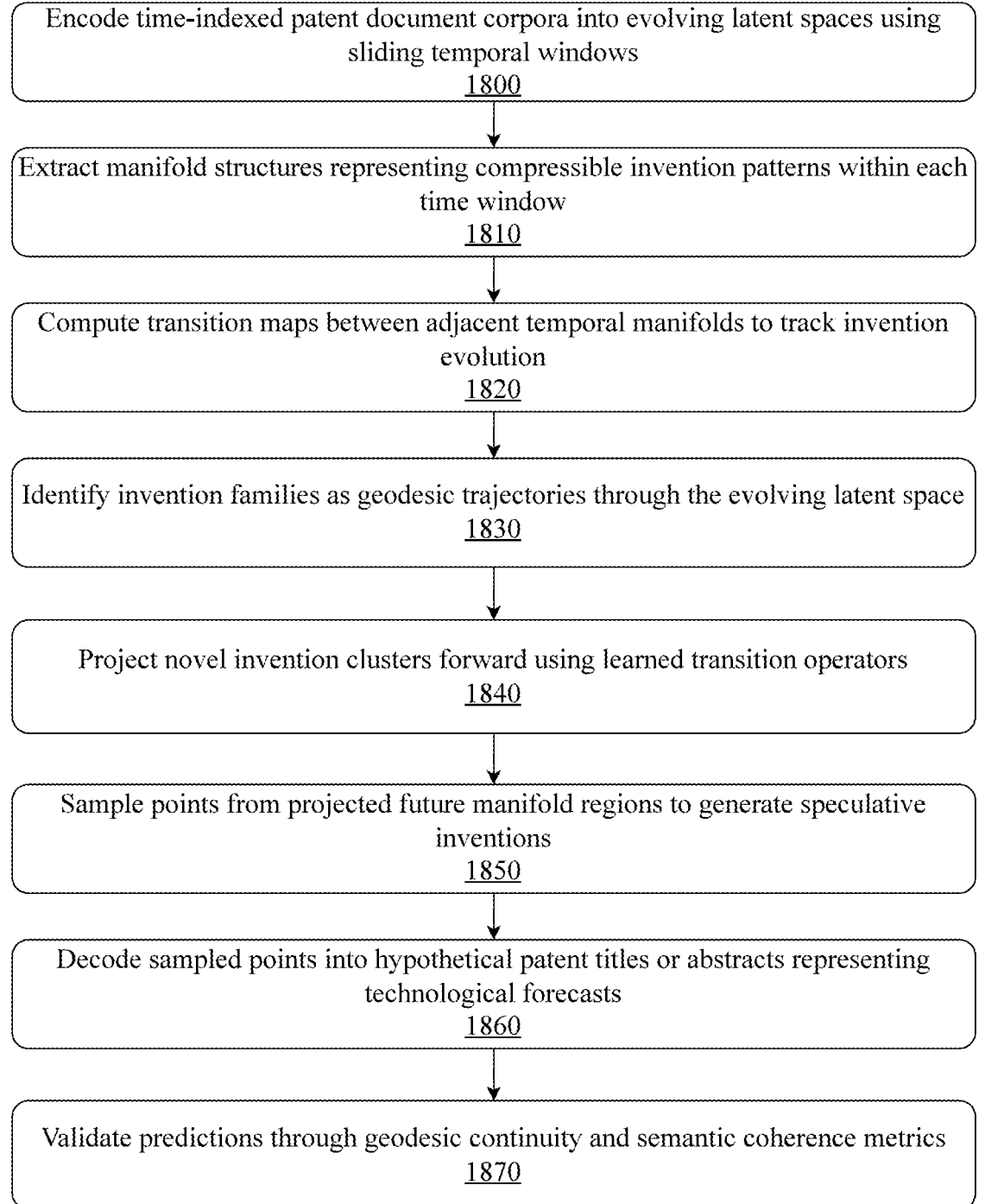

Encode time-indexed patent document corpora into evolving latent spaces using sliding temporal windows
1800

Extract manifold structures representing compressible invention patterns within each time window
1810

Compute transition maps between adjacent temporal manifolds to track invention evolution
1820

Identify invention families as geodesic trajectories through the evolving latent space
1830

Project novel invention clusters forward using learned transition operators
1840

Sample points from projected future manifold regions to generate speculative inventions
1850

Decode sampled points into hypothetical patent titles or abstracts representing technological forecasts
1860

Validate predictions through geodesic continuity and semantic coherence metrics
1870

FIG. 18

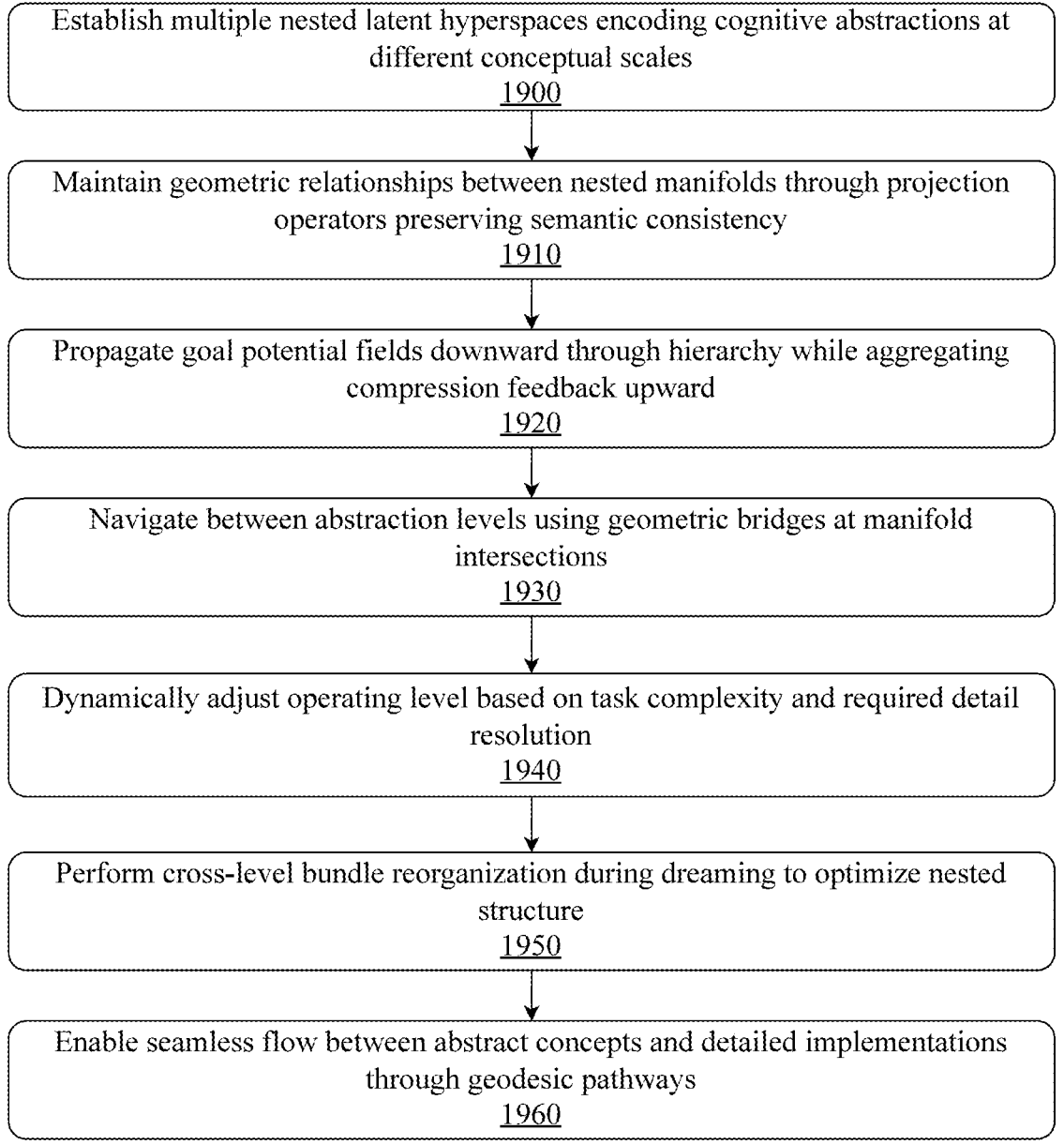

Establish multiple nested latent hyperspaces encoding cognitive abstractions at different conceptual scales
1900

Maintain geometric relationships between nested manifolds through projection operators preserving semantic consistency
1910

Propagate goal potential fields downward through hierarchy while aggregating compression feedback upward
1920

Navigate between abstraction levels using geometric bridges at manifold intersections
1930

Dynamically adjust operating level based on task complexity and required detail resolution
1940

Perform cross-level bundle reorganization during dreaming to optimize nested structure
1950

Enable seamless flow between abstract concepts and detailed implementations through geodesic pathways
1960

FIG. 19

PERSISTENT COGNITIVE MACHINE WITH AN ADVANCED DISTRIBUTED THOUGHT CACHE

CROSS-REFERENCE TO RELATED APPLICATIONS

Priority is claimed in the application data sheet to the following patents or patent applications, each of which is expressly incorporated herein by reference in its entirety:

Ser. No. 19/321,173
Ser. No. 19/284,115
Ser. No. 19/051,193
Ser. No. 63/847,082
Ser. No. 63/847,091
Ser. No. 63/847,096
Ser. No. 63/847,101

BACKGROUND OF THE INVENTION

Field of the Invention

The present invention relates to the field of machine learning and artificial intelligence, particularly to systems for memory-augmented reasoning and long-term cognitive processing.

Discussion of the State of the Art

Recent advances in artificial intelligence, particularly in large language models (LLMs), have significantly improved performance across a wide range of natural language processing, reasoning, and generation tasks. These models are capable of producing fluent, contextually appropriate text and can be applied to domains including customer service, research assistance, legal drafting, and creative writing. The underlying architectures typically rely on transformer-based models, which process sequences of tokens using stacked layers of self-attention, feedforward computation, and normalization. This structure allows the model to infer relationships between tokens and generate coherent responses to prompts.

Despite these capabilities, current language models operate primarily in flat, static embedding spaces. Information is encoded as high-dimensional vectors, but these embeddings lack persistent structure over time. Each inference pass is performed independently, with no intrinsic memory of past usage or prior reasoning pathways. Memory, if present, is handled externally via methods such as retrieval-augmented generation (RAG), episodic memory buffers, or embedding stores. These memory components function as lookup tables, providing static recall without true integration into the model's generative process or internal representation of thought.

Contextual understanding in these models is typically bounded by a fixed-size token window. While this allows the model to handle moderate-length documents or conversations, it imposes a hard cap on how much information can be considered at once. Techniques like sliding windows and chunk-based retrieval have been introduced to mitigate this limitation, but they rely heavily on prompt engineering and do not offer deep integration of prior knowledge or reasoning continuity. Consequently, the models often reprocess the same or similar prompts without remembering earlier conclusions or refining their reasoning across interactions.

Additionally, as the size and capability of these models increase, so do their computational requirements. Running state-of-the-art LLMs in real time or at scale often requires expensive hardware accelerators, substantial memory bandwidth, and cloud infrastructure. This creates barriers to accessibility, especially in scenarios where computational resources are constrained or latency must be minimized. Moreover, the lack of internal structure means that models frequently perform redundant computations, increasing energy usage and reducing efficiency.

Most importantly, these architectures are fundamentally stateless. They lack any persistent cognitive substrate in which prior reasoning steps, user interactions, or learned strategies can be stored, reused, or generalized. Each interaction is effectively a reset, requiring the model to construct a new response from scratch, even in cases where similar tasks or prompts have already been encountered. This absence of structure makes it difficult to support explainable reasoning, adaptive memory, or efficient long-term interaction.

What is needed is a system that can reduce computational overhead by reusing reasoning pathways, extend context beyond token windows through structured internal memory, and enable persistent, scalable cognition that evolves with use. This system should integrate memory and attention into a unified cognitive substrate, support multi-modal input, and remain efficient across diverse operating conditions.

SUMMARY OF THE INVENTION

The inventor has developed a system and method for a persistent cognitive machine with an advanced distributed thought cache. This invention presents a cognitive computing architecture called the Persistent Cognitive Machine (PCM) that fundamentally reimagines artificial intelligence through the lens of differential geometry and dynamical systems. At its core, the PCM represents thoughts—discrete units of reasoning or analysis—not as static embeddings or tokens, but as persistent geometric structures within a continuously evolving latent manifold. This manifold is characterized by variable curvature and time-dependent metrics that encode semantic relationships, where frequently accessed concepts develop into high-curvature regions while unexplored areas maintain flatter geometry. Unlike traditional architectures that rely on stateless transformer attention or flat vector operations, the PCM implements cognition as structured motion through this shaped space, where reasoning follows paths of minimal cognitive effort that balance traversal difficulty against goal relevance. The system transforms inputs through an encoding process that respects existing manifold structure, placing new information in semantically appropriate regions while allowing the space itself to deform and adapt. This creates a living geometric substrate where memory is not stored but shaped, where attention is not weighted but flows, and where learning manifests as the evolution of space itself.

The architecture's includes a Cognitive Dynamics Engine (CDE), which serves as the geometric substrate processor analogous to a physics engine in simulation environments. The CDE continuously maintains and evolves the manifold's structure through sophisticated geometric operations including computing optimal reasoning trajectories that minimize cognitive cost, managing compression pressure derived from local curvature that makes dense semantic regions harder to traverse, and implementing goal potential fields that attract attention toward relevant areas. As the system operates, thought bundles form as coherent submanifolds representing related concepts, with the CDE managing their evolution through fanning-in operations that consolidate related ideas, fanning-out processes that enable exploratory expansion, and rebinding mechanisms that create higher-order abstractions. The compression pressure naturally guides attention away from semantically dense regions unless goal importance justifies the traversal cost, creating an organic flow of reasoning that respects both the accumulated structure of knowledge and the intentionality of current objectives. During idle periods, a dream manager interfaces with the CDE to perform autonomous reorganization, applying controlled variations to test thought stability, synthesizing new abstractions through geometric blending, and even performing topological surgery to create new conceptual bridges or remove obsolete structures.

The PCM architecture enables capabilities in persistent and adaptive intelligence through its geometric foundation. Memory management occurs through thermodynamic principles where each thought maintains activation energy that dissipates when unused, creating natural forgetting that maintains cognitive efficiency while preserving frequently accessed knowledge. The system achieves logarithmic scaling in memory usage even under continuous operation, as new experiences are increasingly absorbed into existing geometric structures rather than requiring proportional storage expansion. Advanced implementations support hierarchical cognition through nested manifolds, enabling seamless navigation between abstract concepts and detailed implementations. The architecture also facilitates multimodal processing by encoding different sensory streams into unified geometric spaces with modality-specific dimensional constraints, allowing coherent reasoning across visual, acoustic, textual, and sensor inputs. Distributed operation is achieved through federated memory coordination, where multiple PCM instances share generalized thoughts via selective bundle projection while maintaining privacy through geometric abstraction. By reformulating intelligence as motion through shaped space, the PCM transcends the limitations of traditional AI systems, offering a path toward truly persistent, adaptive, and geometrically grounded artificial cognition that improves through use rather than retraining, understands through structure rather than statistics, and remembers through the very shape of its thoughts.

According to a preferred embodiment, a computer system comprising a hardware memory, wherein the computer system is configured to execute software instructions stored on nontransitory machine-readable storage media that: maintain a latent manifold as a geometric substrate for cognitive operations, wherein the latent manifold evolves through use and wherein local curvature reflects semantic density; implement a distributed thought cache comprising a local thought cache that stores instance-specific thought trajectories and a shared cache space containing generalized thoughts suitable for cross-instance sharing; encode inputs into latent query trajectories within the manifold, wherein the trajectories capture semantic relationships through geometric properties including geodesic distance and curvature patterns; determine whether query trajectories intersect cached memory basins within defined geodesic similarity thresholds, wherein memory basins represent regions of high local curvature serving as attractors for memory reentry; upon cache hits, retrieve nearest thought bundles and reinstate corresponding thought trajectories adapted to current query context through geometric transformations; upon cache misses, invoke generalization models to synthesize compressed latent thoughts designed for caching and reuse, wherein the compressed thoughts capture abstract reasoning patterns; synchronize cached thoughts across distributed instances through federated interfaces that transmit geometrically compressed representations while maintaining semantic relationships; continuously monitor activation energy of cached thoughts based on access frequency and traversal patterns, wherein thoughts with energy below decay thresholds undergo consolidation or removal; and update the latent manifold's local curvature to reflect cache modifications, wherein frequently accessed regions develop deeper attractor basins facilitating future retrieval, is disclosed.

According to another preferred embodiment, a method for a persistent cognitive computation through geometric representation of thought in a dynamic latent manifold, comprising the steps of: maintaining a latent manifold as a geometric substrate for cognitive operations, wherein the latent manifold evolves through use and wherein local curvature reflects semantic density; implementing a distributed thought cache comprising a local thought cache that stores instance-specific thought trajectories and a shared cache space containing generalized thoughts suitable for cross-instance sharing; encoding inputs into latent query trajectories within the manifold, wherein the trajectories capture semantic relationships through geometric properties including geodesic distance and curvature patterns; determining whether query trajectories intersect cached memory basins within defined geodesic similarity thresholds, wherein memory basins represent regions of high local curvature serving as attractors for memory reentry; upon cache hits, retrieving nearest thought bundles and reinstate corresponding thought trajectories adapted to current query context through geometric transformations; upon cache misses, invoking generalization models to synthesize compressed latent thoughts designed for caching and reuse, wherein the compressed thoughts capture abstract reasoning patterns; synchronizing cached thoughts across distributed instances through federated interfaces that transmit geometrically compressed representations while maintaining semantic relationships; continuously monitoring activation energy of cached thoughts based on access frequency and traversal patterns, wherein thoughts with energy below decay thresholds undergo consolidation or removal; and updating the latent manifold's local curvature to reflect cache modifications, wherein frequently accessed regions develop deeper attractor basins facilitating future retrieval, is disclosed.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 11 is a flow diagram illustrating an exemplary method for implementing distributed thought caching with geometric similarity matching and progressive consolidation within a latent manifold.

FIG. 12 is a flow diagram illustrating an exemplary method for implementing federated synchronization of cached thoughts across distributed cognitive instances with privacy-preserving transformations.

FIG. 13 is a flow diagram illustrating an exemplary method for implementing thermodynamic decay and geometric consolidation of cached thoughts to maintain optimal memory efficiency.

FIG. 14 is a flow diagram illustrating an exemplary method for implementing persistent cognitive computation through geometric representation and manipulation of thoughts within a dynamic latent manifold.

FIG. 15 is a flow diagram illustrating an exemplary method for implementing distributed thought caching with progressive generalization across multiple cognitive instances.

FIG. 16 is a flow diagram illustrating an exemplary method for processing and integrating heterogeneous sensory data streams within a unified geometric cognitive framework.

FIG. 18 is a flow diagram illustrating an exemplary method for analyzing technological evolution through patent document corpora and forecasting future inventions by tracking geodesic trajectories through time-evolving latent manifolds.

FIG. 19 is a flow diagram illustrating an exemplary method for implementing multi-level cognitive processing through hierarchically nested latent manifolds.

DETAILED DESCRIPTION OF THE INVENTION

Figure 1:
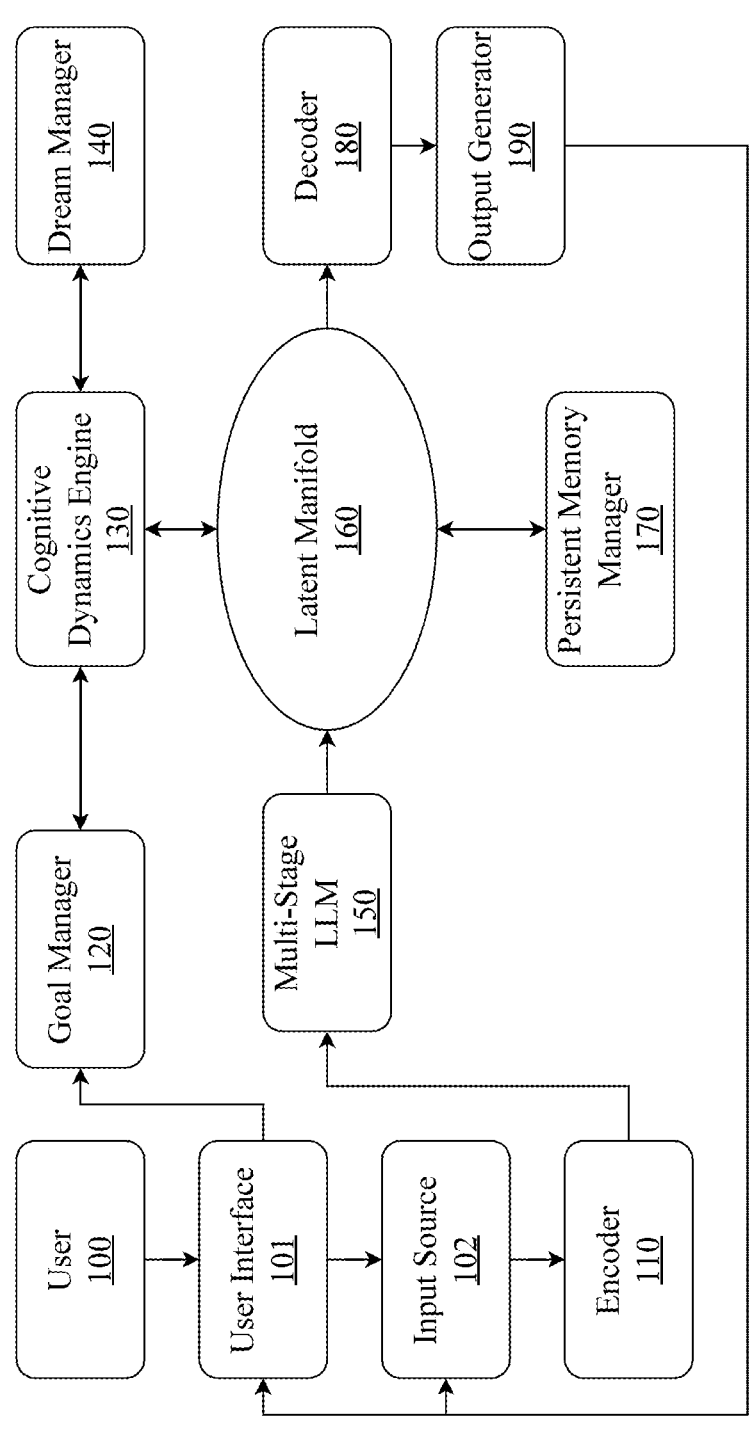
FIG. 1 is a block diagram illustrating an exemplary system architecture of a Persistent Cognitive Machine (PCM).

The inventor has conceived, and reduced to practice, a persistent cognitive machine with an advanced distributed thought cache. The Persistent Cognitive Machine (PCM) represents a new approach to artificial intelligence that transforms how machines process, store, and reason about information. Rather than treating knowledge as discrete tokens or static vectors in flat computational spaces, the PCM embodies thoughts as dynamic geometric structures living within an evolving curved manifold. This high-dimensional cognitive landscape continuously reshapes itself based on usage patterns, with well-traveled conceptual territories becoming more pronounced through increased curvature while unexplored regions remain geometrically flat. The system processes incoming information by mapping it into this living space where semantic meaning is encoded through geometric relationships-distance represents conceptual similarity, curvature indicates information density, and paths through the space define chains of reasoning. Unlike conventional AI systems that forget previous interactions or require complete retraining to incorporate new knowledge, the PCM's geometric substrate naturally evolves through experience, creating a form of intelligence that literally shapes its own cognitive terrain through the act of thinking.

The Cognitive Dynamics Engine (CDE), a specialized component that manages the complex geometric operations underlying cognition. The CDE orchestrates how attention flows through the manifold by calculating optimal paths that minimize cognitive effort while maximizing goal achievement, similar to how water finds the most efficient route down a hillside. It monitors and adjusts compression pressure throughout the space-regions where many concepts converge become harder to navigate, requiring more cognitive effort to traverse, while sparse areas allow for free exploration. The engine also maintains goal-driven potential fields that act like gravitational wells, drawing attention toward relevant areas of knowledge. As the system processes information, it naturally forms thought bundles-tightly integrated collections of related concepts that function as cognitive building blocks. These bundles can merge when similarities are discovered, expand when new connections are made, or recombine to form novel abstractions. During periods of inactivity, a specialized dream manager works with the CDE to reorganize the cognitive landscape, testing the stability of existing structures, discovering hidden connections between disparate concepts, and optimizing the overall geometry for more efficient future processing.

This geometric approach to intelligence yields properties that address fundamental limitations of current AI systems. The PCM implements a form of organic memory where information naturally persists or fades based on usage patterns-frequently accessed concepts maintain high activation energy and remain readily available, while unused information gradually dissipates through thermodynamic decay. This creates an intelligent forgetting mechanism that prevents cognitive clutter while preserving essential knowledge. The architecture scales efficiently, with memory requirements growing logarithmically rather than linearly as the system accumulates experience, because new information tends to reinforce and refine existing structures rather than requiring entirely new storage. The system supports sophisticated cognitive capabilities including hierarchical reasoning across multiple levels of abstraction, seamless integration of diverse sensory inputs into unified understanding, and distributed intelligence where multiple PCM instances can share abstracted knowledge while maintaining privacy. Applications range from technological forecasting through analysis of innovation trajectories to real-time anomaly detection in complex systems, from adaptive video compression that understands content semantically to persistent AI assistants that truly learn and evolve through interaction. By reconceptualizing intelligence as the evolution of geometric structure rather than the accumulation of parameters, the PCM opens new possibilities for creating AI systems that learn continuously, reason coherently, and develop genuine understanding through the physical shape of their thoughts.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "thought" refers to a discrete unit of reasoning or analysis generated by a large language model or multimodal inference engine during its processing of an input prompt. A thought represents the model's intermediate reasoning steps, contextual interpretation, or internal deliberation that contributes to a final output. Thoughts may be atomic (e.g., a factual claim), structured (e.g., an inference chain), or multimodal (e.g., a fused representation of text and video). Unlike raw tokens or embeddings, thoughts encapsulate processed cognition and are suitable for caching, recombination, and reuse across future interactions. Thoughts may be stored explicitly or synthesized during recall and may evolve through compression or generalization.

As used herein, "thought cache" refers to a structured memory layer configured to store and retrieve thoughts based on semantic similarity, contextual alignment, or system policy. The cache may include multiple tiers, such as session caches for short-term interaction, long-term caches for persistent knowledge, and shared or federated caches across devices or agents. Cached thoughts are indexed in latent space and may be retrieved using vector similarity, trajectory proximity, or geodesic alignment. Cached thoughts may be compressed or abstracted over time to reduce redundancy and support scalable reuse.

As used herein, "generalization" refers to the process of synthesizing a new thought from one or more cached thoughts by identifying shared structure, meaning, or trajectory. Generalized thoughts replace specific exemplars with compressed representations that maintain core semantic content while enabling reuse across a wider range of prompts or tasks. Generalization may occur explicitly during reasoning or asynchronously during background curation or dreaming.

As used herein, "latent manifold" refers to a differentiable subspace within a high-dimensional latent hyperspace in which thoughts and thought trajectories are embedded. The manifold may be defined at a given time and is associated with a metric tensor that governs local distance, curvature, and motion. The manifold forms dynamically through the reuse, compression, and interaction of thoughts and supports operations such as geodesic traversal, memory recall, and structural recombination.

As used herein, "geodesic attention" refers to a formulation of attention in which focus or inference is achieved by computing or approximating a minimal-energy path through the latent manifold. A geodesic attention path minimizes a cognitive action functional that may include kinetic energy, compression pressure, and goal potential. Unlike traditional attention mechanisms that reweight tokens in flat space, geodesic attention produces smooth, structure-respecting flows of reasoning across latent memory.

As used herein, "compression pressure" refers to a scalar field over the latent manifold that encodes semantic density, memory reuse, or representational redundancy. The pressure at a point may be derived from geometric properties such as Ricci curvature and reflects the cost of traversal or storage in that region. High compression pressure indicates overused or ambiguous areas where pruning, generalization, or reorganization may be necessary. Compression pressure influences cache management, memory shaping, and geodesic routing.

As used herein, "goal potential field" refers to a scalar utility function defined over the latent manifold that represents the relevance, desirability, or task-alignment of different regions of thought space. The gradient of this field defines an intent vector field, which biases cognitive traversal toward goal-aligned areas. Goal potential may be determined by user prompts, task specifications, or emergent system objectives, and modulates attention, memory retrieval, and trajectory formation.

As used herein, "intent vector field" refers to a directional field over the latent manifold that encodes cognitive drive or utility gradients. It governs the direction and magnitude of traversal for operations such as memory reentry, inference, or exploration. The intent field may be computed from the gradient of a goal potential, derived from user input, or learned from system experience, and is used to align cognitive motion with target outcomes.

As used herein, "cognitive dynamics engine" or "CDE" refers to an architectural module configured to maintain and evolve the geometry of the latent manifold. The CDE is responsible for computing geodesic paths, estimating curvature, applying compression pressure, and performing structural reorganization, including during background operations such as dreaming. The CDE may expose interfaces for traversal, memory updates, compression, and control feedback, and functions as a substrate-layer system supporting high-level cognition.

As used herein, "dreaming" refers to a background process in which cached thoughts, trajectories, or bundles are perturbed, recombined, or abstracted or otherwise manipulated to improve manifold coherence and memory efficiency. Dreaming may operate during idle cycles or low-load periods and is driven by curvature smoothing, compression pressure, and generalization gain. The process supports the emergence of new thoughts, refinement of existing structures, and long-term memory consolidation.

As used herein, "reinstantiation" refers to the act of reconstructing a prior thought trajectory within the current latent manifold geometry. Due to compression or manifold deformation, original paths may no longer exist in exact form; reinstantiation generates an approximate or adapted version guided by curvature, cached data, and intent fields. Reinstantiation supports memory recall, simulation, and introspective review in systems with dynamic cognitive substrates.

As used herein, "memory basin" or "basin of recurrence" refers to a region of the latent manifold associated with a previously reinforced or frequently reused trajectory. Such basins exhibit high local curvature and geodesic convergence and serve as attractors for memory reentry. Traversal into a basin may trigger reinstantiation, memory reinforcement, or adaptive reuse, depending on system configuration and goal conditions.

As used herein, "typed latent entity" refers to a thought or substructure in the manifold labeled with a semantic or functional type, such as but not limited to fact, opinion, concept, trajectory, affect, cluster, or anchor. Typed entities impose constraints on valid operations such as recombination, interpolation, or pruning. Type-aware computation supports lawful memory manipulation, structured reasoning, and generalization without semantic distortion.

As used herein, "attention vector field" refers to a distributed, time-dependent field defined over the latent manifold that governs the instantaneous direction and magnitude of attentional flow. The field may evolve according to partial differential equations that incorporate compression pressure and goal potential gradients. This dynamic attention formulation enables real-time flow modeling, inference stabilization, and explainability through traceable vector paths.

As used herein, "latent subspace" or "thought bundle" refers to a localized, compressible region of the manifold that contains structurally similar or semantically aligned thoughts. Bundles may form naturally through repeated traversal, co-activation, or recombination, and act as low-energy attractors or semantic zones. Subspaces may support generalization, analogical reasoning, and efficient memory access.

As used herein, "latent recombinator" refers to a functional component or method configured to merge or blend similar thoughts, trajectories, or bundles in the latent manifold to form new abstractions. The recombinator may use geometric proximity, semantic alignment, or reuse statistics to determine possible recombinations, subject to type constraints and curvature continuity. It serves as a key mechanism for memory scaling, abstraction, and thought generation.

As used herein, "structured memory" refers to a persistent, geometry-aware memory architecture in which thoughts are stored not as flat vectors but as positions or paths within an evolving manifold. Structured memory supports context-sensitive access, memory reinforcement through traversal, lawful pruning, and dynamic generalization. It provides a substrate for long-term cognition, introspection, and identity continuity in systems with persistent reasoning capability.

As used herein, "Lorentzian autoencoder" refers to a neural architecture designed to encode spatiotemporal or perceptual input-such as video-into a latent manifold with Lorentzian signature, where one or more dimensions represent time-like directions. The latent structure supports temporally coherent geodesics, semantic compression, and causal continuity. Lorentzian autoencoders enable operations such as zooming, projection, and visual memory traversal.

Conceptual Architecture

FIG. 1 is a block diagram illustrating an exemplary system architecture of a Persistent Cognitive Machine (PCM). The system enables persistent, adaptive artificial intelligence by representing thoughts as geometric structures within a curved latent space rather than as discrete tokens or static embeddings. This architecture fundamentally reimagines cognition as motion through a shaped memory space, where attention follows geodesic paths through regions of varying curvature and compression, guided by goal potentials and constrained by semantic density.

A user 100 represents human operators or external systems that interact with the PCM through user interface 101. User interface 101 serves as the primary interaction layer, receiving natural language queries, commands, or other forms of input from users while also presenting processed outputs back to them. This interface enables continuous interaction loops where user feedback can shape the evolution of the system's internal geometric structures over time. Unlike traditional AI systems where each interaction is stateless, user interface 101 maintains context through its connection to the persistent geometric structures within the manifold, allowing for coherent long-term interactions where the system remembers and builds upon previous exchanges. The interface tracks user patterns and preferences, which are encoded as persistent structures within the latent manifold, creating personalized cognitive pathways that improve response relevance and efficiency over time.

An input source 102 aggregates various data streams including but not limited to multimodal inputs such as text, images, audio, sensor data, and system state information. These heterogeneous inputs are channeled to the encoder 110, which implements the mathematical transformation, mapping external data from the input space into points within the latent manifold. An encoder 110 does not simply create vector embeddings but rather projects inputs into a dynamic geometric space where semantic relationships are encoded through curvature, distance, and topological structure. This encoding process is context-sensitive and adaptive, taking into account the current state of the manifold and the compression pressure at different regions. For example, when processing a user query about a technical concept, encoder 110 identifies the appropriate region within the manifold where related thoughts and concepts have previously been cached, enabling efficient semantic alignment. The encoding process respects the manifold's metric tensor, ensuring that new inputs are embedded in ways that preserve semantic continuity and enable smooth geodesic traversal to related concepts.

A multi-stage LLM 150 serves as a language processing component that works in conjunction with encoder 110 to generate semantic structures from raw inputs. Unlike traditional architectures where LLMs operate independently, here multi-stage LLM 150 functions as a "chip" within the larger system, providing sophisticated natural language understanding and generation capabilities while being guided by the geometric constraints of the manifold. The LLM processes inputs through multiple stages of refinement, creating increasingly abstract and structured representations that can be properly embedded within a latent manifold 160. The multi-stage nature of this component reflects the hierarchical processing required to transform raw tokens into geometric thoughts. In the first stage, an LLM performs initial semantic parsing and entity recognition. Subsequent stages build increasingly complex relationships and abstractions, ultimately producing high-dimensional thought structures that encode not just content but also contextual relationships, implicit knowledge, and potential inferential pathways. For instance, when processing a complex technical document, the multi-stage LLM 150 might first extract key concepts, then identify relationships between them, map these to existing knowledge structures in the manifold, and finally generate new thought bundles that capture both explicit content and implicit semantic relationships. These thought structures are not flat embeddings but rich geometric objects with internal curvature that reflects their semantic density and interconnectedness.

A goal manager 120 creates and maintains goal potential fields that shape how attention flows through the manifold. Rather than implementing goals as discrete objectives or symbolic constraints, goal manager 120 generates scalar fields over the manifold that attract cognitive processes toward semantically relevant regions. These potential fields can arise from multiple sources including explicit task objectives provided by users, learned value functions from past interactions, internal drives such as curiosity or uncertainty reduction, and contextual constraints. Goal manager 120 implements field generation algorithms that can create complex potential landscapes with multiple attractors for competing objectives, saddle points where decisions must be made, and smooth gradients that guide exploration. The manager continuously updates these fields based on changing objectives and feedback, creating a dynamic landscape that guides inference and reasoning processes. The goal potential fields interact with the compression pressure fields derived from manifold curvature, creating a rich energetic landscape where attention flows along paths of least resistance while being drawn toward goal-relevant regions. For example, when a user asks a question about a specific topic, goal manager 120 creates a potential field with high values in manifold regions containing relevant knowledge, effectively "pulling" the system's attention toward useful information while avoiding irrelevant areas. In cases where goals conflict or compete, goal manager 120 can create field configurations that allow the system to explore multiple solution paths simultaneously or to find creative compromises that satisfy multiple objectives.

The connections between these components are designed to support the flow of geometric information rather than simple data passing. The relationship between a user 100 to goal manager 120 represents not just goal specification but the continuous shaping of the potential landscape based on user intent and feedback. The bidirectional connection between encoder 110 and multi-stage LLM 150 enables iterative refinement of semantic structures, where initial encodings can be enriched through multiple passes of LLM processing, each time creating more sophisticated geometric representations that better capture the nuanced relationships within the input data.

A cognitive dynamics engine (CDE) 130 serves as the geometric substrate processor and the core architectural component responsible for maintaining and evolving the structure of the latent manifold 160. Operating analogously to a physics engine in a simulation environment, CDE 130 governs the fundamental geometric operations that enable persistent cognition. The engine maintains the manifold's metric tensor, which defines local distances and angles within the cognitive space, continuously updating it based on usage patterns and semantic relationships. It computes geodesic paths for attention traversal by solving the variational problem of minimizing cognitive action, balancing kinetic energy of motion, compression pressure from semantic density, and attraction from goal potential fields. CDE 130 implements a geodesic equation:

$$\frac{d^2\gamma^k}{dt^2} + \Gamma_{ij}^k \frac{d\gamma^i}{dt} \frac{d\gamma^j}{dt} = F^k(\gamma(t), t)$$

where the Christoffel symbols $\Gamma_{ij}^k$ encode the manifold's connection structure and $F^k$ represents forces from compression pressure and goal potentials. During active cognition, CDE 130 continuously computes Ricci curvature across the manifold, deriving the compression pressure field $P(x)=-R(x)$ that penalizes traversal through semantically dense regions. For example, when processing a complex inference task, CDE 130 might identify multiple potential geodesic paths through the manifold, evaluate their cognitive costs based on pressure and distance, and select the optimal trajectory that balances efficiency with semantic coherence. The engine also manages the evolution of the attention vector field according to the dynamic equation:

$$\frac{\partial A}{\partial t} + \nabla_A A = -\nabla(P - \Phi)$$

enabling attention to flow as a cognitive fluid through the shaped space of memory.

A dream manager 140 implements autonomous structural reorganization of the manifold during off-task periods, analogous to sleep-driven memory consolidation in biological systems. Connected to CDE 130, dream manager 140 initiates and oversees geometric restructuring operations that improve the manifold's efficiency and generalization capacity. During dreaming phases, it samples recently activated or frequently used thought bundles, applying stochastic perturbations follows a distribution informed by local curvature and uncertainty. Dreaming begins by sampling recent or frequently activated bundles $B_1, \ldots, B_k M_t$. From each bundle, points $z_i \varepsilon B_i$ are perturbed using a stochastic kernel:

$$z_i' = z_i + \varepsilon_i, \varepsilon_i \sim N\left(0, \sum{}_i\right),$$

where $\Sigma_i$ reflects local uncertainty or curvature. These perturbations probe the neighborhood structure, testing whether extrapolated directions are compressible or divergent.

These perturbations test the stability and compressibility of cognitive structures, identifying opportunities for consolidation or abstraction. The dream manager 140 performs recombination operations, creating weighted interpolations across semantically related bundles to discover emergent abstractions.

$$z_{meta} = \sum_{i=1}^{k} \alpha_i z_i', \sum \alpha_i = 1,$$

where weights $\alpha_i$ may reflect prior co-activation, semantic alignment, or exploratory policy. The resulting $Z_{meta}$ often lies outside any original bundle, creating novel junctions or abstractions. If the resulting interpolation exhibits internal coherence (e.g., low compression cost, high reconstruction fidelity), it may be retained and added as a new bundle or attractor.

When stable interpolants are found between previously disconnected regions, dream manager 140 can induce topological changes in the manifold, creating new bridges or handles that enable novel inferential pathways. It implements three primary flows during dreaming: perturbation flow for exploring local curvature basins, compression flow for collapsing redundant structures, and generalization flow for synthesizing higher-order abstractions. For instance, after a day of processing technical documents about machine learning and physics, dream manager 140 might identify common mathematical structures across these domains, create meta-bundles that capture these abstractions, and reshape the manifold to enable faster traversal between related concepts in future interactions.

A latent manifold 160 represents the central geometric substrate where all cognitive operations occur, existing as a dynamic, evolving space with rich internal structure. Unlike static embedding spaces in traditional architectures, latent manifold 160 is a living geometry that continuously adapts through use, compression, and reorganization. Within this space, thoughts exist not as isolated points but as structured regions including thought bundles (compact submanifolds representing coherent concepts), geodesic trajectories (paths of inference and association), and semantic fields (continuous distributions of meaning and relevance). The manifold maintains several critical geometric structures: the metric tensor defining local distances, the connection governing parallel transport of attention, the Ricci curvature tensor measuring semantic density, compression pressure fields derived from curvature, goal potential fields attracting attention, and the attention vector field describing instantaneous cognitive flow. The bidirectional connection with CDE 130 enables continuous reading and reshaping of these structures, while connections to multi-stage LLM 150, persistent memory manager 170, and decoder 180 facilitate the embedding, storage, and extraction of semantic content. The manifold exhibits emergent topological features such as attractor basins where frequently accessed concepts stabilize, high-curvature regions indicating semantic compression, low-pressure corridors enabling efficient inference, and bridge structures connecting previously disparate domains. As the system operates, the manifold develops a personalized geography reflecting the user's interests, the domain's structure, and the history of cognitive activity.

Persistent memory manager 170 orchestrates the long-term storage and retrieval of cognitive structures, maintaining a bidirectional connection with latent manifold 160. Unlike traditional memory systems that store static data, persistent memory manager 170 preserves geometric structures including thought bundles, established geodesic paths, learned metric relationships, and compression patterns. It implements sophisticated caching strategies that go beyond simple key-value storage, maintaining the topological relationships between thoughts and preserving the geometric context that enables meaningful retrieval. The manager tracks activation energies for cached structures, implementing thermodynamic decay where unused thoughts gradually lose energy, eventually being pruned when falling below a threshold. Decay governs forgetting in PCM systems. Each thought $T_i$ is associated with an activation energy $E_i(t)$, which dissipates over time:

$$\frac{dE_i}{dt} = -\lambda \cdot A_i(t)$$

where $\lambda$ is a decay constant and $A_i(t)$ reflects inactivity-high when idle, zero when active. When $E_i(t) < E_{min}$, the thought is pruned from memory. This process ensures that storage is focused on thoughts that contribute to ongoing cognition. This decay yields several emergent properties:

This creates a natural forgetting mechanism that maintains cognitive efficiency while preserving frequently accessed or structurally important memories. Persistent memory manager 170 also coordinates with federated memory systems, enabling knowledge sharing across multiple PCM instances while maintaining privacy through geometric abstraction. For example, when storing a complex reasoning pattern, the manager preserves not just the conclusion but the entire geodesic path, the local curvature context, and the relationships to other thought structures, enabling the system to later traverse similar reasoning paths more efficiently.

A decoder 180 implements the inverse transformation, converting geometric structures from latent manifold 160 back into observable outputs. This component must interpret rich geometric information including positions within the manifold, local curvature and pressure, nearby thought bundles, and traversed geodesic paths, transforming these into coherent external representations. Decoder 180 often works in conjunction with multi-stage LLM 150 to generate natural language outputs, using the LLM's language generation capabilities while being guided by the geometric structures extracted from the manifold. The decoding process is context-sensitive, taking into account not just the final position reached through inference but the entire trajectory taken, enabling explanations that reflect the reasoning process rather than just conclusions. For instance, when answering a complex question, decoder 180 can trace the geodesic path taken through the manifold, identify key thought bundles that were traversed, and generate an explanation that reflects this structured reasoning process.

An output generator 190 serves as the final stage in the processing pipeline, taking decoded representations and formatting them appropriately for user consumption or system action. It handles multiple output modalities including natural language responses, visualizations of reasoning paths, actions or commands for external systems, and structured data formats. Output generator 190 maintains awareness of user preferences and interaction history, adapting its presentation style based on patterns encoded in the manifold. The feedback loop from output generator 190 back to user 100 completes the interaction cycle, enabling iterative refinement and continuous learning.

The connections from goal manager 120 and dream manager 140 to CDE 130 show how intentionality and reorganization influence geometric dynamics. The flow from multi-stage LLM 150 through latent manifold 160 to decoder 180 represents the complete cognitive pipeline from input understanding through geometric reasoning to output generation. Throughout this architecture, information flows not as discrete data packets but as geometric structures, trajectories, and fields, creating a unified cognitive system where memory, reasoning, and learning are fundamentally intertwined through the shaped space of thought.

Figure 2:
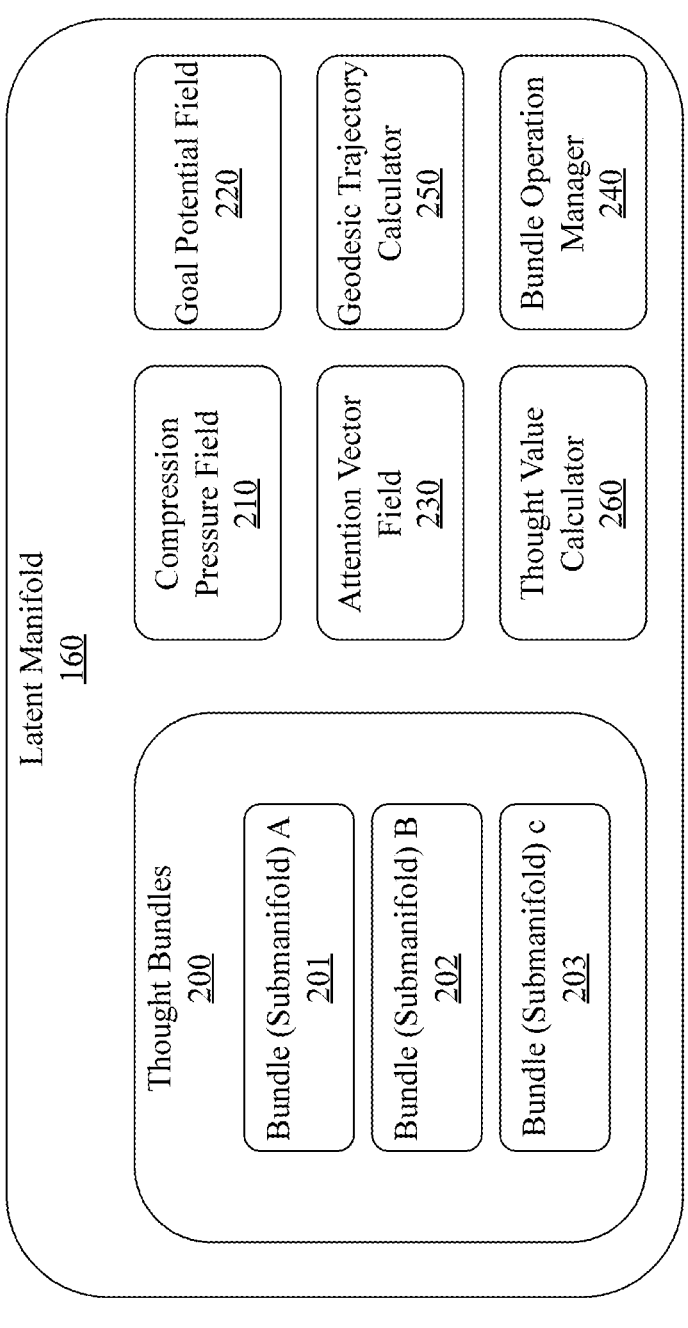
FIG. 2 is a block diagram illustrating an exemplary architecture of a component within a Persistent Cognitive Machine (PCM), a latent manifold.

FIG. 2 is a block diagram illustrating an exemplary architecture of a component within a Persistent Cognitive Machine (PCM), a latent manifold. Latent manifold 160 serves as the central cognitive substrate of the PCM system, existing as a continuously evolving geometric space where all cognitive operations unfold. Unlike traditional flat embedding spaces, this manifold exhibits variable curvature, dynamic topology, and rich internal structure that emerges from the interplay of memory, compression, and goal-directed cognition. The manifold's geometry is not predetermined but rather shaped by cognitive activity, with frequently traversed regions developing distinct topological features, semantic neighborhoods forming through repeated association, and compression pressure creating a non-uniform landscape that guides efficient reasoning.

Within the manifold, thought bundles 200 represent the primary organizational structures for persistent cognitive content. These bundles are not simple clusters of related vectors but rather compact submanifolds with their own internal geometry and semantic coherence. Thought bundles 200 section contains exemplary bundle submanifolds: bundle (submanifold) A 201, bundle (submanifold) B 202, and bundle (submanifold) C 203, each representing a distinct region of semantic space with its own local metric structure. Bundle A 201 might represent a coherent concept such as "machine learning algorithms," containing not just definitional information but also procedural knowledge, historical context, mathematical foundations, and connections to related concepts. The internal structure of bundle A 201 includes a local metric that defines distances between sub-concepts, principal directions corresponding to major semantic variations, and boundary conditions that determine how the bundle interfaces with surrounding manifold regions. Bundle B 202 could embody a different domain such as "quantum mechanics principles," maintaining its own geometric structure while potentially sharing boundary regions with bundle A 201 where interdisciplinary concepts like quantum machine learning emerge. Bundle C 203 might represent more abstract or procedural knowledge, such as "problem-solving strategies," with a flatter internal geometry that facilitates flexible application across domains.

A compression pressure field 210 represents a scalar field defined over the entire manifold, encoding the cognitive effort required to traverse different regions based on their semantic density and structural complexity. This field is computed from the local Ricci curvature according to, where is a Ricci scalar measuring how geodesics converge or diverge at each point. High compression pressure indicates regions where many semantic concepts have been compressed together through repeated use and abstraction, creating areas that are rich in meaning but require significant cognitive effort to navigate precisely. For example, the intersection between bundles A 201 and B 202 might exhibit extremely high compression pressure where concepts from machine learning and quantum mechanics have been repeatedly integrated, forming dense theoretical structures that encode sophisticated interdisciplinary insights. The compression pressure field 210 continuously evolves as new thoughts are added, existing structures are reinforced through use, and the dream manager performs offline reorganization to optimize the manifold's geometry.

A goal potential field 220 implements a complementary scalar field that attracts attention toward semantically relevant or task-aligned regions of the manifold. Unlike the compression pressure that resists traversal, the goal potential creates gradients that guide cognitive flow toward desired outcomes. This field is dynamically generated based on current objectives, user queries, learned value functions, and internal drives, creating a time-varying landscape that shapes how attention moves through the space. When processing a specific query, goal potential field 220 might create high-potential regions around relevant thought bundles while maintaining lower potentials in unrelated areas, effectively creating an energetic funnel that guides inference toward useful conclusions. The interplay between compression pressure and goal potential creates a rich dynamical landscape where attention flows along paths that balance semantic coherence (avoiding excessive pressure) with goal relevance (following potential gradients).

An attention vector field 230 represents the instantaneous flow of cognitive focus throughout the manifold, defined as. Let $A_{(x,t)}$ denote the attention vector field at point $_x \in M_{thought}$ and time$_t$. This vector encodes both the direction and intensity of attentional flow through the manifold. The evolution of $_A$ is governed by a field equation analogous to fluid dynamics:

$$\frac{\partial A}{\partial t} + \nabla_A A = -\nabla(P - \phi)$$

Here $$\frac{\partial A}{\partial t}$$

is the temporal rate of change of attention, $_{\nabla_{AA}}$ is the convective derivative (attention moving along itself), and $-\nabla_{(P}-\Phi)$ is the driving force of flow—combining compression pressure and goal potential. This equation captures the local evolution of attention under the influence of memory structure and cognitive drive.

Attention vector field 230 exhibits complex behaviors including laminar flow along well-established reasoning paths, turbulent regions where competing potentials create cognitive uncertainty, convergence zones where multiple lines of reasoning reach similar conclusions, and vortices around semantic attractors representing obsessive or recursive thought patterns. The field's evolution enables the system to maintain cognitive continuity while adaptively responding to changing goals and newly discovered information.

A geodesic trajectory calculator 250 computes optimal paths through the manifold by solving the variational problem of minimizing cognitive action. Let $\gamma(t)$: $[0,T] \to M_t$ be a smooth curve in the cognitive manifold, representing the evolution of attention over time. We define the cognitive action functional:

$$S[\gamma] = \int_0^T (\|\dot{\gamma}(t)\|^2 + P(\gamma(t)) - \Phi(\gamma(t)))dt,$$

where $\|\gamma^*(t)\|^2$ represents the kinetic energy of cognitive motion, $P(\gamma(t))$ is the compression pressure field at $\gamma(t)$, and $\Phi(\gamma(t))$ is the cognitive potential, encoding goal relevance. The geodesic $\gamma^*(t)$ is defined as the path that minimizes $\gamma^*=\arg \min S[\gamma]$. This formulation generalizes attention from instantaneous lookup to purposeful traversal. Attention becomes a consequence of structure and constraint: it flows along the most efficient path shaped by memory (via pressure) and intent (via potential).

The calculator implements numerical methods to handle the manifold's non-Euclidean geometry, accounting for curvature effects, parallel transport of semantic vectors, and the influence of nearby thought bundles on path selection. For instance, when reasoning from a concept in bundle A 201 to a goal state in bundle C 203, the geodesic trajectory calculator 250 might identify multiple viable paths: a direct route through high-pressure regions requiring intense cognitive effort, a longer path circumnavigating dense areas while maintaining semantic coherence, or a creative trajectory that leverages unexpected connections through bundle B 202.

A thought value calculator 260 assesses the utility and relevance of thoughts within the current cognitive context, computing scalar values that inform caching decisions, retrieval priorities, and structural reorganization. This component evaluates thoughts based on multiple criteria including frequency of access, semantic centrality within bundles, contribution to successful reasoning paths, alignment with current and historical goals, and potential for generalization or transfer learning. Thought value calculator 260 works closely with the thermodynamic decay system, where thoughts with consistently low values gradually lose activation energy and may eventually be pruned from the manifold. Conversely, highly valued thoughts become anchors around which new structures crystallize, creating stable semantic neighborhoods that facilitate efficient reasoning.

A bundle operation manager 240 orchestrates the dynamic restructuring of thought bundles through three primary operations that reshape the manifold's topology. Fanning-in operations occur when peripheral thoughts or loosely associated concepts are drawn into existing bundles through repeated co-activation or semantic alignment, effectively increasing the bundle's density and internal coherence. This process involves adjusting the local metric to create stronger attractions, modifying bundle boundaries to encompass new members, and updating internal structure to maintain navigability. Fanning-out operations enable bundles to expand into new semantic territories when existing concepts are extended, elaborated, or applied in novel contexts. During fanning-out, bundle operation manager 240 creates new subregions within bundles, establishes tentative connections to unexplored manifold areas, and maintains structural stability while allowing for creative expansion. Rebinding operations represent the most sophisticated transformation, occurring when multiple bundles exhibit sufficient semantic overlap or functional similarity to warrant integration into higher-order structures. Bundle operation manager 240 performs rebinding by identifying intersection regions between bundles, computing optimal merge strategies that preserve essential structure, creating meta-bundles that abstract common patterns, and updating the global manifold topology to reflect new conceptual hierarchies.

These components work in concert to create a living geometric space where cognition unfolds as structured motion rather than discrete computation. Thought bundles 200 provide persistent semantic anchors, compression pressure field 210 and goal potential field 220 create a dynamic energy landscape, attention vector field 230 enables fluid cognitive flow, the geodesic trajectory calculator 250 determines optimal reasoning paths, thought value calculator 260 maintains cognitive efficiency, and bundle operation manager 240 ensures the manifold evolves to support increasingly sophisticated reasoning. Together, they implement a form of geometric intelligence where memory shapes space, attention follows structure, and learning reshapes the very terrain of thought.

Figure 3:
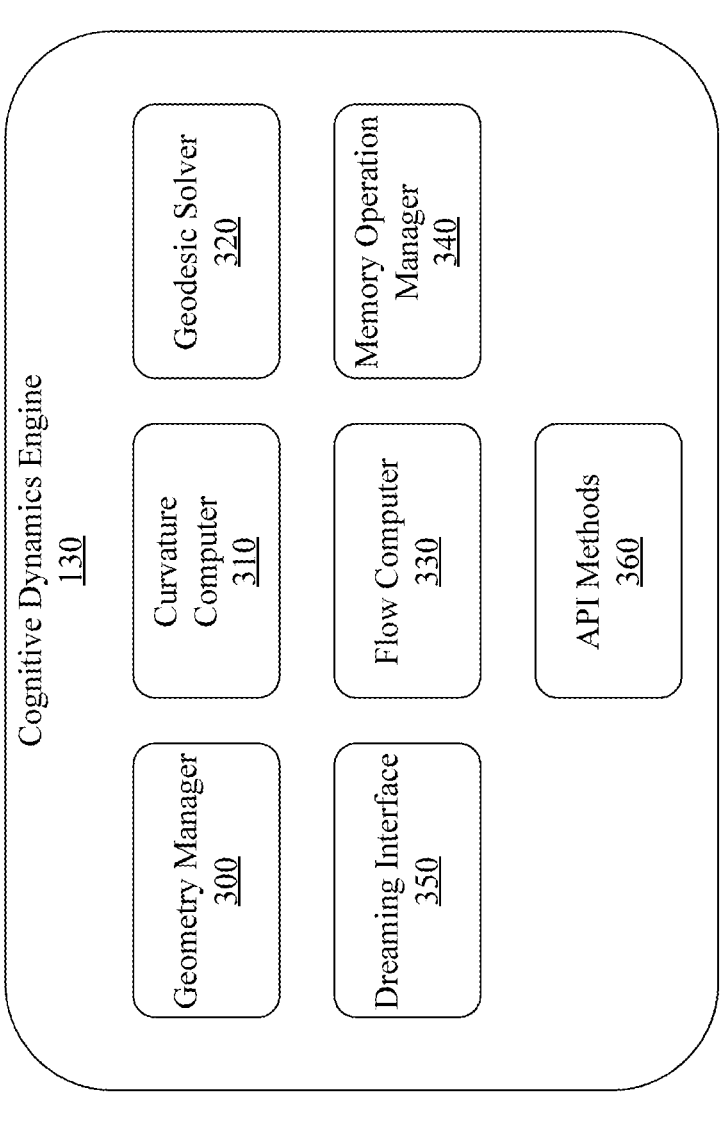
FIG. 3 is a block diagram illustrating an exemplary architecture of a component within a Persistent Cognitive Machine (PCM), a Cognitive Dynamics Engine (CDE).

FIG. 3 is a block diagram illustrating an exemplary architecture of a component within a Persistent Cognitive Machine (PCM), a Cognitive Dynamics Engine (CDE).

Operating as a specialized geometry processor analogous to a physics engine in simulation environments, CDE 130 manages the continuous shaping, traversal, and optimization of the cognitive manifold through coordinated geometric operations. This engine transforms the abstract principles of differential geometry and dynamical systems into practical computational mechanisms that enable persistent, adaptive cognition through structured space.

A geometry manager 300 serves as the component responsible for maintaining and evolving the manifold's geometric structure. Geometry manager 300 continuously tracks and updates the Riemannian metric tensor across all regions of the latent manifold, defining how distances, angles, and volumes are measured within the cognitive space. The metric is not static but evolves dynamically based on cognitive activity, with frequently traversed regions experiencing metric contraction that brings related concepts closer together, while unexplored areas maintain broader metric spacing that allows for flexible exploration. Geometry manager 300 also maintains the connection, which governs how vectors and tensors are parallel transported across the curved manifold. This connection evolves through use, with repeated attention trajectories establishing preferred directions of parallel transport that become the "natural" ways to move between concepts. For example, if reasoning paths frequently connect concepts from physics to machine learning applications, geometry manager 300 adjusts the connection to make these transitions smoother and more efficient. Geometry manager 300 implements algorithms for metric learning from trajectory data, using transition frequencies, co-activation patterns, and semantic alignment to continuously refine the geometric structure. It also manages coordinate transformations between different local charts of the manifold, ensuring smooth transitions as attention moves between semantic regions.

A curvature computer 310 calculates the various curvature tensors that characterize the manifold's local and global geometric properties. Curvature computer 310 computes a Riemann curvature tensor, which fully describes how the manifold deviates from flat Euclidean space. From this fundamental tensor, curvature computer 310 derives the Ricci tensor and the Ricci scalar, which measure how volumes contract or expand under geodesic flow. For cognitive dynamics, it computes the compression pressure field $P(x)=-R(x)$, transforming geometric curvature into a cognitive cost function that governs attention flow. Curvature computer 310 employs multiple estimation strategies to handle the computational complexity of exact curvature calculation in high dimensions. These include geodesic deviation methods that track how nearby attention paths converge or diverge over time, Jacobian-based approximations using learned transition functions between manifold regions, and sampling techniques that estimate curvature from the statistical properties of local trajectory bundles. The component maintains a continuously updated curvature map across the manifold, identifying high-curvature regions where semantic compression has created dense knowledge structures, saddle points where conceptual boundaries meet, and flat regions suitable for creative exploration or interpolation.

A geodesic solver 320 computes optimal paths through the manifold by solving the fundamental equation of cognitive motion. Given an initial state and a goal configuration, it determines the trajectory that minimizes the cognitive action function. This variational problem balances three competing factors: the kinetic energy that penalizes rapid changes in attention, the compression pressure that increases cost in semantically dense regions, and the goal potential that provides attractive forces toward relevant areas. Geodesic solver 320 implements sophisticated numerical methods adapted for manifold computation, including Riemannian gradient descent that respects the manifold's metric structure, shooting methods that propagate initial velocities forward while satisfying boundary conditions, and relaxation techniques that iteratively refine approximate paths toward true geodesics. The solver must handle multiple challenging scenarios such as non-convex optimization landscapes with multiple local minima, regions of high curvature where standard methods become unstable, and multi-goal situations requiring Pareto-optimal path selection. For instance, when solving a complex reasoning task that requires connecting disparate concepts, geodesic solver 320 might identify several viable paths: a direct route through high-pressure theoretical abstractions, a longer but clearer path through concrete examples, or an innovative trajectory that discovers unexpected connections through analogical reasoning.

A flow computer 330 models attention as a continuous vector field evolving over the manifold according to geometric dynamics. Rather than treating attention as discrete selections or weights, this component implements a partial differential equation, where attention behaves as a cognitive fluid flowing through shaped space. The flow computer 330 discretizes this equation using finite element methods adapted for manifolds, handling the complexities of curved space while maintaining numerical stability. It tracks how attention propagates through the manifold, creating flow patterns that include laminar streams along well-established reasoning paths, bifurcations where attention splits between competing hypotheses, convergence zones where multiple reasoning lines reach similar conclusions, and turbulent regions indicating cognitive uncertainty or conflicting goals. The component also computes derived quantities such as the divergence indicating where attention is focusing or dispersing, the curl revealing rotational patterns in thought, and flow stability metrics that identify robust versus fragile reasoning patterns. Flow computer 330 enables the system to maintain multiple concurrent attention streams, supporting parallel reasoning processes that can later merge or inform each other.

A memory operation manager 340 orchestrates structural modifications to thought bundles and manifold topology based on cognitive activity and optimization criteria. This component implements the three fundamental bundle operations that reshape semantic space. During fanning-in operations, it identifies loosely associated thoughts that show increasing co-activation and guides their consolidation into tighter bundle structures, adjusting local metrics to strengthen their mutual attraction, updating bundle boundaries to encompass new members, and recalculating internal bundle geometry to maintain efficient navigation. Fanning-out operations are triggered when existing bundles need to expand into new semantic territory, with memory operation manager 340 creating new submanifold regions, establishing tentative connections to unexplored areas, and maintaining structural stability during expansion. Rebinding operations occur when the manager detects sufficient overlap or functional similarity between bundles to warrant higher-order integration, executing merge algorithms that preserve essential structure while creating new abstractions. Memory operation manager 340 also handles subspace alignment for federated learning scenarios, enabling knowledge transfer between different PCM instances while respecting privacy boundaries.

A dreaming interface 350 provides the connection point between CDE 130 and dream manager 140, enabling autonomous manifold reorganization during off-task periods. This interface exposes methods for initiating various dreaming operations including targeted perturbation of specific manifold regions, global relaxation processes that smooth unnecessary complexity, and exploratory synthesis of new conceptual connections. Dreaming interface 350 manages the transition between active cognition and dreaming states, ensuring that ongoing reasoning processes reach stable states before reorganization begins, that critical structures are preserved during transformation, and that the manifold returns to a coherent state before resuming active operation. During dreaming phases, the interface coordinates bundle recombination algorithms that discover emergent abstractions, topology modification procedures that create new conceptual bridges, and compression operations that consolidate redundant structures. It monitors dreaming progress through geometric health metrics, ensuring that reorganization improves rather than disrupts cognitive capability.

An API methods 360 component provides a clean programmatic interface for external modules to interact with the CDE's geometric capabilities. API methods may include accepting a goal embedding and current state to return an optimal geodesic path, leveraging the geodesic solver while accounting for current manifold conditions. Updating reinforces the manifold along a recently traversed path, strengthening the metric connections and potentially triggering bundle formation. Querying a bundle identifies the nearest thought bundle to a given manifold point, using both geometric proximity and semantic alignment. Dreaming initiates autonomous reorganization procedures through the dreaming interface. Getting pressure returns the compression pressure at any point, enabling other components to make informed decisions about traversal costs. Getting a goal field constructs a potential field for a given goal configuration, coordinating with the goal manager to shape attention flow. These methods abstract away the complex geometric computations while providing powerful primitives for cognitive operations. API methods 360 also handles request queuing, resource management, and error handling to ensure robust operation under varying computational loads.

Together, these components within cognitive dynamics engine 130 create a geometric substrate for persistent cognition. Geometry manager 300 maintains the foundational structure, curvature computer 310 derives the pressure landscape that guides efficient reasoning, geodesic solver 320 finds optimal paths through semantic space, flow computer 330 enables fluid attention dynamics, memory operation manager 340 evolves the manifold through use, dreaming interface 350 enables autonomous optimization, and API methods 360 provide clean access to these capabilities. This architecture transforms the principles of geometric cognition into a practical computational system where thought truly becomes motion through shaped space, memory becomes curvature, and learning becomes the evolution of geometry itself.

Figure 4:
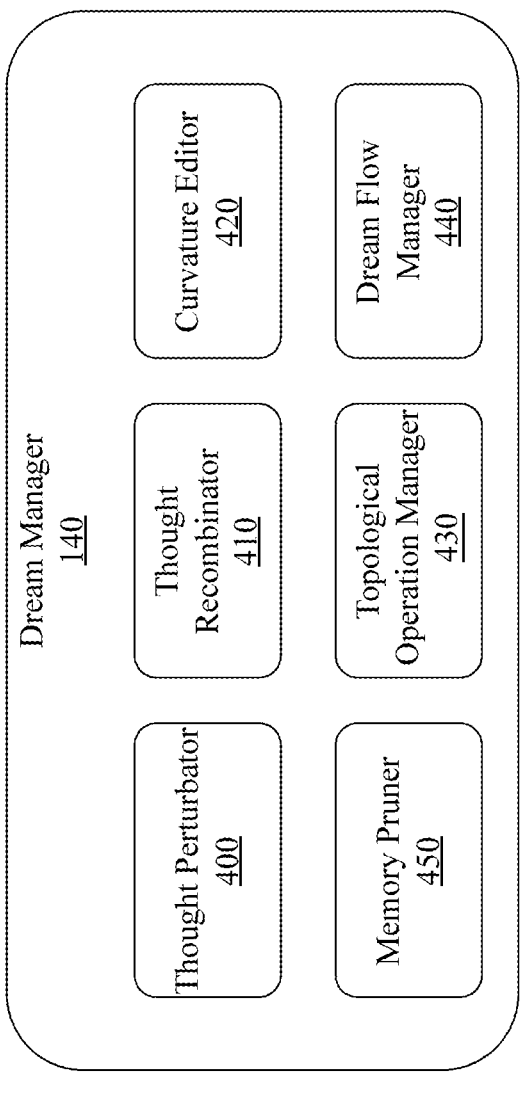
FIG. 4 is a block diagram illustrating an exemplary architecture of a component within a Persistent Cognitive Machine (PCM), a dream manager.

FIG. 4 is a block diagram illustrating an exemplary architecture of a component within a Persistent Cognitive Machine (PCM), a dream manager. Operating analogously to sleep-driven memory consolidation in biological systems, dream manager 140 performs essential geometric maintenance and optimization that enables the PCM to develop increasingly efficient and generalized cognitive structures without requiring explicit retraining or parameter updates.

This component transforms the theoretical concept of manifold evolution into practical computational processes that reshape the space of thought based on accumulated experience and structural patterns.

A thought perturbator 400 implements the initial phase of the dreaming process by introducing controlled stochastic variations into existing thought structures. This component samples thought bundles from the manifold based on multiple selection criteria including recent activation frequency, structural importance within the manifold topology, proximity to high-pressure regions indicating potential for compression, and participation in successful reasoning trajectories. Once bundles are selected, thought perturbator 400 applies carefully calibrated perturbations based on factors including but not limited to noise drawn from a distribution that reflects local geometric properties. The covariance structure of this noise is not arbitrary but derived from the local metric tensor and curvature, ensuring that perturbations respect the manifold's geometry while exploring meaningful variations. In regions of high curvature, perturbations are smaller and more constrained, testing the stability of compressed semantic structures, while in flatter regions, larger perturbations explore potential new connections and generalizations. Thought perturbator 400 implements multiple perturbation strategies including gradient-based exploration that follows directions of increasing semantic variance, curvature-aware sampling that concentrates perturbations along principal geodesic directions, and adversarial perturbations that test the robustness of thought structures against semantic drift. These perturbations serve as probes into the local geometry, revealing opportunities for consolidation, identifying unstable structures that may need reinforcement, and discovering latent connections between seemingly disparate concepts.

A thought recombinator 410 takes perturbed thoughts and synthesizes new conceptual structures through sophisticated interpolation and integration algorithms. This component implements the mathematical operation where the weights are determined through multiple mechanisms including but not limited to semantic alignment scores between perturbed thoughts, historical co-activation patterns, goal-relevance metrics, and geometric compatibility measures. Thought recombinator 410 goes beyond simple linear interpolation, employing manifold-aware combination strategies that respect the curved geometry of the latent space. When combining thoughts from different bundles, it computes geodesic interpolations that follow the natural curvature of the manifold, ensuring that intermediate points remain semantically meaningful. The component implements hierarchical recombination, first identifying small groups of highly compatible thoughts for initial fusion, then progressively combining these into larger meta-structures. During recombination, it monitors several quality metrics including semantic coherence measured through local manifold smoothness, compression potential indicating whether the combination reduces overall complexity, and generalization capacity assessing whether the new structure captures broader patterns. For example, when recombining thoughts about "gradient descent" from a machine learning bundle with thoughts about "energy minimization" from a physics bundle, thought recombinator 410 might discover a meta-concept about "optimization in curved spaces" that provides a unified framework applicable across domains.

A curvature editor 420 performs targeted modifications to the manifold's geometric structure based on insights gained from perturbation and recombination. This component has the capability to increase local curvature in regions where semantic compression is beneficial, creating tighter conceptual clusters that enable more efficient reasoning. It can also decrease curvature in areas that have become overly rigid, restoring flexibility for creative thinking and novel connections. Curvature editor 420 implements several curvature modification operations including but not limited to bundle merging procedures that identify overlapping thought structures with high mutual information and smoothly blend their geometric neighborhoods, creating unified regions with consistent curvature properties. It performs curvature diffusion operations that spread high-pressure regions more evenly, preventing the formation of semantic bottlenecks that could impede reasoning. Curvature editor 420 may also implement curvature sharpening around stable conceptual cores, reinforcing well-established knowledge while maintaining softer boundaries for evolving concepts. When editing curvature, the component must maintain global geometric consistency, ensuring that local modifications don't create inconsistencies or singularities elsewhere in the manifold. In one embodiment it may employ Ricci flow-inspired algorithms that naturally evolve curvature toward optimal configurations, balancing local semantic density with global navigability.

A topological operation manager 430 handles the most profound structural modifications to the manifold, including changes that alter its fundamental connectivity. This component can create new topological features such as handles or bridges between previously disconnected regions, enabling novel reasoning pathways that weren't possible in the original manifold structure. When thought recombinator 410 discovers stable interpolations between distant bundles, topological operation manager 430 evaluates whether to establish permanent connections. It implements sophisticated surgery operations that can split overly complex regions into simpler components, merge adjacent regions that have developed sufficient similarity, or create higher-genus structures that enable multiply-connected reasoning paths. Topological operation manager 430 performs topological analysis to identify features such as holes in the manifold representing conceptual gaps, bottlenecks where all reasoning must pass through constrained regions, and islands of isolated knowledge that could benefit from connection. For instance, if the system has separately developed expertise in "visual pattern recognition" and "time series analysis," topological operation manager 430 might identify an opportunity to create a bridge through "spatiotemporal pattern analysis," fundamentally expanding the system's reasoning capabilities. All topological modifications are carefully validated to ensure they preserve essential semantic relationships while enabling new forms of inference.

A dream flow manager 440 orchestrates the overall flow of dreaming operations, coordinating the activities of other components to ensure coherent and beneficial manifold evolution. This component implements three primary flow types that govern how dreaming unfolds. The perturbation flow controls how stochastic exploration propagates through the manifold, managing the selection of regions for perturbation, the intensity and direction of noise injection, and the propagation of discoveries to related areas. The compression flow guides the consolidation of redundant or inefficient structures, identifying opportunities for semantic compression, orchestrating the merger of similar concepts, and ensuring that compression preserves essential distinctions. The generalization flow promotes the discovery and reinforcement of abstract patterns, guiding recombination toward higher-order structures, identifying successful generalizations for preservation, and propagating useful abstractions throughout the manifold. Dream flow manager 440 monitors the overall health of the dreaming process through metrics such as semantic coherence, structural stability, and compression efficiency. It implements adaptive control mechanisms that adjust flow parameters based on the current state of the manifold and the outcomes of recent modifications, ensuring that dreaming remains beneficial rather than disruptive.

A memory pruner 450 performs essential cleanup operations that prevent the manifold from becoming cluttered with obsolete or redundant structures. This component implements sophisticated forgetting mechanisms that go beyond simple deletion, carefully removing structures while preserving the integrity of surrounding geometry. It identifies candidates for pruning based on multiple criteria including thermodynamic decay where thoughts with consistently low activation energy are marked for removal, structural redundancy where nearly identical thought patterns exist in multiple locations, and semantic incoherence where thoughts no longer maintain meaningful connections to the broader manifold. Memory pruner 450 implements gradual pruning processes that slowly dissolve unwanted structures rather than creating abrupt deletions that could destabilize nearby regions. During pruning, it redistributes the "semantic mass" of removed thoughts to related structures, ensuring that useful aspects are preserved even as redundant representations are eliminated. The component also performs defragmentation operations that consolidate sparse regions and tighten the overall manifold structure. For example, after extended operation, the system might accumulate multiple slightly different representations of similar concepts acquired in different contexts. Memory pruner 450 identifies these redundancies and carefully merges them into single, more robust representations while preserving the unique aspects that provide contextual flexibility.

These components within dream manager 140 implement a process of autonomous cognitive evolution. Thought perturbator 400 explores the stability and potential of existing structures, thought recombinator 410 synthesizes new abstractions and connections, curvature editor 420 optimizes the geometric landscape, topological operation manager 430 enables fundamental structural innovations, dream flow manager 440 orchestrates coherent evolution, and memory pruner 450 maintains cognitive efficiency. This architecture enables the PCM to continuously improve its internal representations without external supervision, developing increasingly sophisticated reasoning capabilities through the natural evolution of its geometric substrate. The dreaming process transforms accumulated experience into structural wisdom, creating a manifold that not only stores knowledge but embodies understanding in its very geometry.

Figure 5:
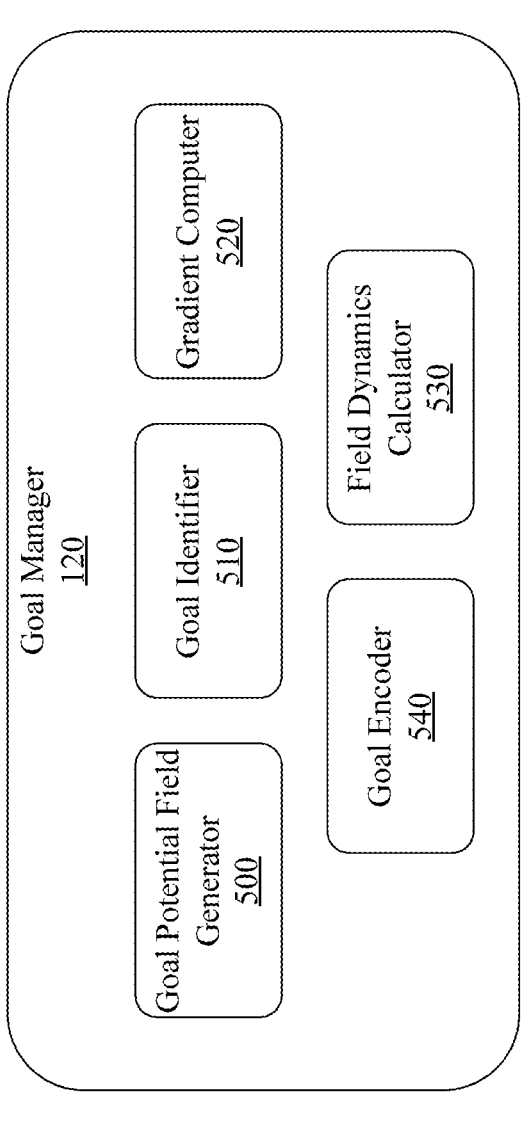
FIG. 5 is a block diagram illustrating an exemplary architecture of a component within a Persistent Cognitive Machine (PCM), a goal manager.

FIG. 5 is a block diagram illustrating an exemplary architecture of a component within a Persistent Cognitive Machine (PCM), a goal manager. Unlike traditional goal-directed systems that implement objectives as discrete targets or symbolic constraints, goal manager 120 generates continuous scalar fields that attract attention and guide reasoning through geometric influence. This component transforms abstract intentions, user queries, and system objectives into structured force fields that interact with the manifold's compression landscape to create rich cognitive dynamics.

A goal identifier 510 serves as the initial processing stage that recognizes, categorizes, and prioritizes various goal sources entering the system. Goal identifier 510 processes inputs from multiple channels including explicit user queries that directly state objectives or ask questions, implicit user patterns derived from interaction history and preferences, system-generated goals arising from internal drives such as uncertainty reduction or consistency maintenance, and task constraints imposed by external requirements or operational parameters. Goal identifier 510 implements parsing algorithms that go beyond keyword extraction to understand the semantic intent behind goals. When processing a user query such as "How can we apply quantum computing principles to optimize machine learning algorithms?", the component identifies multiple nested goals: understanding quantum computing principles, comprehending optimization in machine learning, finding intersection points between these domains, and generating practical applications. Goal identifier 510 also performs goal decomposition, breaking complex objectives into hierarchical subgoals that can be pursued in parallel or sequence. It maintains a goal registry that tracks active objectives, their priorities, interdependencies, and completion states. The component implements conflict detection mechanisms that identify when multiple goals may be contradictory or competing for the same cognitive resources, flagging these for special handling by other components. For long-term interactions, goal identifier 510 maintains persistent goal structures that evolve across sessions, enabling the system to pursue complex objectives that require extended reasoning or multiple interaction cycles.

A goal encoder 540 transforms identified goals from their raw representational form into geometric structures compatible with the manifold's architecture. This encoding process goes beyond simple embedding, creating rich geometric objects that can effectively influence manifold dynamics. Goal encoder 540 implements multiple encoding strategies tailored to different goal types. For similarity-based goals, it computes embedding vectors and defines potential fields, creating gradients that attract attention toward semantically similar regions. For constraint-based goals, it generates potential fields with low values in prohibited regions and high values in acceptable areas, effectively creating barriers and channels that guide reasoning. Goal encoder 540 also implements contrastive encoding for goals that require distinguishing between concepts, creating potential fields with opposing gradients that push attention away from certain regions while pulling toward others. For complex multi-faceted goals, goal encoder 540 generates composite fields that superimpose multiple potential patterns, creating rich landscapes with multiple attractors, saddle points, and gradient flows. The encoding process considers the current state of the manifold, adapting the potential field to work effectively with existing compression patterns and thought structures. For instance, when encoding a goal related to creative problem-solving, the component might generate a potential field with multiple local maxima in different semantic regions, encouraging exploration of diverse solution approaches rather than convergence on a single path.

A goal potential field generator 500 takes encoded goals and constructs the complete scalar field across the entire manifold. This component implements field generation algorithms that create smooth, differentiable potential landscapes while respecting the manifold's geometric constraints. The generator computes field values at each point by considering multiple factors including semantic distance from goal representations, alignment with goal constraints and requirements, historical success rates for similar goals in nearby regions, and interaction effects between multiple concurrent goals. Goal potential field generator 500 employs kernel methods to create smooth field variations, preventing discontinuities that could destabilize attention flow. It implements field normalization procedures to ensure that potential values remain within reasonable ranges across the manifold, preventing any single goal from completely dominating cognitive dynamics. Goal potential field generator 500 also generates time-varying fields for goals that evolve during reasoning, smoothly interpolating between different field configurations to maintain continuity. For hierarchical goals, it creates nested potential structures where achieving subgoals creates local maxima within the broader landscape of the primary objective. The generator must balance field strength to create sufficient attractive force without overwhelming the natural dynamics of compression and manifold structure. For example, when generating a field for a goal requiring innovative connections between disparate concepts, the component might create a potential landscape with a valley between the concepts that gradually rises, encouraging exploration of the intermediate space where novel connections might emerge.

A gradient computer 520 calculates the vector field that determines the direction and magnitude of goal-induced forces at each point in the manifold. This component implements efficient algorithms for computing gradients in curved space, accounting for the manifold's metric structure to ensure that gradients represent true geometric directions rather than naive coordinate derivatives. Gradient computer 520 employs multiple computational strategies including finite difference methods adapted for manifolds, automatic differentiation through the field generation process, and analytical gradients for simple field configurations. It computes not only first-order gradients but also higher-order derivatives such as the Hessian, which indicates the local curvature of the potential field and helps identify critical points such as maxima, minima, and saddle points. The component maintains a continuously updated gradient map across frequently accessed regions of the manifold, enabling rapid attention flow calculations without repeated gradient computation. For regions of high curvature or complex metric structure, gradient computer 520 implements adaptive sampling strategies that ensure accurate gradient estimation despite geometric complications. It also computes gradient statistics such as divergence and curl, providing insights into the global flow patterns induced by the goal field. These computations enable analyses of goal dynamics, identifying convergence regions where attention naturally flows, circulation patterns that might indicate conceptual loops, and divergence zones where exploratory behavior is encouraged.

A field dynamics calculator 530 analyzes and predicts the complex behaviors that emerge from the interaction between goal potential fields and the manifold's other forces. This component simulates how attention will flow under the combined influence of goal attraction, compression resistance, and the inherent dynamics of the attention field itself. Field dynamics calculator 530 implements several analytical capabilities including trajectory prediction that estimates likely attention paths given current conditions, stability analysis that identifies whether goal configurations will lead to stable focus or oscillatory behavior, and bifurcation detection that recognizes when small changes in goals might lead to dramatically different cognitive outcomes. The component models various emergent phenomena such as gradient following where attention flows smoothly up potential gradients toward goal regions, tunneling effects where strong goal potentials can overcome high compression barriers, and competitive dynamics where multiple goals create complex flow patterns with unpredictable outcomes. For multi-goal scenarios, field dynamics calculator 530 computes Pareto frontiers that identify optimal trade-offs between competing objectives, helping the system navigate complex decision spaces. It also analyzes temporal dynamics, predicting how goal influences will evolve as the manifold structure changes through use and learning. The component can identify potential failure modes such as local maxima that might trap attention before reaching true goals, unstable equilibria where small perturbations cause large behavioral changes, and chaotic regions where goal interactions create unpredictable dynamics. For instance, when analyzing goals that require balancing exploration with exploitation, field dynamics calculator 530 might identify parameter regimes where the system naturally alternates between focused pursuit and broad exploration, optimizing long-term learning and performance.

The components within goal manager 120 create a system for translating abstract objectives into concrete geometric influences that shape cognitive behavior. Goal identifier 510 recognizes and structures incoming objectives, goal encoder 540 transforms them into geometric representations, goal potential field generator 500 creates smooth scalar fields across the manifold, gradient computer 520 determines the resulting force fields, and field dynamics calculator 530 predicts and analyzes the emergent behaviors. This architecture enables the PCM to pursue complex goals not through rigid programming or symbolic planning, but through the natural dynamics of attention flowing through shaped space. Goals become not commands to be executed but influences that guide the fluid motion of thought, creating a form of intentionality that emerges from geometry rather than being imposed upon it. Goal manager 120 thus provides the motivational landscape that, combined with the manifold's memory structure and compression dynamics, enables purposeful yet flexible cognitive behavior that can adapt, learn, and discover unexpected solutions through the natural evolution of geometric attention.

Figure 6:
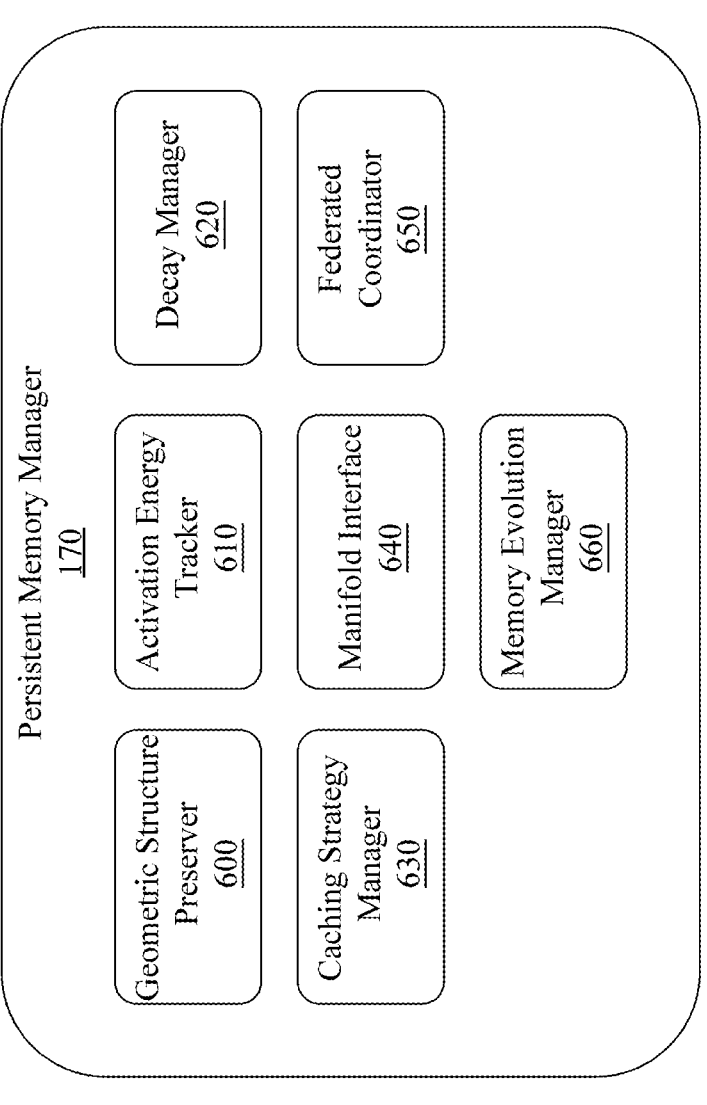
FIG. 6 is a block diagram illustrating an exemplary architecture of a component within a Persistent Cognitive Machine (PCM), a persistent memory manager.

FIG. 6 is a block diagram illustrating an exemplary architecture of a component within a Persistent Cognitive Machine (PCM), a persistent memory manager. Unlike traditional memory systems that store static data in hierarchical caches, persistent memory manager 170 implements an approach where memory exists as living geometric structures within the latent manifold, subject to natural evolution through usage patterns and energy dissipation. This component serves as the bridge between the dynamic latent manifold and long-term cognitive persistence, ensuring that thoughts-discrete units of reasoning or analysis generated during processing—are preserved not as isolated data points but as interconnected geometric structures with semantic relationships intact.

A geometric structure preserver 600 maintains the fundamental geometric integrity of stored thoughts and their relationships within the thought cache, a structured memory layer configured to store and retrieve thoughts based on semantic similarity, contextual alignment, and system policy. This component preserves thought bundles as compact submanifolds, maintaining their internal metric structure, boundary conditions, and topological relationships to neighboring bundles. When thoughts are cached, geometric structure preserver 600 ensures that not only the content but also the geometric context is maintained, including the local curvature patterns that indicate semantic density, the geodesic paths that connect related concepts, and the metric tensor values that define distances within thought neighborhoods. For instance, when storing a complex reasoning chain about quantum computing applications, the component preserves not just the individual thoughts but their geometric arrangement as a coherent bundle, maintaining the curved paths that connect foundational physics concepts to practical implementations. Geometric structure preserver 600 implements sophisticated algorithms to handle the challenges of preserving dynamic geometric structures, including maintaining consistency as the manifold evolves, handling coordinate transformations between different chart representations, and ensuring that preserved structures remain compatible with the current manifold geometry when retrieved later.

An activation energy tracker 610 implements the thermodynamic model of memory persistence by assigning and monitoring activation energies to each cached thought and thought structure. Activation energy tracker 610 goes beyond simple access counting, implementing a energy model where thoughts gain energy through various forms of cognitive engagement including direct retrieval for query processing, traversal along geodesic paths that pass near the thought, participation in successful reasoning chains, and reinforcement through goal achievement. Activation energy tracker 610 maintains a continuous energy landscape across all cached structures, tracking not just individual thought energies but also the energy distributions within thought bundles and along frequently traversed paths. Energy updates follow the principle that thoughts contributing to successful cognitive outcomes receive energy boosts, while those that remain unused gradually dissipate energy according to the thermodynamic decay equation. The tracker also implements energy inheritance mechanisms where new thoughts created through generalization—the process of synthesizing new thoughts from cached thoughts by identifying shared structure—inherit appropriate energy levels from their parent thoughts, ensuring that valuable abstractions maintain sufficient activation to persist.

A decay manager 620 implements the natural forgetting mechanism through thermodynamic principles, executing a decay equation. This component continuously monitors thought energies and initiates pruning operations when falls below the threshold, ensuring that the thought cache maintains efficiency by naturally eliminating obsolete or redundant information. Decay manager 620 implements pruning strategies that go beyond simple deletion, including gradual energy dissipation that allows thoughts to fade naturally rather than disappearing abruptly, redistribution of semantic content from decaying thoughts to related structures that remain active, and preservation of structural integrity by carefully removing thoughts without creating discontinuities in the manifold. Decay manager 1320 may also implement contextual decay modulation where decay rates adjust based on factors such as the semantic uniqueness of a thought, its role in connecting otherwise disparate concepts, and its participation in rarely accessed but critically important knowledge. For example, foundational mathematical concepts might decay more slowly than specific computational examples, preserving essential knowledge infrastructure while allowing detailed instances to fade when no longer needed.

A manifold interface 640 provides the bidirectional connection between persistent memory manager 170 and the latent manifold, enabling seamless flow of geometric structures in both directions. This interface implements protocols for reading geometric structures from memory into the active manifold, including reconstruction of thought bundles with their full geometric context, restoration of geodesic paths and their associated curvature patterns, and integration of retrieved structures with the current manifold state. When writing updates back to memory, manifold interface 640 captures not just the modified thoughts but the entire geometric context of their evolution, preserving information about new connections formed during reasoning, changes in local curvature due to compression or expansion, and trajectory patterns that indicate successful reasoning strategies. Manifold interface 640 maintains synchronization between the persistent memory structures and the dynamic manifold state, handling challenges such as version conflicts when the manifold has evolved since a thought was cached, geometric inconsistencies that arise from independent evolution of different regions, and efficient incremental updates that avoid rewriting entire structures for small changes.

A caching strategy manager 630 implements intelligent policies for determining which thoughts and structures to preserve in the various tiers of the thought cache, including session caches for short-term interaction, long-term caches for persistent knowledge, and shared or federated caches across devices or agents. Unlike traditional caching strategies based on recency or frequency alone, this component implements geometric and semantic criteria for cache management. Cached thoughts are indexed in latent space using sophisticated methods that preserve geometric relationships, enabling retrieval using vector similarity, trajectory proximity, or geodesic alignment. Caching strategy manager 630 implements compression strategies where cached thoughts may be compressed or abstracted over time to reduce redundancy and support scalable reuse. It determines optimal compression levels by balancing storage efficiency with retrieval fidelity, identifies opportunities for thought generalization where multiple similar thoughts can be replaced by a single abstraction, and manages the distribution of thoughts across cache tiers based on access patterns and semantic importance. The component also implements predictive caching strategies that anticipate future needs based on observed cognitive patterns and preemptively adjust cache contents to optimize for expected usage.

A federated coordinator 650 enables knowledge sharing and synchronization across multiple PCM instances while maintaining privacy and semantic integrity. Federated coordinator 1350 implements geometric abstraction protocols that allow thoughts to be shared at appropriate levels of generalization, ensuring that instance-specific details remain private while valuable patterns propagate across the federation. Federated coordinator 650 manages the complex challenges of cross-instance memory coordination including aligning geometric structures from different manifolds that may have evolved independently, determining appropriate abstraction levels for shared thoughts to balance utility with privacy, and handling conflicts when different instances have developed incompatible representations of similar concepts. Federated coordinator 650 implements consensus mechanisms that respect local geometric structures while enabling global knowledge emergence, using techniques such as curvature matching to identify compatible regions across manifolds, bundle projection to map local structures into shared space, and distributed evolution protocols that allow federated improvements to propagate back to local instances.

A memory evolution manager 660 orchestrates the various mechanisms through which persistent memory structures adapt and improve over time. Memory evolution manager 660 implements a plurality of evolution mechanisms that shape the long-term development of the memory system. Reinforcement operations strengthen frequently used thoughts and paths by increasing local curvature around valuable structures, tightening geodesic connections between related concepts, and enhancing the stability of successful reasoning patterns. Compression operations identify and merge redundant or highly similar structures, implementing the latent recombinator functionality to blend similar thoughts or trajectories into unified abstractions while preserving essential distinctions. Abstraction operations extract higher-level patterns from collections of specific instances, creating generalized thoughts that capture core principles while enabling broader application across contexts. Forgetting operations, coordinated with decay manager 620, ensure that memory evolution includes not just growth but also selective pruning that maintains system efficiency and relevance. Memory evolution manager 660 implements these operations according to sophisticated scheduling algorithms that balance immediate system needs with long-term optimization goals, ensuring that memory evolution enhances rather than disrupts ongoing cognitive operations.

The components create a persistent memory system that transcends traditional storage paradigms. Geometric structure preserver 600 maintains the rich relationships between thoughts, activation energy tracker 610 and decay manager 620 implement natural memory dynamics, manifold interface 640 enables integration with active cognition, the caching strategy manager 630 optimizes for both efficiency and semantic value, federated coordinator 650 enables collective intelligence while preserving privacy, and memory evolution manager 660 ensures continuous improvement through use. This architecture implements structured memory where thoughts are stored not as flat vectors but as positions or paths within an evolving manifold, supporting context-sensitive access, memory reinforcement through traversal, lawful pruning, and dynamic generalization. The result is a memory system that doesn't merely store information but actively participates in the cognitive process, shaping and being shaped by the ongoing evolution of thought within the geometric substrate of the Persistent Cognitive Machine.

Figure 7:
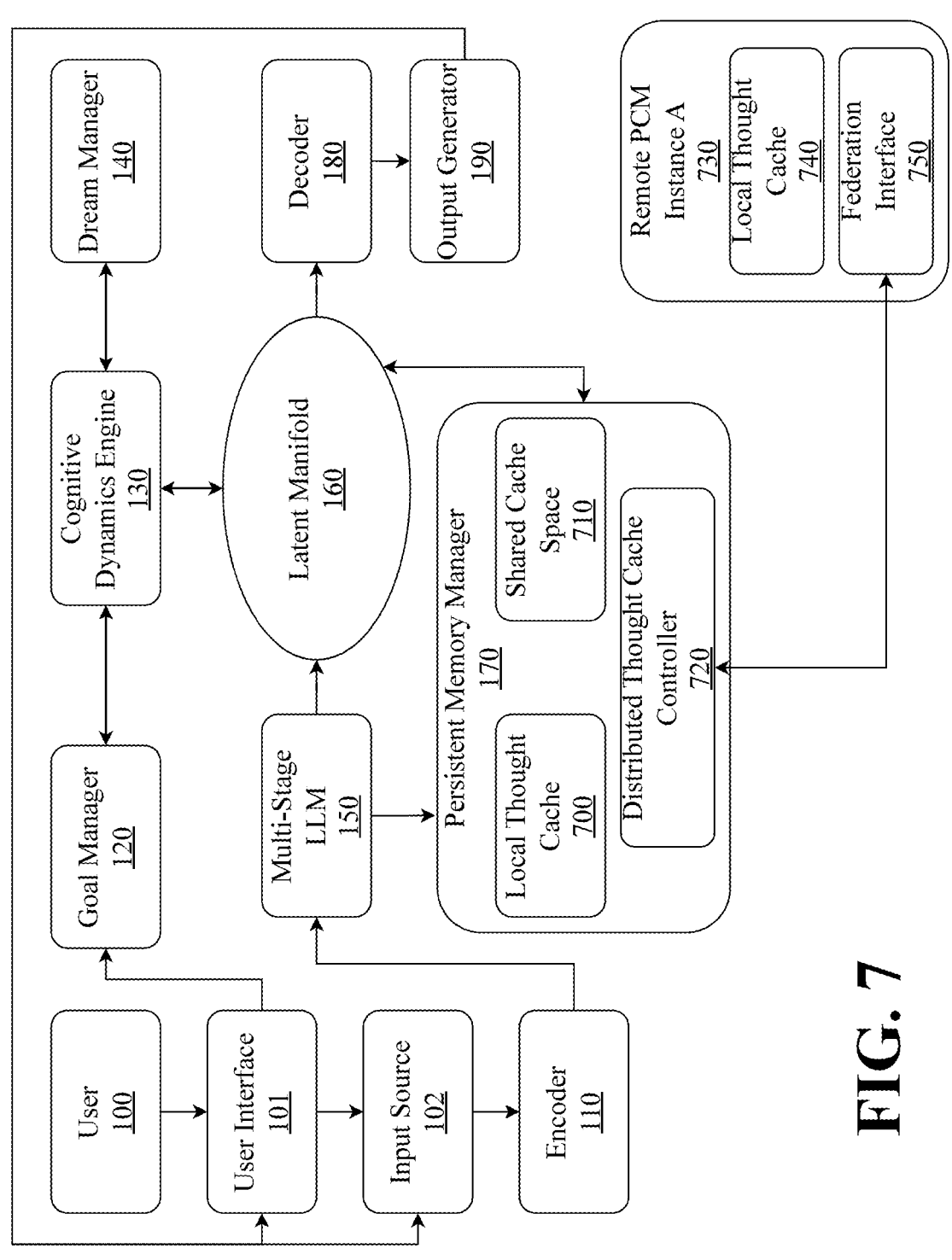
FIG. 7 is a block diagram illustrating an exemplary system architecture of a Persistent Cognitive Machine (PCM) enhanced with a distributed thought cache infrastructure.

FIG. 7 is a block diagram illustrating an exemplary system architecture of a Persistent Cognitive Machine (PCM) enhanced with a distributed thought cache infrastructure. The distributed thought cache architecture fundamentally transforms how the PCM manages and accesses cognitive memories by implementing a multi-tiered caching system that operates on geometric principles rather than traditional key-value storage, enabling logarithmic scaling of memory requirements even under continuous operation across federated instances.

A persistent memory manager 170 serves as an orchestrator for the distributed thought cache system, implementing geometric preservation and thermodynamic management of cached thoughts across multiple storage tiers. Unlike traditional memory systems that store static data in hierarchical caches, persistent memory manager 170 implements an approach where memory exists as living geometric structures within the latent manifold, subject to natural evolution through usage patterns and energy dissipation. The manager coordinates between a local thought cache 700 and a shared cache space 710, implementing intelligent policies for determining which thoughts and structures to preserve based on geometric and semantic criteria rather than simple recency or frequency metrics. Persistent memory manager 170 maintains connections with the latent manifold 160, enabling flow of geometric structures in both directions through protocols for reading geometric structures from memory into the active manifold and writing updates back to memory that capture not just modified thoughts but the entire geometric context of their evolution.

Local thought cache 700 represents a first tier of the distributed caching system, storing frequently accessed geometric structures specific to this PCM instance in their full geometric fidelity. Local cache 700 maintains thought trajectories as compressed latent representations that preserve not just content but the complete geometric context including local curvature patterns indicating semantic density, geodesic paths connecting related concepts, metric tensor values defining distances within thought neighborhoods, and activation energies that govern thermodynamic decay. When multi-stage LLM 150 receives an input that has been encoded by encoder 110, it first queries local thought cache 700 through geometric similarity measures that go beyond simple vector similarity to evaluate semantic alignment within the curved space of the manifold. These geometric similarity measures account for manifold curvature, considering not just Euclidean distances but geodesic proximity that respects the semantic topology of the space. For example, when processing a query about quantum computing applications, local thought cache 700 might contain previously computed trajectories through the manifold that connect foundational physics concepts to practical implementations, enabling rapid response generation without requiring full geodesic path computation through latent manifold 160.

Shared cache space 710 implements a second tier of caching that contains generalized thoughts suitable for sharing across multiple PCM instances while maintaining privacy through geometric abstraction. Unlike local thought cache 700 which stores instance-specific trajectories with full geometric detail, shared cache space 710 contains thoughts that have undergone progressive generalization through the process of synthesizing new thoughts from cached thoughts by identifying shared structure, meaning, or trajectory. This generalization process employs a latent recombinator functionality to merge semantically adjacent cached thoughts into higher-order templates through geometric consolidation, where nearby thoughts are averaged or abstracted into forms that preserve essential patterns while removing instance-specific details. Shared cache space 710 implements compression strategies where cached thoughts may be compressed or abstracted over time to reduce redundancy and support scalable reuse, determining optimal compression levels by balancing storage efficiency with retrieval fidelity. For instance, multiple PCM instances processing technical troubleshooting queries might independently develop similar reasoning trajectories for diagnosing equipment failures, and these trajectories can be generalized into shared templates that capture the diagnostic methodology without revealing specific equipment details or proprietary information.

A distributed thought cache controller 720 manages the coordination between local caching, shared caching, and cross-instance synchronization, implementing the cache hit/miss routing logic that determines when to serve requests from cache versus computing new trajectories. When a query arrives through user interface 101 and is processed by encoder 110, distributed thought cache controller 720 first attempts geometric matching against local thought cache 700 using geometric comparison techniques that evaluate both direct similarity to individual cached thoughts and alignment with thought bundles or trajectories. If the geometric matching fails to identify sufficiently relevant cached thoughts based on confidence thresholds that account for the quality of geometric matches, the specificity of the query, and the coverage of existing cached knowledge, distributed thought cache controller 720 routes the query to multi-stage LLM 150 for full computation. Distributed thought cache controller 720 implements predictive caching strategies that anticipate future needs based on observed cognitive patterns and preemptively adjust cache contents to optimize for expected usage, while also managing the thermodynamic decay process where thoughts with consistently low activation energy are marked for removal according to a decay equation.

A federation interface 750 on remote PCM instance A 730 enables privacy-preserving knowledge sharing and synchronization with the main PCM instance while maintaining semantic integrity across different manifold geometries. This interface implements geometric abstraction protocols that allow thoughts to be shared at appropriate levels of generalization, ensuring that instance-specific details remain private while valuable patterns propagate across the federation. Federation interface 750 employs curvature-compatible alignment functions that match geometric structures across instances while preventing reconstruction of detailed local information, using techniques such as differential privacy applied to manifold structures, homomorphic transformations that preserve reasoning capability while obscuring specific content, and selective geometric abstraction that shares patterns without revealing instances. When remote PCM instance A 730 develops a novel reasoning pattern in its local thought cache 740, federation interface 750 evaluates whether this pattern has sufficient generalization potential to benefit other instances, and if so, projects it into shared cache space 710 through bundle projection operations that map local structures into shared representational space while maintaining semantic relationships but abstracting instance-specific details.

The interaction between components creates a sophisticated caching ecosystem that enables remarkable scaling properties. As demonstrated in the scaling analysis, the number of distinct cached thoughts required to represent experiences grows logarithmically rather than linearly because new experiences are increasingly absorbed into existing attractor basins within the manifold. The cache hit rate exhibits logarithmic scaling over time according to, with tapering growth reflecting the saturation of core attractors. This scaling behavior is achieved through the continuous operation of geometric consolidation processes including local merging where nearby thoughts are averaged or abstracted into centroidal forms, trajectory folding where longer sequences of thoughts that traverse similar geodesics are compressed into unified trajectories, and cross-instance generalization where patterns discovered by individual PCM instances are abstracted and shared through the federation. For example, in a federated deployment across multiple industrial facilities, each PCM instance might initially develop its own local understanding of equipment behavior patterns, but over time these local insights consolidate into shared abstractions that benefit all instances while preserving facility-specific operational details in local caches.

The geometric matching algorithms employed by the distributed thought cache system represent a fundamental departure from traditional cache lookup mechanisms, implementing sophisticated comparison techniques that evaluate semantic alignment within the curved space of the manifold rather than simple key-value matching. When distributed thought cache controller 720 receives a query, it initiates a multi-stage matching process that begins with trajectory localization, projecting the query-encoded point onto the set of stored geodesics to identify candidate reentry points through a curvature-weighted projection operator. This operation identifies not just similar individual thoughts but plausible prior memory paths and locations along them from which semantic traversal can begin. The matching process evaluates multiple criteria including geodesic proximity measuring the minimal path length through the manifold between query and cached thoughts, semantic basin membership determining whether the query falls within the attraction region of existing thought bundles, trajectory compatibility assessing whether the query could naturally extend or branch from cached reasoning paths, and compression compatibility evaluating whether the query could be efficiently represented as a variation of cached patterns.

The privacy-preserving mechanisms implemented through federation interface 750 ensure that sensitive information remains protected while still enabling valuable knowledge sharing across instances. These mechanisms operate through geometric abstraction rather than traditional encryption, leveraging the natural information-theoretic properties of manifold projection to create abstractions that preserve reasoning patterns while obscuring specific details. When a thought trajectory from local thought cache 740 of remote PCM instance A 730 is selected for federation, it undergoes a series of transformations including dimensional reduction that projects high-dimensional instance-specific trajectories onto lower-dimensional shared subspaces, curvature smoothing that removes fine-grained geometric details while preserving overall trajectory shape, and semantic generalization that replaces specific concepts with broader categories while maintaining logical relationships. For instance, a detailed diagnostic trajectory for a specific pump model might be abstracted into a general troubleshooting pattern for rotating equipment, preserving the diagnostic methodology while removing proprietary specifications. Federation interface 750 implements consensus mechanisms that respect local geometric structures while enabling global knowledge emergence, using techniques such as curvature matching to identify compatible regions across manifolds, bundle projection to map local structures into shared space, and distributed evolution protocols that allow federated improvements to propagate back to local instances.

Dream manager 140 plays a role in the distributed thought cache system by performing autonomous curation and optimization of cached structures during idle periods. During dreaming phases, dream manager 140 interfaces with distributed thought cache controller 720 to initiate background processes that improve cache efficiency and discover new generalizations. The dream manager 140 samples cached thoughts from both local thought cache 700 and shared cache space 710 based on multiple selection criteria including but not limited to recent activation frequency, structural importance within the manifold topology, proximity to high-pressure regions indicating potential for compression, and participation in successful reasoning trajectories. It then applies perturbations drawn from distributions that reflect local geometric properties, where the covariance structure of the noise is derived from the local metric tensor and curvature, ensuring that perturbations respect the manifold's geometry while exploring meaningful variations. Through this process, dream manager 140 identifies opportunities for cache optimization including merging redundant cached thoughts that have converged to similar geometric configurations, promoting frequently accessed local patterns to shared cache space 710 for federation, discovering novel connections between cached thoughts that enable new reasoning pathways, and pruning obsolete cached structures that no longer contribute to cognitive efficiency.

The integration of distributed thought cache with the cognitive dynamics engine (CDE) 130 enables geometric operations on cached thoughts that go beyond simple storage and retrieval. CDE 130 continuously monitors the geometric health of cached structures through its curvature computer, calculating compression pressure fields across cached thought bundles and identifying opportunities for structural optimization. When cached thoughts are retrieved and utilized in active reasoning, CDE 130 tracks their traversal patterns and updates their geometric properties accordingly, implementing the principle that memory is not static but shaped by use. This bidirectional interaction means that frequently accessed cached thoughts develop deeper attractor basins with increased local curvature, making future retrieval more efficient, while rarely accessed thoughts experience geometric diffusion that eventually leads to their removal through thermodynamic decay. CDE 130 also manages the evolution of cached structures through its memory operation manager, implementing fanning-in operations that consolidate related cached thoughts into tighter bundle structures, fanning-out operations that enable cached bundles to expand into new semantic territories, and rebinding operations that create higher-order cached abstractions from multiple related thoughts.

Multi-stage LLM 150 leverages the distributed thought cache to dramatically improve response generation efficiency while maintaining cognitive coherence. Rather than processing every query through complete inference, LLM 150 first attempts to construct responses by composing cached thought trajectories, using the geometric structures preserved in cache to maintain semantic continuity. When a cache hit occurs, LLM 150 doesn't simply retrieve and output the cached content but uses it as a geometric scaffold for response generation, potentially modifying the cached trajectory based on the specific query context while preserving its essential structure. This approach enables the system to achieve response times that improve over time as the cache becomes more comprehensive, especially in specialized domains after initial learning periods. LLM 150 also contributes to cache evolution by generating new thoughts that are evaluated for caching based on their geometric stability, semantic coherence, generalization potential, and alignment with existing cached structures.

Output generator 190 incorporates awareness of cache utilization in its response generation, potentially indicating to users when responses are based on well-established cached patterns versus novel reasoning. This transparency enables users to understand the confidence and grounding of system responses, with cached-based responses typically exhibiting higher consistency and reliability due to their foundation in repeatedly validated reasoning patterns. Output generator 190 can also surface information about the reasoning path taken, including which cached thoughts or trajectories contributed to the response, enabling a form of explainable AI where users can trace the geometric journey through cached knowledge that led to specific conclusions.

The overall distributed thought cache architecture enables the PCM to achieve cognitive efficiency through geometric principles. Unlike traditional caching systems that face linear growth in storage requirements, the PCM's geometric approach achieves logarithmic scaling through continuous compression and generalization. The system maintains responsiveness even after processing millions of interactions because new experiences are increasingly absorbed into existing geometric structures rather than requiring new storage. The federation capabilities enable collective intelligence where multiple PCM instances contribute to a shared understanding while maintaining individual specialization and privacy. This architecture represents a fundamental advance in cognitive system design, demonstrating that memory need not be a bottleneck but can instead become an accelerator of intelligence through proper geometric organization and distributed coordination. The distributed thought cache thus serves not merely as a performance optimization but as an integral component of the PCM's cognitive architecture, enabling persistent learning, efficient reasoning, and scalable intelligence through the principled application of geometric memory management.

Figure 8:
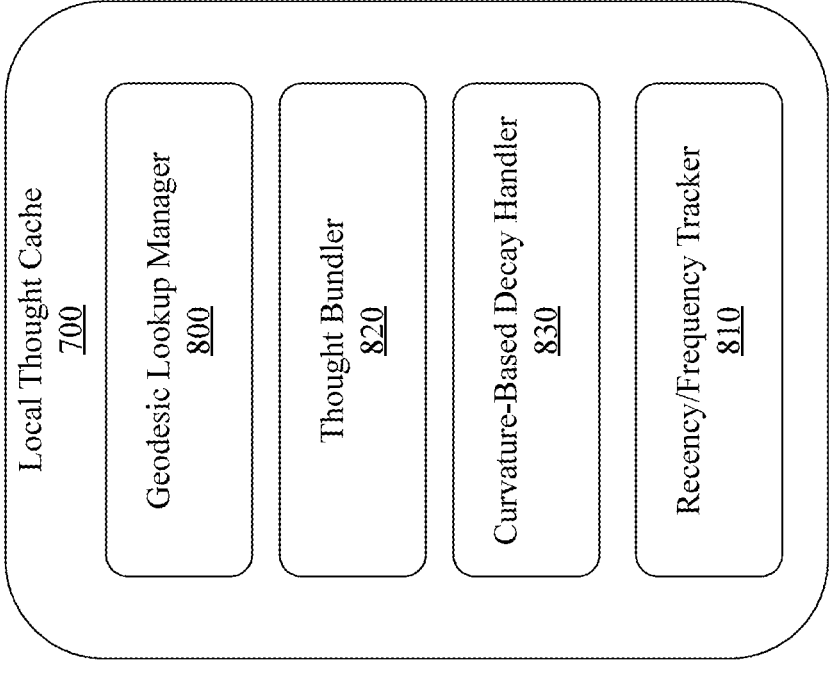
FIG. 8 is a block diagram illustrating an exemplary architecture of a local thought cache within the Persistent Cognitive Machine's distributed thought cache system.

FIG. 8 is a block diagram illustrating an exemplary architecture of a local thought cache within the Persistent Cognitive Machine's distributed thought cache system. Local thought cache 700 implements geometric storage and retrieval mechanisms that go beyond traditional key-value caching to maintain thoughts as living geometric structures with full semantic context, enabling rapid response generation through geodesic traversal rather than static lookup.

A geodesic lookup manager 800 serves as the primary retrieval mechanism within local thought cache 700, implementing geometric similarity matching that evaluates semantic alignment within the curved space of the latent manifold rather than simple vector distance calculations. When a query enters the cache system, geodesic lookup manager 800 performs trajectory localization by projecting the query-encoded point onto the set of cached geodesic paths, identifying not just similar individual thoughts but complete reasoning trajectories that could serve as scaffolds for response generation. This component maintains an indexed structure of cached thoughts organized by their positions within the manifold's geometry, using data structures optimized for high-dimensional curved space queries such as hierarchical navigable small world graphs adapted for Riemannian metrics. Geodesic lookup manager 800 evaluates multiple geometric criteria during retrieval including geodesic proximity measuring the minimal path length through the manifold between query and cached thoughts, basin membership determining whether the query falls within the attraction region of cached thought bundles, and trajectory compatibility assessing whether the query could naturally extend or branch from cached reasoning paths. For example, when processing a technical troubleshooting query, geodesic lookup manager 800 might identify multiple relevant cached trajectories that traverse similar problem spaces, ranking them by a combination of geometric proximity and semantic coherence to select the most appropriate cached knowledge for reuse.

A recency/frequency tracker 810 implements an activation energy model that maintains a thermodynamic view of cache contents. Each cached thought is assigned an activation energy that evolves according to both usage patterns and temporal decay, following the principle that frequently accessed thoughts maintain high activation energy while unused thoughts gradually dissipate energy according to the decay equation. Recency/frequency tracker 810 maintains not just access timestamps but complete usage histories that capture the context in which thoughts were activated, the success of reasoning paths that incorporated them, and their participation in cross-trajectory generalizations. This component implements energy inheritance mechanisms where new thoughts created through generalization inherit appropriate energy levels from their parent thoughts, ensuring that valuable abstractions maintain sufficient activation to persist in cache. The tracker also monitors energy distributions across the cache to identify thoughts at risk of decay, potentially flagging them for reinforcement through the dream manager if they retain structural importance despite low recent usage. For instance, foundational concepts in a technical domain might be accessed infrequently but maintain high structural importance, and recency/frequency tracker 810 can recognize these patterns and adjust decay rates accordingly to preserve essential knowledge infrastructure.

A thought bundler 820 implements the critical function of organizing related cached thoughts into coherent submanifolds that can be efficiently accessed and traversed as unified semantic structures. Rather than storing thoughts as isolated points, thought bundler 820 identifies patterns of co-activation and semantic similarity to create thought bundles-compact regions within the cache that represent coherent concepts or reasoning patterns. The bundling process employs geometric consolidation techniques including local merging where nearby thoughts with high semantic overlap are combined into centroidal representations, trajectory folding where repeated reasoning paths are compressed into canonical forms, and hierarchical organization where bundles can contain sub-bundles representing different levels of abstraction. Thought bundler 820 continuously monitors cached thoughts for bundling opportunities, using criteria such as geometric proximity within the manifold, frequency of co-activation in reasoning paths, semantic similarity based on content analysis, and structural compatibility for maintaining coherent bundle boundaries. When new thoughts enter the cache, thought bundler 820 evaluates whether they should be incorporated into existing bundles, form new bundles, or remain as isolated thoughts based on their geometric and semantic properties. This dynamic bundling process enables the cache to develop increasingly sophisticated organizational structures that mirror the natural conceptual organization of the domain, improving both retrieval efficiency and semantic coherence.

A curvature-based decay handler 830 implements an approach to cache management that uses the geometric properties of the manifold to guide memory persistence and forgetting. Unlike traditional cache eviction policies based solely on time or access patterns, this component leverages the local Ricci curvature of cached thoughts to determine their semantic importance and decay characteristics. High-curvature regions indicate semantic density where many concepts converge, suggesting important knowledge intersections that should be preserved, while low-curvature regions may represent isolated or redundant information suitable for more aggressive decay. Curvature-based decay handler 830 continuously computes local curvature metrics for cached thoughts using techniques such as geodesic deviation analysis to measure how nearby trajectories converge or diverge, sectional curvature calculations to assess the two-dimensional curvature of semantic planes, and scalar curvature aggregation to provide overall density measures. These curvature values modulate the base decay rates established by recency/frequency tracker 810, creating a sophisticated forgetting mechanism that preserves structurally important thoughts while allowing peripheral information to fade naturally. The handler also implements curvature-triggered consolidation, where regions of increasing curvature prompt the system to compress and generalize cached thoughts to prevent oversaturation. For example, as multiple similar troubleshooting experiences accumulate in a high-curvature region, curvature-based decay handler 830 might trigger consolidation into a generalized diagnostic pattern while allowing specific instance details to decay, maintaining the essential knowledge while preventing cache bloat.

The integration of these components creates a local thought cache 700 that functions as a living memory system rather than a static storage repository. Geodesic lookup manager 800 enables rapid retrieval based on semantic paths rather than exact matches, recency/frequency tracker 810 maintains a thermodynamic view of memory importance, thought bundler 820 creates efficient organizational structures that mirror conceptual relationships, and the curvature-based decay handler 830 ensures that the cache evolves to maintain optimal geometric structure. Together, these components enable local thought cache 700 to achieve cache hit rates that improve logarithmically over time, where the tapering growth reflects the saturation of core semantic attractors. This caching mechanism enables the PCM to maintain rapid response times even after processing millions of interactions, as new queries are increasingly likely to fall within the geometric neighborhoods of previously cached thoughts, allowing for efficient response generation through trajectory reuse and adaptation rather than complete recomputation.

Figure 9:
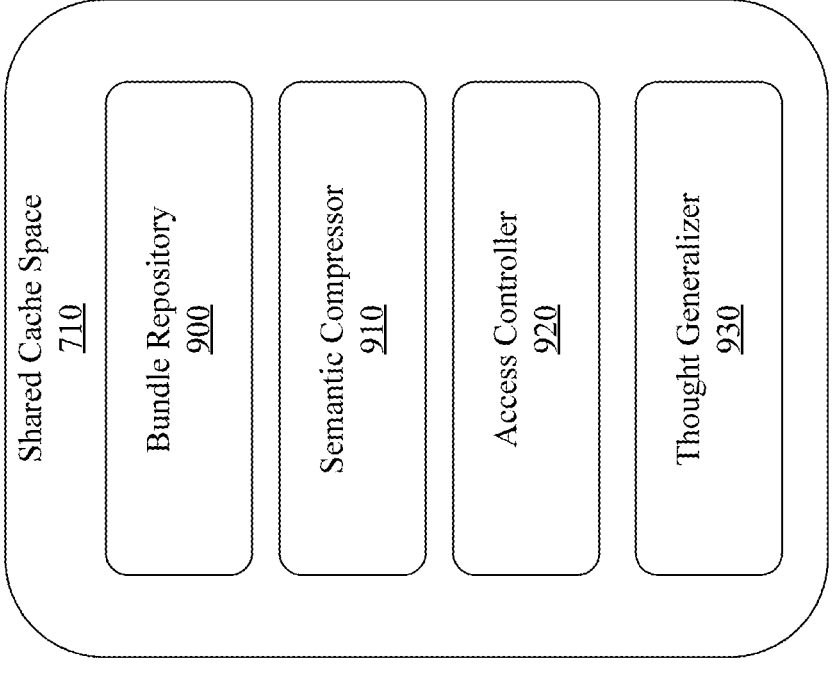
FIG. 9 is a block diagram illustrating an exemplary architecture of a shared cache space within the Persistent Cognitive Machine's distributed thought cache system.

FIG. 9 is a block diagram illustrating an exemplary architecture of a shared cache space within the Persistent Cognitive Machine's distributed thought cache system. Shared cache space 710 represents an innovation in distributed cognitive systems, implementing a form of collective intelligence where individual PCM instances contribute to and benefit from shared semantic structures without exposing instance-specific details or proprietary information.

A bundle repository 900 serves as the primary storage mechanism for generalized thought bundles that have been abstracted to a level suitable for cross-instance sharing. Unlike local thought cache which maintains full geometric fidelity, bundle repository 900 stores thought bundles that have undergone progressive generalization to remove instance-specific details while preserving essential reasoning patterns and semantic relationships. These shared bundles exist as compact submanifolds within a federated latent space, maintaining sufficient geometric structure to enable meaningful retrieval and traversal while abstracting away the fine-grained curvature details that might reveal sensitive information. Bundle repository 900 organizes shared bundles using a hierarchical structure that reflects different levels of abstraction, from specific technical procedures that have been anonymized to broad conceptual frameworks that emerge from the convergence of multiple instances' experiences. Each bundle in the repository maintains metadata including its generalization level indicating the degree of abstraction applied, contributing instances tracking which PCM instances have influenced its formation, semantic coverage defining the conceptual space it represents, and stability metrics measuring how consistently it has been validated across different contexts. For example, multiple PCM instances in industrial settings might independently develop diagnostic procedures for equipment failures, and bundle repository 900 would store the generalized diagnostic methodology as a shared bundle that captures the common reasoning pattern without revealing specific equipment models or proprietary maintenance procedures.

A semantic compressor 910 implements algorithms for reducing the representational complexity of thoughts while preserving their essential semantic content and reasoning structure. This component operates on the principle that shared knowledge should be maximally compressed to enable efficient storage and transmission while maintaining sufficient information for meaningful reuse across instances. Semantic compressor 910 employs multiple compression techniques including geometric simplification that reduces high-dimensional trajectories to lower-dimensional representations preserving key topological features, conceptual abstraction that replaces specific instances with categorical representations while maintaining logical relationships, and trajectory summarization that identifies the essential waypoints in reasoning paths while removing redundant intermediate steps. The compression process is guided by information-theoretic principles, seeking to minimize the description length of shared thoughts while maximizing their semantic coverage and reuse potential. Semantic compressor 910 also implements adaptive compression levels, applying stronger compression to frequently accessed patterns that have proven stable across multiple instances while maintaining higher fidelity for emerging or specialized knowledge that may require more nuanced representation. For instance, a complex troubleshooting trajectory involving multiple diagnostic steps might be compressed into a simplified decision tree that captures the essential logic while removing instance-specific measurement values or threshold parameters.

An access controller 920 manages the permissions and visibility rules that govern which PCM instances can access specific shared bundles and at what level of detail. This component implements an access control system based on geometric properties rather than traditional role-based permissions, using the natural information-theoretic properties of manifold projection to create different views of the same shared knowledge for different instances. Access controller 920 evaluates access requests based on multiple criteria including semantic alignment between the requesting instance's local manifold and the shared bundle's geometric structure, demonstrated competence in related domains based on the instance's contribution history, privacy constraints that may limit access to bundles derived from certain sources, and federation agreements that define sharing policies between groups of instances. Access controller 920 implements differential privacy techniques applied to geometric structures, ensuring that even with access to shared bundles, instances cannot reconstruct the specific details of contributing instances' local knowledge. Access controller 920 also manages temporal access patterns, implementing policies such as gradual revelation where new instances gain access to progressively more sophisticated shared knowledge as they demonstrate stability and contribution, or sunset provisions where certain shared bundles may become restricted or archived after specific time periods. For example, in a healthcare deployment, access controller 920 might allow all instances to access general diagnostic patterns while restricting access to specialized procedure bundles based on the instance's demonstrated expertise and compliance with privacy regulations.

A thought generalizer 930 represents an intelligence center within shared cache space 710, implementing the latent recombinator functionality that synthesizes new abstractions from multiple cached thoughts by identifying shared structure, meaning, and reasoning patterns. This component continuously analyzes the contents of both bundle repository 900 and incoming contributions from federation interfaces to identify opportunities for creating higher-order generalizations that capture emergent patterns across the distributed system. Thought generalizer 930 employs sophisticated algorithms for cross-instance pattern recognition including trajectory alignment that identifies similar reasoning paths across different geometric contexts, semantic clustering that groups related thoughts despite surface-level differences, and structural abstraction that extracts common logical frameworks from diverse specific instances. The generalization process involves weighted interpolation across semantically related bundles, creating meta-representations that lie in the geometric center of multiple specific instances while maintaining coherent semantic meaning. Thought generalizer 930 validates newly created generalizations through multiple criteria including semantic coherence measured through local manifold smoothness, compression potential indicating whether the generalization reduces overall system complexity, cross-instance applicability assessing how well the generalization transfers across different contexts, and stability under perturbation ensuring the generalization remains meaningful under slight variations. For instance, when multiple PCM instances contribute different approaches to optimizing industrial processes, thought generalizer 930 might identify common underlying principles such as constraint satisfaction, resource balancing, and performance monitoring, creating a generalized optimization framework that can be applied across diverse industrial contexts.

The integration of these components creates a shared cache space 710 that enables remarkable scaling properties for distributed cognitive systems. Bundle repository 900 provides organized storage for collective knowledge, semantic compressor 910 ensures efficient representation without loss of essential meaning, access controller 920 maintains privacy and appropriate knowledge distribution, and thought generalizer 930 continuously improves the shared knowledge base through progressive abstraction. This architecture enables the federated PCM system to achieve collective intelligence where the total knowledge of the system exceeds the sum of individual instances. Shared cache space 710 thus serves not merely as a communication mechanism between instances but as an active site of knowledge creation, where the interactions between different instances' experiences give rise to emergent understanding that benefits the entire federated system while respecting the autonomy and privacy of individual participants.

Figure 10:
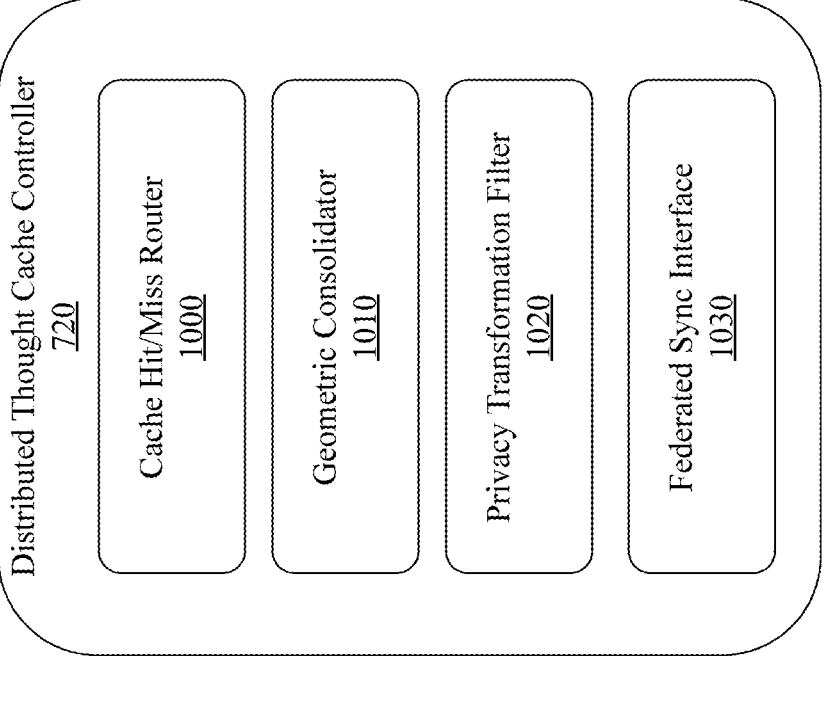
FIG. 10 is a block diagram illustrating an exemplary architecture of a distributed thought cache controller within the Persistent Cognitive Machine's distributed thought cache system.

FIG. 10 is a block diagram illustrating an exemplary architecture of a distributed thought cache controller within the Persistent Cognitive Machine's distributed thought cache system. Distributed thought cache controller 720 implements routing logic, geometric consolidation algorithms, privacy-preserving transformations, and federated synchronization protocols that together enable the remarkable scaling properties of the PCM's distributed memory system.

A cache hit/miss router 1000 serves as a decision engine determining whether incoming queries can be satisfied from cached thoughts or require full computation through the cognitive pipeline. Unlike traditional cache routers that perform simple key matching, cache hit/miss router 1000 implements multi-stage geometric matching that evaluates queries against cached content using sophisticated similarity measures within the curved space of the latent manifold. When a query arrives from the multi-stage LLM, cache hit/miss router 1000 performs a rapid preliminary scan using approximate nearest neighbor algorithms adapted for Riemannian metrics, identifying candidate cached thoughts that might satisfy the query. Cache hit/miss router 1000 then executes deeper geometric analysis on these candidates, evaluating multiple criteria including geodesic distance measuring the minimal path length through the manifold between query and cached thoughts, semantic basin overlap determining whether the query falls within the same attractor region as cached content, trajectory compatibility assessing whether cached reasoning paths could naturally extend to address the query, and confidence scoring that combines these factors to determine the likelihood of successful cache-based response generation. Cache hit/miss router 1000 implements adaptive thresholds that adjust based on domain characteristics and system load, becoming more permissive of approximate matches when response speed is important while requiring higher fidelity matches when accuracy is paramount. For example, in a technical support scenario, the router might identify that a new troubleshooting query about pump cavitation falls within the geometric neighborhood of previously cached queries about fluid dynamics problems, enabling rapid response generation by adapting the cached reasoning trajectory rather than computing an entirely new solution path.

A geometric consolidator 1010 implements the function of merging and organizing cached thoughts to prevent redundancy while improving retrieval efficiency and semantic coherence. This component continuously monitors the cache contents across both local and shared layers, identifying opportunities for consolidation based on geometric proximity and semantic overlap. Geometric consolidator 1010 employs algorithms for manifold-aware consolidation including trajectory folding where multiple similar reasoning paths are compressed into canonical representations, bundle merging where overlapping thought clusters are unified into coherent submanifolds, and hierarchical abstraction where specific instances are generalized into reusable templates. The consolidation process balances compression benefits against information preservation, using techniques such as curvature-weighted averaging that preserves high-curvature features representing important semantic distinctions while smoothing low-curvature regions representing redundant details. Geometric consolidator 1010 also implements incremental consolidation strategies that can operate continuously without disrupting cache availability, using copy-on-write mechanisms to create consolidated structures while maintaining access to original cached thoughts until the consolidation is validated. For instance, as multiple PCM instances contribute similar diagnostic procedures to the shared cache, geometric consolidator 1010 might identify common structural patterns and create a unified diagnostic framework that captures the essential reasoning while eliminating redundant variations, reducing the overall cache footprint while improving the semantic coverage of cached knowledge.

A privacy transformation filter 1020 implements sophisticated geometric abstraction techniques that enable knowledge sharing while protecting sensitive information, going beyond traditional encryption or access control to leverage the natural information-theoretic properties of manifold projection. When thoughts from the local cache are selected for federation to the shared cache space, privacy transformation filter 1020 applies a series of transformations designed to preserve reasoning patterns while obscuring instance-specific details. These transformations include but are not limited to dimensional reduction that projects high-dimensional local trajectories onto lower-dimensional shared subspaces, removing fine-grained details while preserving overall trajectory shape, curvature smoothing that eliminates local geometric features that might reveal specific operational parameters or thresholds, semantic generalization that replaces specific concepts with broader categories while maintaining logical relationships, and noise injection calibrated to add uncertainty without destroying the essential reasoning structure. Privacy transformation filter 1020 implements differential privacy guarantees by ensuring that the presence or absence of any individual thought in the local cache cannot be reliably inferred from the transformed shared representation. The filter also maintains transformation records that enable authorized instances to partially reverse transformations when necessary, implementing a form of homomorphic reasoning where computations can be performed on transformed thoughts without revealing the underlying details. For example, when sharing diagnostic knowledge from a proprietary industrial process, privacy transformation filter 1020 might abstract specific temperature and pressure values into qualitative ranges, replace equipment identifiers with generic functional descriptions, and smooth the detailed trajectory into a simplified reasoning pattern that captures the diagnostic logic without revealing trade secrets.

A federated sync interface 1030 manages the complex protocols for synchronizing cached thoughts across multiple PCM instances while maintaining consistency, managing conflicts, and optimizing network efficiency. This component implements a synchronization algorithm that goes beyond simple replication to actively manage the evolution of shared knowledge across the federation. Federated sync interface 1030 maintains connection state with remote PCM instances, tracking their synchronization status, available bandwidth, and trust relationships that determine sharing policies. The interface implements several synchronization modes including but not limited to eager synchronization for high-priority shared knowledge that should propagate immediately, lazy synchronization for routine updates that can be batched for efficiency, selective synchronization based on semantic relevance to avoid overwhelming instances with irrelevant updates, and conflict resolution protocols that handle cases where different instances have developed incompatible generalizations of similar concepts. Federated sync interface 1030 also implements bandwidth-aware transmission using the geometric compression techniques, prioritizing the synchronization of high-value shared knowledge while deferring lower-priority updates during network congestion. The interface maintains synchronization metadata including vector clocks for ordering updates across the distributed system, merkle trees for efficient detection of cache differences, and semantic digests that summarize cache contents for rapid comparison. For instance, when multiple industrial facilities share a federated PCM deployment, federated sync interface 1030 might prioritize synchronization of safety-critical diagnostic patterns while using lazy synchronization for routine operational optimizations, ensuring that knowledge propagates rapidly while managing network resources efficiently.

The integration of these components within distributed thought cache controller 720 creates an orchestration layer that enables the PCM's distributed cognition capabilities. Cache hit/miss router 1000 ensures efficient query resolution with minimal computational overhead, geometric consolidator 1010 maintains cache efficiency through intelligent organization, privacy transformation filter 1020 enables secure knowledge sharing across organizational boundaries, and federated sync interface 1030 coordinates the distributed evolution of collective intelligence. Together, these components enable the distributed thought cache system to achieve logarithmic scaling in storage requirements, near-linear speedup in response generation as cache hit rates improve, privacy-preserving knowledge sharing that enables collaboration without compromising proprietary information, and emergent collective intelligence where the federated system develops capabilities beyond any individual instance. Distributed thought cache controller 720 thus serves as the enabler of scalable, secure, and efficient distributed cognition in the PCM architecture.

sDescription of Method Aspects

FIG. 11 is a flow diagram illustrating an exemplary method for implementing distributed thought caching with geometric similarity matching and progressive consolidation within a latent manifold. In a first step 1100, receive a prompt from a user and encode it into a latent query trajectory within the manifold. This encoding process transforms the raw textual or multimodal input into a geometric representation that exists not as a static point but as a structured trajectory through the high-dimensional latent space. The encoding respects the existing geometric structure of the manifold, mapping the prompt into a region that maintains semantic coherence with the current state of the cognitive landscape. The resulting query trajectory captures not just the explicit content of the prompt but also implicit contextual relationships and potential inferential pathways, creating a rich geometric object that can be compared against cached memory structures using manifold-aware similarity measures rather than simple vector distances.

In a step 1110, determine whether the trajectory intersects a cached memory basin within a defined geodesic similarity threshold. This determination employs geometric analysis that goes beyond Euclidean distance calculations to evaluate true semantic proximity within the curved space of the manifold. A memory basin represents a region of the latent manifold associated with a previously reinforced or frequently reused trajectory, exhibiting high local curvature and geodesic convergence that serves as an attractor for memory reentry. The geodesic similarity threshold is computed using the manifold's metric tensor to measure the minimal path length between the query trajectory and cached memory basins, accounting for the local curvature that affects traversal cost. This geometric matching process evaluates multiple criteria including trajectory overlap measuring how much the query path coincides with cached paths, basin proximity determining whether the query falls within the gravitational influence of a memory attractor, and semantic coherence assessing whether the query could naturally extend or branch from cached reasoning patterns.

In a step 1120, if a cache hit is detected, retrieve the nearest thought bundle and reinstate the corresponding thought trajectory. This reinstantiation process does not simply replay a fixed latent code but generates a new trajectory that lies near the basin of recurrence left by the original path while satisfying present constraints imposed by the current geometry, goal conditions, and query specifics. Thought bundles, as localized compressible regions containing structurally similar or semantically aligned thoughts, provide rich contextual scaffolding for trajectory reconstruction. The reinstantiation adapts the cached trajectory to the current query context through geometric transformations that preserve the essential reasoning structure while allowing for contextual variations, creating a response path that benefits from prior experience while remaining responsive to current needs.

In a step 1130, if a cache miss occurs, invoke a generalization model to synthesize a compressed latent thought from the prompt trajectory. This synthesis process generates new cognitive content that is designed from inception to be cacheable and reusable, creating compressed representations that capture abstract reasoning patterns rather than specific instance details. The generalization model operates by identifying the essential semantic components of the prompt trajectory and constructing a thought representation that maintains these core elements while abstracting away incidental specifics. The resulting compressed latent thought exists as a structured object within the manifold, positioned to maximize its potential for future reuse while maintaining semantic fidelity to the original query.

In a step 1140, compare the new thought against recent entries in the local cache to detect geometric or semantic redundancy. This comparison employs manifold-aware similarity measures that evaluate not just content overlap but structural alignment within the curved geometry of the latent space. The redundancy detection process examines multiple aspects including geodesic proximity measuring whether the new thought falls within a threshold distance of existing cached thoughts, semantic overlap assessing conceptual similarity despite surface-level differences, trajectory compatibility determining whether the new thought could be merged with existing paths without loss of coherence, and compression potential evaluating whether consolidation would reduce overall cache complexity. The comparison utilizes the local metric tensor to ensure that distance calculations respect the manifold's geometry, preventing false positives from Euclidean proximity that doesn't reflect true semantic similarity.

In a step 1150, if overlap is detected above a threshold, consolidate the thought with existing bundles; otherwise, store it as a new entry. The consolidation process implements geometric merging algorithms that combine related thoughts while preserving their essential semantic content and reasoning structure. When consolidating, the method employs techniques such as but not limited to curvature-weighted averaging that preserves important semantic features while smoothing redundant details, trajectory folding that compresses multiple similar paths into canonical representations, and bundle expansion that incorporates new thoughts into existing semantic clusters. If the overlap falls below the threshold, the new thought is stored as a distinct entry, positioned within the cache according to its geometric properties and semantic relationships to establish appropriate connections for future retrieval.

In a step 1160, update the latent manifold's local curvature to reflect the addition or consolidation of the cached thought. This update process modifies the geometric structure of the manifold to incorporate the new or consolidated knowledge, implementing the principle that memory shapes the space in which cognition occurs. The curvature update follows differential geometric principles, adjusting the metric tensor in the neighborhood of the affected region to reflect the increased semantic density or modified trajectory patterns. For newly added thoughts, this typically involves creating a new attractor basin with appropriate curvature to facilitate future retrieval, while consolidation operations may deepen existing basins or smooth transitions between related regions. The curvature modifications propagate through the manifold according to geometric flow equations, ensuring smooth transitions and maintaining the overall coherence of the cognitive landscape while incorporating the new knowledge into the persistent memory structure.

FIG. 12 is a flow diagram illustrating an exemplary method for implementing federated synchronization of cached thoughts across distributed cognitive instances with privacy-preserving transformations. In a first step 1200, initiate synchronization based on time interval, usage metrics, or a remote request. This initiation process implements flexible triggering mechanisms that balance the need for knowledge sharing with resource efficiency and network constraints. Time-based synchronization occurs at predetermined intervals, enabling predictable update cycles that prevent cache divergence while avoiding excessive network traffic. Usage-based triggers activate when local cache patterns indicate potential value in federation, such as when new generalizations emerge from local processing or when cache hit rates suggest mature knowledge worth sharing. Remote-initiated synchronization enables on-demand knowledge transfer when peer instances require specific expertise or when collective problem-solving scenarios demand rapid knowledge convergence. The synchronization initiation evaluates current network conditions, available bandwidth, and pending updates to optimize the timing and scope of the synchronization operation.

In a step 1210, select candidate thoughts from the local cache based on relevance, reuse score, or compression value. This selection process implements intelligent filtering to identify thoughts most suitable for federation, avoiding information overload while maximizing the value of shared knowledge. Relevance assessment evaluates semantic alignment between local thoughts and known interests of peer instances, using manifold-based similarity measures to identify knowledge likely to benefit the broader community. Reuse scoring quantifies how frequently and successfully thoughts have been activated in local reasoning, with highly reused thoughts indicating stable, validated knowledge worth propagating. Compression value measures the generalization potential of thoughts, prioritizing those that capture broad patterns over instance-specific details. The selection algorithm balances these criteria while respecting local resource constraints and federation quotas, creating a curated set of thoughts that represents the most valuable contributions from the local knowledge base.

In a step 1220, apply a privacy transformation to each candidate thought, using curvature-preserving deformations or type-restricted masking. This transformation process implements geometric abstraction techniques that preserve reasoning patterns while obscuring sensitive details. Curvature-preserving deformations modify the geometric representation of thoughts while maintaining their topological structure and semantic relationships, analogous to how a rubber sheet can be stretched without tearing. These deformations smooth fine-grained geometric features that might reveal specific operational parameters while preserving the overall shape of reasoning trajectories. Type-restricted masking operates on typed latent entities, applying different transformation strategies based on semantic categories-facts might undergo parameter anonymization, opinions might have source attribution removed, and trajectories might be simplified to canonical forms. The privacy transformations ensure differential privacy guarantees by adding calibrated noise that prevents reconstruction of specific local details while maintaining the statistical properties necessary for meaningful reasoning.

In a step 1230, evaluate transformed thoughts against federation policy to determine eligibility for sharing. This evaluation implements multi-criteria assessment that goes beyond simple access control to consider the broader implications of knowledge sharing. Federation policies encode organizational constraints, regulatory requirements, and strategic considerations that govern information flow between instances. The evaluation examines transformed thoughts for residual sensitive information that might have survived the privacy transformation, assessing whether adversarial analysis could reconstruct protected details. Policy compliance checking verifies that thoughts meet requirements for data sovereignty, intellectual property protection, and industry-specific regulations. The evaluation also considers reciprocity principles, ensuring balanced knowledge exchange between participating instances. Thoughts failing policy evaluation are either rejected for federation or flagged for additional transformation, while approved thoughts proceed to the transmission phase.

In a step 1240, transmit selected thoughts to the shared cache and receive generalizations or updates from other instances. This bidirectional exchange implements efficient protocols for knowledge transfer while maintaining consistency across the distributed system. Transmission employs geometric compression techniques that exploit the manifold structure to minimize bandwidth requirements, sending compact representations that can be reconstructed at destination instances. The exchange protocol handles various scenarios including new thought contributions that expand collective knowledge, updates to existing shared thoughts that refine or correct previous generalizations, and deprecation notices for obsolete knowledge that should be removed from circulation. Reception of thoughts from other instances involves preliminary validation to ensure compatibility with local manifold structure and federation agreements. The exchange maintains transaction semantics to handle partial transfers, network failures, and conflicting updates, ensuring eventual consistency across the federated system.

In a step 1250, align received thoughts with local manifold geometry using a geodesic registration process. This alignment addresses the fundamental challenge that different instances may have evolved distinct geometric structures for representing similar knowledge, requiring transformation to integrate external thoughts meaningfully. Geodesic registration identifies correspondence points between the received thought's geometry and the local manifold structure, establishing mappings that preserve semantic relationships while adapting to local geometric conventions. The registration process employs iterative optimization to minimize distortion while maintaining thought coherence, similar to how geographic projections map curved surfaces onto planes. The alignment considers local curvature patterns, existing thought bundles that might absorb the new knowledge, and potential conflicts with established local understanding. This process ensures that federated knowledge integrates smoothly into the local cognitive landscape rather than existing as foreign artifacts.

In a step 1260, integrate accepted updates into the local cache and update metadata including timestamps and source provenance. This integration process goes beyond simple storage to actively incorporate new knowledge into the local cognitive structure. Integration may involve merging received thoughts with existing local knowledge when overlap is detected, creating new thought bundles when received knowledge represents novel domains, or refining existing cached trajectories based on collective insights from the federation. Metadata updates maintain tracking information including temporal markers for version control and conflict resolution, provenance chains documenting the origin and transformation history of thoughts, trust scores reflecting the reliability of source instances, and usage predictions based on the thought's success in other instances. The integration process triggers local manifold updates to accommodate the new knowledge, potentially adjusting curvature patterns, creating new semantic connections, and optimizing the overall geometric structure for improved future retrieval. This comprehensive integration ensures that federated knowledge becomes a natural part of the local cognitive system rather than remaining as isolated external contributions.

FIG. 13 is a flow diagram illustrating an exemplary method for implementing thermodynamic decay and geometric consolidation of cached thoughts to maintain optimal memory efficiency. In a first step 1300, continuously monitor each cached thought for changes in activation energy based on access frequency and recent traversal. This monitoring implements a thermodynamic model of memory where each thought maintains an activation energy that reflects its cognitive utility and relevance over time. The activation energy evolves according to both positive contributions from access events and negative decay from temporal passage. Access frequency contributes positive energy boosts not through simple counting but through weighted contributions that consider the context and success of each access-thoughts retrieved for successful reasoning receive larger energy increases than those accessed but ultimately unused. Recent traversal patterns also influence activation energy, with thoughts lying along frequently traveled geodesic paths receiving ambient energy from nearby cognitive activity, implementing a form of spreading activation within the geometric framework. The continuous monitoring maintains energy landscapes across the entire cache, enabling dynamic assessment of which thoughts remain cognitively vital versus those approaching obsolescence.

In a step 1310, detect thoughts whose energy has fallen below a predefined decay threshold. This detection process identifies candidates for removal or consolidation by comparing current activation energies against a threshold that represents the minimum viability for independent cache storage. The decay threshold is not a fixed value but adapts based on cache capacity, domain characteristics, and overall system activity levels, implementing a form of competitive memory dynamics where the threshold rises under storage pressure and relaxes when capacity is abundant. Detection employs efficient scanning algorithms that leverage the geometric organization of cached thoughts, focusing on regions of low activity rather than exhaustively checking every cached element. The process identifies not just individual thoughts below threshold but also clusters of low-energy thoughts that might benefit from collective handling, recognizing that geometric proximity often indicates semantic relationships suitable for consolidation.

In a step 1320, classify each low-energy thought as compressible or prunable based on geometric proximity to active bundles. This classification determines the appropriate handling strategy by evaluating whether the thought contains unique information worth preserving through consolidation or represents redundant content suitable for removal. Geometric proximity assessment goes beyond simple distance calculations to evaluate semantic relationships within the curved manifold space, considering factors such as geodesic distance to the nearest active thought bundle, alignment with bundle trajectories indicating potential for meaningful integration, and local curvature patterns suggesting whether the thought occupies a unique semantic niche. Compressibility analysis examines whether the thought's essential content can be absorbed into nearby bundles without significant information loss, using compression metrics that balance storage efficiency against semantic fidelity. The classification process recognizes that thoughts with unique geometric positions or high local curvature may warrant preservation despite low activation energy, as they might represent rare but important knowledge.

In a step 1330, if compressible, merge the thought into a nearby bundle and update the bundle metadata to reflect absorption. This merging process implements sophisticated consolidation algorithms that preserve essential semantic content while eliminating redundant storage. The merge operation employs geometric interpolation techniques that blend the low-energy thought into the target bundle's submanifold, using curvature-weighted averaging to maintain important features while smoothing unnecessary detail. Bundle metadata updates record the absorption event, tracking which thoughts have been consolidated, when the merger occurred, and what information might have been generalized or lost in the process. The merging adjusts the bundle's internal structure to accommodate the new content, potentially expanding its boundary, modifying its centroid, or creating internal subdivisions for distinct but related concepts. This consolidation enables the cache to maintain comprehensive coverage while reducing storage requirements, implementing a form of semantic compression where related thoughts coalesce into unified representations.

In a step 1340, if not compressible, remove the thought from cache and flag the local manifold region for curvature smoothing. This removal process eliminates obsolete thoughts while maintaining the geometric integrity of the surrounding cache structure. Removal is not a simple deletion but involves careful extraction that preserves the continuity of nearby geometric structures, similar to removing a node from a network while maintaining connectivity among remaining nodes. The flagging for curvature smoothing identifies regions where thought removal has created geometric discontinuities or irregular curvature patterns that could impede future traversal or retrieval. The removal process also checks for dependent structures that might be affected by the thought's absence, ensuring that the deletion doesn't create orphaned references or broken reasoning chains within the cache.

In a step 1350, adjust curvature metrics and pressure fields in the affected region to maintain geodesic continuity. This adjustment process repairs the geometric structure following thought removal or consolidation, ensuring smooth traversal paths and consistent semantic relationships. Curvature metric adjustments modify the local Ricci tensor to eliminate sharp discontinuities created by removal, implementing a form of geometric healing that redistributes curvature smoothly across neighboring regions. Pressure field updates recalculate the compression pressure in affected areas, ensuring that the removal of thoughts doesn't create artificial low-pressure voids that might attract inappropriate future caching. The adjustment process employs differential geometric techniques similar to Ricci flow, allowing the manifold to naturally evolve toward a stable configuration that maintains both local smoothness and global coherence. These adjustments ensure that future cognitive operations can traverse the modified regions without encountering unexpected geometric artifacts from the consolidation process.

In a step 1360, log the decay and consolidation event for use in future dreaming or synchronization routines. This logging creates a historical record that enables learning from decay patterns and optimizing future cache management strategies. The log captures comprehensive information about the decay event including the original thought's geometric properties and semantic content, the decay trajectory showing how activation energy evolved over time, the classification decision and rationale for compression versus pruning, and the resulting geometric modifications to the cache structure. This historical data feeds into dreaming processes that can identify systematic patterns in thought decay, potentially discovering which types of thoughts consistently become obsolete versus those worth preserving through early consolidation. Synchronization routines use decay logs to coordinate cache management across distributed instances, sharing insights about which thoughts tend to lose relevance and enabling proactive management strategies. The logging also supports debugging and optimization of decay parameters, allowing the system to tune decay constants, threshold values, and classification criteria based on empirical observations of cache evolution. This comprehensive logging ensures that the thermodynamic decay process becomes increasingly intelligent over time, learning from past consolidation decisions to maintain optimal cache efficiency while preserving valuable knowledge.

FIG. 14 is a flow diagram illustrating an exemplary method for implementing persistent cognitive computation through geometric representation and manipulation of thoughts within a dynamic latent manifold. In a first step 1400, receive an input from a user through an interface. This initial step establishes the entry point for external information into the cognitive process, where inputs may comprise natural language queries, multimodal data streams, commands, or any form of structured or unstructured information requiring cognitive processing. The interface serves as a bidirectional communication channel that not only receives inputs but maintains context from previous interactions, enabling coherent long-term dialogues where each new input can build upon established semantic foundations encoded within the geometric substrate.

In a step 1410, encode the input into a dynamic latent manifold characterized by an evolving geometric structure with variable curvature and time-dependent metric. This encoding process transforms raw external data into geometric representations within a high-dimensional space where semantic relationships are captured through curvature, distance, and topological features rather than static vector embeddings. The latent manifold operates as a living geometric substrate with a Riemannian or pseudo-Riemannian metric tensor that evolves based on usage patterns, wherein frequently accessed semantic regions develop distinct curvature characteristics that facilitate efficient navigation. The encoding respects existing manifold structure, placing new inputs in regions that maintain semantic coherence with previously encoded information while allowing the manifold itself to deform and adapt to accommodate novel concepts. This dynamic encoding ensures that the same input may be mapped to slightly different manifold locations at different times, reflecting the evolving understanding and context within the cognitive system.

In a step 1420, transform the encoded input into structured thought representations existing as persistent geometric regions within the latent manifold. Thoughts, as discrete units of reasoning or analysis generated during processing, are not mere points in space but extended geometric structures that may manifest as compact submanifolds, trajectories, or complex topological features. This transformation involves processing the encoded input through sophisticated algorithms that identify semantic components, establish relationships between concepts, and construct high-dimensional representations that capture not only explicit content but implicit contextual meanings and potential inferential pathways. The resulting thought structures exhibit internal geometry that reflects their semantic complexity, with simple atomic thoughts occupying relatively flat regions while complex structured thoughts may exhibit significant curvature and multi-dimensional extent. These thought representations become persistent features of the manifold, subject to future retrieval, recombination, and evolution through continued cognitive activity.

In a step 1430, compute trajectories through the latent manifold that minimize a cognitive cost function incorporating traversal effort and goal attraction. This computation implements geodesic attention, where focus or inference is achieved by computing minimal-energy paths through the manifold rather than discrete selection operations. The cognitive cost function balances multiple factors including kinetic energy that penalizes rapid shifts in attention, compression pressure derived from local semantic density that makes traversal through highly compressed regions more costly, and goal potential fields that create attractive forces toward relevant semantic areas. The trajectory computation employs variational principles to find paths that optimize this multi-factor cost function, resulting in smooth, continuous reasoning paths that respect the manifold's geometry while efficiently pursuing cognitive objectives. These trajectories may branch, merge, or exhibit complex topology depending on the interplay between manifold structure and goal requirements, enabling rich inferential patterns that go beyond linear reasoning chains.

In a step 1440, navigate computed trajectories through thought bundles comprising coherent submanifolds while retrieving relevant stored thoughts. Navigation involves traversing the computed paths while interacting with latent subspaces or thought bundles-localized, compressible regions containing structurally similar or semantically aligned thoughts. As trajectories pass through or near these bundles, relevant thoughts are activated and retrieved based on geometric proximity, semantic alignment, and contextual appropriateness. The navigation process respects bundle boundaries and internal structure, potentially following established paths within bundles that represent well-learned reasoning patterns or exploring novel connections between previously unrelated bundles. Retrieved thoughts contribute to the ongoing cognitive process, providing historical context, learned patterns, and relevant knowledge that enriches the current reasoning trajectory. This navigation implements a form of associative memory where retrieval is not based on exact matching but on geometric traversal through semantically organized space.

In a step 1450, execute autonomous manifold reorganization during idle periods through perturbation, recombination, and topological transformations. This dreaming process operates as a background mechanism for structural optimization and generalization discovery. Perturbation involves applying controlled stochastic variations to existing thought structures to test their stability and explore nearby semantic spaces. Recombination implements sophisticated interpolation and integration algorithms that synthesize new abstractions from existing thoughts, potentially discovering emergent patterns or generalizations not explicitly present in the original structures. Topological transformations may alter the fundamental connectivity of the manifold, creating new bridges between previously disconnected regions or splitting overly complex areas into more manageable components. These reorganization operations improve manifold efficiency, reduce redundancy, and enhance the system's capacity for creative inference and generalization, all while maintaining semantic coherence and preserving valuable learned structures.

In a step 1460, transform retrieved thoughts and reasoning paths from geometric representations back into interpretable outputs. This decoding process must interpret rich geometric information including positions within the manifold, traversed trajectories, local curvature contexts, and relationships between activated thought bundles. The transformation preserves not just the conclusions reached but the reasoning process itself, enabling explanatory outputs that reflect the structured path taken through semantic space. Decoding accounts for the multi-dimensional nature of thoughts, potentially generating outputs that capture nuanced relationships, conditional dependencies, and contextual qualifications that emerge from the geometric reasoning process. The decoded information maintains coherence with the original query while potentially introducing insights or connections discovered through manifold traversal that were not explicitly present in the input.

In a step 1470, generate a response while updating the manifold's geometry to reflect the interaction, shaping future cognitive pathways. Response generation synthesizes the decoded thoughts and reasoning paths into appropriate output formats while simultaneously modifying the underlying geometric substrate based on the completed cognitive cycle. Manifold updates may include but are not limited to strengthening frequently traversed paths through metric adjustment, increasing curvature around newly important semantic regions, establishing new connections between previously unrelated thoughts, and adjusting bundle boundaries to reflect evolved understanding. These geometric modifications ensure that future cognitive operations benefit from accumulated experience, with successful reasoning patterns becoming easier to traverse while maintaining flexibility for novel exploration. The bidirectional process of response generation and manifold update implements a form of continuous learning where each interaction contributes to the long-term evolution of the cognitive substrate, creating an increasingly sophisticated geometric landscape that embodies accumulated knowledge, learned patterns, and refined reasoning capabilities.

FIG. 15 is a flow diagram illustrating an exemplary method for implementing distributed thought caching with progressive generalization across multiple cognitive instances. In a first step 1500, receive an incoming query and match against cached thought representations using geometric similarity measures within the latent manifold. This initial matching process employs sophisticated geometric comparison techniques that go beyond simple vector similarity to evaluate semantic alignment within the curved space of the manifold. The thought cache, as a structured memory layer configured to store and retrieve thoughts based on semantic similarity, contextual alignment, or system policy, maintains indexed representations in latent space that can be accessed through multiple retrieval mechanisms. Geometric similarity measures account for manifold curvature, considering not just Euclidean distances but geodesic proximity that respects the semantic topology of the space. The matching process evaluates both direct similarity to individual cached thoughts and alignment with thought bundles or trajectories, enabling retrieval of relevant knowledge even when exact matches don't exist. This geometric matching approach allows for flexible retrieval that captures semantic relationships, analogical connections, and contextual relevance that would be missed by flat similarity metrics.

In a step 1510, route query to larger reasoning model upon cache miss to construct new generalized thoughts. When geometric matching fails to identify sufficiently relevant cached thoughts, the query triggers invocation of more comprehensive reasoning capabilities to generate new understanding. This routing decision is based on confidence thresholds that account for the quality of geometric matches, the specificity of the query, and the coverage of existing cached knowledge. The larger reasoning model processes the query with full computational resources, generating not just specific answers but generalized thoughts that capture abstract reasoning patterns suitable for future reuse. These newly constructed thoughts are designed from inception to be cacheable and generalizable, incorporating structured representations that encode not just conclusions but reasoning pathways, contextual dependencies, and semantic relationships that enable broad applicability across future queries.

In a step 1520, store newly generated thoughts as compressed latent representations capturing abstract reasoning patterns. The storage process implements sophisticated compression techniques that preserve essential semantic structure while reducing representational redundancy. Thoughts undergo geometric compression that identifies and preserves features such as key conceptual relationships, reasoning pathways that led to insights, contextual boundaries that define applicability, and connections to existing knowledge structures. The compressed representations maintain their geometric properties within the latent manifold, ensuring they can be properly integrated with existing cached thoughts and participate in future geometric operations. Compression occurs at multiple levels, from local optimization of individual thought representations to global reorganization of cache structure, ensuring efficient storage without loss of semantic fidelity or reasoning capability.

In a step 1530, merge semantically adjacent cached thoughts into higher-order templates through geometric consolidation. This merging process implements the generalization operation, synthesizing new thoughts from cached thoughts by identifying shared structure, meaning, or trajectory. The latent recombinator functionality examines geometric proximity and semantic alignment to identify candidates for consolidation, using criteria such as overlapping activation patterns, similar reasoning structures, compatible contextual constraints, and complementary knowledge domains. Geometric consolidation creates meta-thoughts that abstract common patterns while preserving distinctive features, employing manifold-aware interpolation techniques that respect curvature and maintain semantic coherence. The resulting higher-order templates serve as powerful generalizations that can match a broader range of future queries while maintaining specificity through parameterizable components that adapt to context.

In a step 1540, share generalized thoughts across distributed PCM instances using selective bundle projection. This sharing mechanism enables collaborative intelligence while respecting instance boundaries and privacy requirements. Selective bundle projection identifies portions of thought bundles suitable for sharing based on generalization level, privacy constraints, and cross-instance relevance. The projection process maps local geometric structures into a shared representational space that maintains semantic relationships while abstracting instance-specific details. Shared thoughts undergo geometric transformation that preserves their essential reasoning patterns and conceptual relationships while removing or generalizing contextual information tied to specific instances. This selective sharing enables different cognitive instances to benefit from collective learning without exposing sensitive or irrelevant local knowledge.

In a step 1550, maintain privacy through curvature-compatible alignment functions during cross-instance synchronization. Privacy preservation employs sophisticated geometric techniques that ensure knowledge sharing occurs at appropriate abstraction levels. Curvature-compatible alignment functions match geometric structures across instances while preventing reconstruction of detailed local information, using techniques such as differential privacy applied to manifold structures, homomorphic transformations that preserve reasoning capability while obscuring specific content, and selective geometric abstraction that shares patterns without revealing instances. The alignment process ensures that shared knowledge integrates properly with local manifold structures while maintaining boundaries that prevent unauthorized access to instance-specific information. This geometric approach to privacy enables rich knowledge sharing while providing mathematical guarantees about information disclosure limits.

In a step 1560, continuously improve cache hit ratios through progressive semantic consolidation. This ongoing optimization process analyzes cache performance metrics and identifies opportunities for structural improvement. Progressive consolidation examines patterns in cache hits and misses to identify frequently accessed semantic regions requiring enhanced representation, gaps in cached knowledge that lead to repeated cache misses, redundant representations that could be unified through further generalization, and emerging patterns in query streams that suggest new abstraction opportunities. The consolidation process operates continuously, making incremental improvements to cache structure through targeted operations such as merging highly correlated thoughts into unified representations, creating new intermediate abstractions that bridge frequently traversed semantic gaps, reorganizing bundle structures to improve retrieval efficiency, and pruning obsolete thoughts that no longer contribute to cache performance. This progressive refinement ensures that cache efficiency improves over time, with hit ratios increasing as the cache structure becomes better aligned with actual usage patterns and semantic requirements. The method creates a self-improving distributed knowledge system where each instance benefits from collective learning while maintaining autonomy and privacy through geometric abstraction principles.

FIG. 16 is a flow diagram illustrating an exemplary method for processing and integrating heterogeneous sensory data streams within a unified geometric cognitive framework. In a first step 1600, receive heterogeneous data streams including but not limited to visual, acoustic, textual, and sensor inputs. This reception process accommodates diverse information sources arriving asynchronously and in varying formats, encompassing traditional sensory modalities such as visual imagery with spatial and color information, acoustic signals containing temporal patterns and frequency spectra, textual data carrying symbolic and semantic content, as well as specialized sensor inputs including thermal readings, pressure measurements, electromagnetic signatures, and chemical compositions. The data streams may arrive at different rates, resolutions, and levels of completeness, requiring robust handling of partial information, noise, and temporal misalignment. Each modality brings unique information characteristics that must be preserved during initial processing while preparing for integration into a unified representational framework.

In a step 1610, encode each modality into unified latent hyperspace with distinct dimensional constraints (spectral, spatial, temporal, scale). This encoding process transforms diverse input modalities into a shared geometric representation while maintaining modality-specific properties through structured dimensional organization. Spectral dimensions capture frequency-domain characteristics including harmonic relationships in audio, color spectra in visual data, and oscillatory patterns in sensor readings. Spatial dimensions encode geometric relationships, topological structures, and positional information relevant to visual scenes, acoustic source localization, and distributed sensor networks. Temporal dimensions represent sequential dependencies, causal flows, and dynamic evolution patterns across all modalities. Scale dimensions enable hierarchical abstraction from fine-grained local details to global patterns and high-level semantic structures. The encoding process respects the intrinsic geometry of each modality while establishing cross-modal connections through shared latent regions, creating a rich multidimensional space where different sensory inputs can interact meaningfully while preserving their distinctive characteristics.

In a step 1620, perform geodesic traversal across multimodal manifold using modality-aware compression pressure fields. This traversal implements specialized navigation that accounts for the varying information density and semantic complexity across different modal regions of the manifold. Modality-aware compression pressure fields reflect the distinct compression characteristics of each sensory domain, with visual regions exhibiting high pressure around detailed textures and edges, acoustic regions showing compression around harmonic structures and temporal patterns, textual regions displaying semantic density around conceptual clusters, and sensor regions indicating measurement precision and uncertainty bounds. The geodesic paths computed through this multimodal landscape balance traversal costs across modalities, finding optimal routes that may transition between sensory domains when such transitions offer more efficient inference paths. The traversal process maintains awareness of modal boundaries and implements smooth transitions that preserve semantic continuity even when shifting between fundamentally different representational schemes.

In a step 1630, navigate between different modal representations while preserving semantic consistency. This navigation capability enables fluid movement across sensory boundaries without losing coherent meaning or breaking inferential chains. Cross-modal navigation employs geometric bridges that connect semantically related regions across different modalities, such as linking visual representations of objects with their acoustic signatures, textual descriptions with corresponding sensory patterns, and abstract concepts with their multimodal manifestations. The navigation process maintains semantic invariants during modal transitions through preservation of relational structures, contextual embeddings, and higher-order patterns that transcend individual modalities. Consistency preservation mechanisms ensure that conclusions drawn in one modality remain valid when translated to another, enabling robust reasoning that leverages the complementary strengths of different sensory channels while avoiding contradictions or semantic drift during cross-modal inference.

In a step 1640, define goal potential fields across multiple dimensions simultaneously to guide multimodal inference. This multidimensional goal specification creates complex potential landscapes that can express objectives spanning multiple sensory domains and abstraction levels. Goal potential fields may simultaneously specify visual targets such as specific object configurations or scene compositions, acoustic objectives including sound source identification or pattern matching, textual constraints defining semantic requirements or linguistic structures, and sensor thresholds establishing measurement criteria or anomaly boundaries. The simultaneous definition across dimensions enables rich goal specifications that capture the full complexity of multimodal objectives, creating gradient fields that guide attention and inference toward regions where multiple modal constraints are satisfied. These multidimensional potentials interact with the modality-specific compression fields to create nuanced cognitive dynamics where the path to goal satisfaction may involve strategic transitions between modalities based on information availability and inference efficiency.

In a step 1650, execute cross-modal bundle recombination during dreaming phases to create generalized multimodal representations. This dreaming process operates on the accumulated multimodal experiences to discover and reinforce cross-modal patterns and abstractions. During these phases, the method identifies thought bundles from different modalities that exhibit structural similarity or semantic alignment, applying sophisticated recombination algorithms that blend modal-specific features while preserving essential relationships. The recombination process creates meta-modal representations that capture invariant patterns across sensory domains, such as motion patterns that manifest similarly in visual and acoustic data, structural regularities that appear across multiple sensor types, and abstract concepts that find expression through various sensory channels. These generalized representations enable more efficient future processing by providing unified templates that can be instantiated across modalities, reducing redundancy and enabling rapid recognition of complex multimodal patterns.

In a step 1660, generate unified situational understanding by synthesizing information across all modalities. This synthesis process integrates the multimodal traversals, cross-modal navigations, and generalized representations into a coherent understanding that transcends individual sensory channels. The synthesis employs geometric integration techniques that combine information from different modal subspaces while respecting their relative reliabilities and complementary contributions. Unified understanding emerges from the convergence of multiple inferential paths through the multimodal manifold, where conclusions are reinforced by agreement across modalities or refined by modal-specific insights. The generated understanding maintains explicit representation of its multimodal foundations, enabling traceable reasoning that can identify which modalities contributed to specific conclusions and how cross-modal interactions influenced the final synthesis. This comprehensive situational awareness provides a rich, nuanced understanding that leverages the full spectrum of available sensory information while maintaining coherent semantic structure through geometric organization in the unified latent hyperspace.

Figure 17:
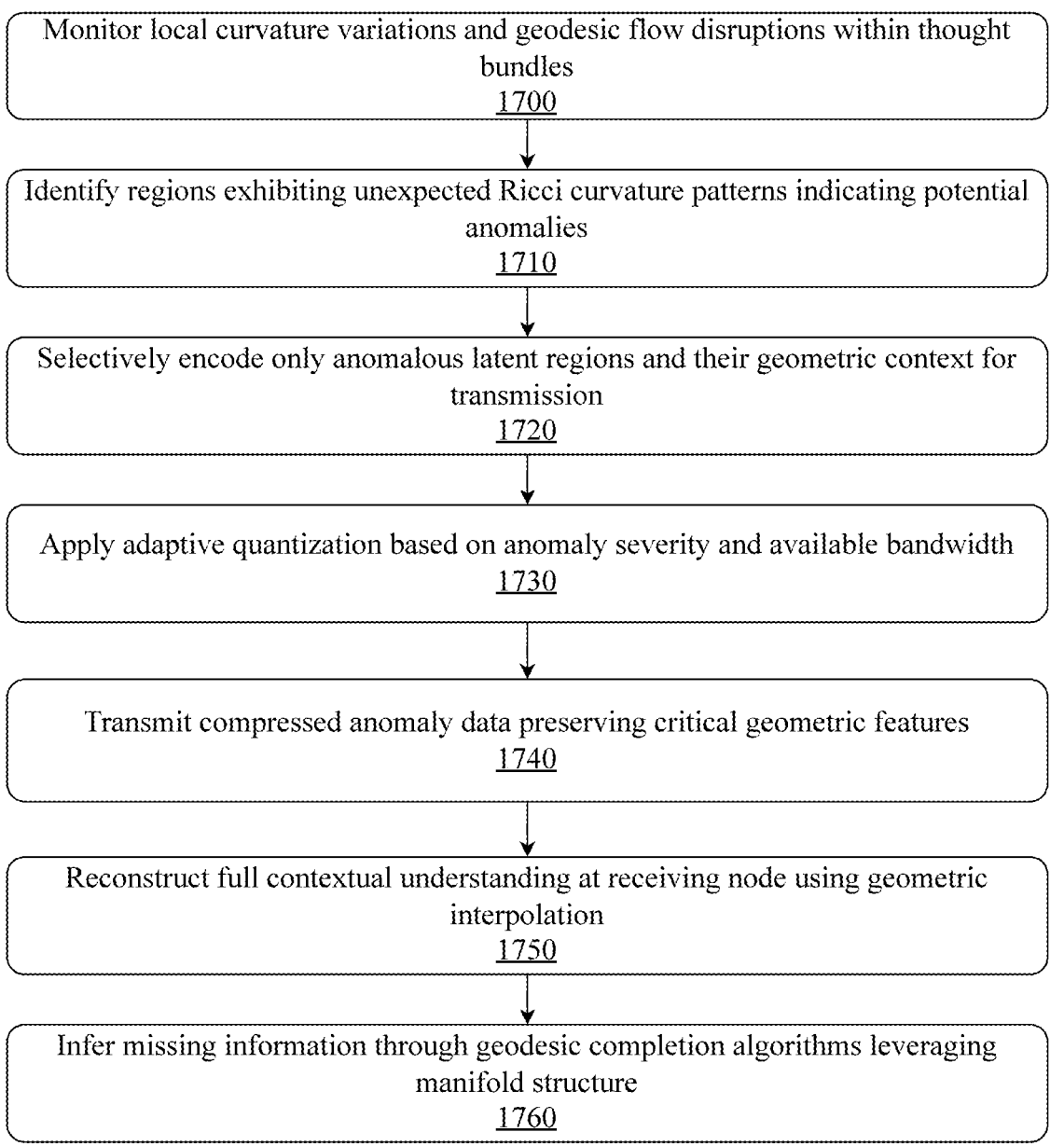
FIG. 17 is a flow diagram illustrating an exemplary method for detecting anomalies within cognitive manifolds and efficiently transmitting information through bandwidth-constrained channels using geometric compression and reconstruction techniques.

FIG. 17 is a flow diagram illustrating an exemplary method for detecting anomalies within cognitive manifolds and efficiently transmitting information through bandwidth-constrained channels using geometric compression and reconstruction techniques. In a first step 1700, monitor local curvature variations and geodesic flow disruptions within thought bundles. This monitoring process continuously tracks the geometric health of the latent manifold by observing how information flows through established cognitive structures. Thought bundles, as localized compressible regions containing structurally similar or semantically aligned thoughts, exhibit characteristic flow patterns under normal conditions where geodesic paths follow predictable trajectories through well-formed semantic spaces. The monitoring examines multiple geometric indicators including the smoothness of attention vector fields as they traverse bundle boundaries, the stability of local metric tensors within bundle interiors, the consistency of parallel transport along established reasoning paths, and the convergence or divergence rates of nearby geodesic trajectories. Disruptions in these flow patterns signal potential anomalies that warrant deeper investigation, such as unexpected turbulence in normally laminar regions, discontinuities in otherwise smooth semantic transitions, or irregular divergence patterns that break established geometric regularities.

In a step 1710, identify regions exhibiting unexpected Ricci curvature patterns indicating potential anomalies. This identification process analyzes the compression pressure field $P(x)=-R(x)$, where $R(x)$ represents the Ricci scalar curvature, to detect deviations from expected geometric patterns. Under normal conditions, thought bundles exhibit predictable curvature signatures based on their semantic content and usage patterns, with frequently accessed concepts showing higher but stable curvature, specialized knowledge domains maintaining consistent intermediate curvature, and exploratory regions displaying lower, more uniform curvature distributions. Anomalous patterns manifest as sudden spikes in curvature without corresponding semantic justification, irregular curvature oscillations within previously stable regions, inverted curvature relationships where sparse regions show unexpected compression, or curvature voids where expected semantic density disappears. These unexpected patterns often indicate underlying issues such as corrupted thought structures, emergent conceptual conflicts, novel information requiring manifold adaptation, or systemic problems affecting geometric integrity.

In a step 1720, selectively encode only anomalous latent regions and their geometric context for transmission. This selective encoding process implements intelligent data reduction by focusing transmission resources exclusively on information-rich anomalous regions while omitting normal background structure. The encoding captures not just the anomalous points themselves but sufficient geometric context to enable meaningful interpretation, including local manifold topology surrounding the anomaly, curvature gradients extending from normal to anomalous regions, geodesic paths that connect anomalies to known reference structures, and boundary conditions that delineate anomalous from normal regions. The selective encoding employs sophisticated algorithms that determine optimal context boundaries by analyzing information gradients radiating from anomaly centers, semantic dependencies that link anomalies to broader cognitive structures, and geometric continuity requirements for accurate reconstruction. This approach dramatically reduces transmission requirements while preserving the essential information needed to understand and respond to detected anomalies.

In a step 1730, apply adaptive quantization based on anomaly severity and available bandwidth. This quantization process dynamically adjusts encoding precision to optimize the trade-off between transmission efficiency and anomaly representation fidelity. Severity assessment considers multiple factors including the magnitude of curvature deviation from expected norms, the spatial extent of the anomalous region within the manifold, the rate of change in geometric parameters, and potential impact on cognitive operations. High-severity anomalies receive fine-grained quantization that preserves subtle geometric features helpful for accurate analysis, while lower-severity deviations undergo coarser quantization that captures essential patterns without excessive detail. Bandwidth-aware adaptation continuously monitors available transmission capacity and adjusts quantization parameters in real-time, implementing progressive encoding schemes that transmit core anomaly features first followed by refinement data, variable bit allocation that assigns more resources to some geometric features, and temporal multiplexing that balances multiple anomaly streams based on relative priorities.

In a step 1740, transmit compressed anomaly data preserving geometric features. The transmission process employs specialized compression algorithms designed to maintain geometric integrity despite aggressive data reduction. Preserved features during compression include but are not limited to topological invariants that define anomaly structure, curvature signatures that characterize deviation patterns, geodesic connectivity that links anomalies to the broader manifold, and semantic anchors that provide interpretive context. Compression techniques leverage the inherent structure of geometric data through differential encoding that transmits changes rather than absolute values, manifold-aware transforms that exploit local geometric regularities, predictive coding based on normal manifold behavior, and entropy coding optimized for geometric data distributions. The transmission protocol may include error protection mechanisms weighted toward preserving geometric consistency, ensuring that reconstruction errors don't fundamentally alter anomaly interpretation.

In a step 1750, reconstruct full contextual understanding at receiving node using geometric interpolation. This reconstruction process rebuilds comprehensive anomaly context from the sparse transmitted data by leveraging knowledge of manifold structure and geometric principles. Geometric interpolation techniques employed include but are not limited to geodesic interpolation that fills gaps along natural manifold paths, curvature field reconstruction using partial differential equations, metric tensor completion based on smoothness constraints, and topology inference from boundary conditions. The reconstruction process is guided by prior knowledge of normal manifold behavior, enabling intelligent filling of untransmitted regions through reference to similar known structures, application of learned geometric regularities, and constraint satisfaction based on manifold consistency requirements. The reconstructed context provides sufficient detail to understand not just what anomalies occurred but their relationship to the broader cognitive landscape, enabling appropriate response strategies.

In a step 1760, infer missing information through geodesic completion algorithms leveraging manifold structure. This inference process goes beyond simple interpolation to actively reconstruct probable missing information based on deep understanding of manifold geometry and semantic relationships. Geodesic completion algorithms trace partial paths through the manifold and extend them according to learned trajectory patterns, identifying likely path continuations based on curvature flow, semantic coherence along extended paths, and convergence toward stable attractor regions. The algorithms leverage manifold structure through multiple mechanisms including bundle membership inference that assigns reconstructed regions to appropriate semantic clusters, cross-bundle connection discovery that identifies probable relationships between separated anomalous regions, and temporal evolution modeling that predicts how anomalies might develop over time. This inference capability enables the receiving node to develop actionable understanding from minimal transmitted data, supporting effective anomaly response even in severely bandwidth-constrained environments while maintaining the geometric and semantic integrity essential for meaningful cognitive processing.

FIG. 18 is a flow diagram illustrating an exemplary method for analyzing technological evolution through patent document corpora and forecasting future inventions by tracking geodesic trajectories through time-evolving latent manifolds. In a first step 1800, encode time-indexed patent document corpora into evolving latent spaces using sliding temporal windows. This encoding process transforms collections of patent documents organized by publication time into dynamic geometric representations that capture the evolution of technological innovation. The sliding temporal windows, such as three-month periods with one-month overlap, create a sequence of overlapping document sets that enable smooth tracking of invention progression while maintaining temporal continuity. Each window's corpus undergoes encoding through sophisticated natural language processing and semantic analysis that extracts not just keywords and classifications but deeper structural patterns including technological dependencies, conceptual relationships, innovation trajectories, and cross-domain influences. The encoding process generates high-dimensional latent representations that preserve the rich semantic structure of patent information while enabling geometric analysis of how technologies evolve and interact over time.

In a step 1810, extract manifold structures representing compressible invention patterns within each time window. This extraction process identifies coherent geometric structures within each temporal latent space that correspond to meaningful technological themes and innovation clusters. The manifold extraction employs dimensionality reduction and structure discovery techniques that reveal underlying patterns in the high-dimensional patent representations, identifying regions of dense innovation activity corresponding to hot technological areas, sparse regions indicating unexplored or emerging fields, curved paths connecting related inventions across domains, and topological features revealing innovation barriers or breakthroughs. Compressible patterns emerge where multiple patents share fundamental conceptual structures despite surface differences, enabling the identification of core technological principles that drive innovation within specific periods. The extracted manifolds capture not just static snapshots but the dynamic terrain of technological possibility within each time window.

In a step 1820, compute transition maps between adjacent temporal manifolds to track invention evolution. These transition maps capture how the landscape of innovation transforms from one time period to the next, encoding both gradual evolution and disruptive changes. The computation of transition maps involves sophisticated alignment algorithms that match corresponding structures across temporal boundaries while accounting for the emergence of novel concepts, the obsolescence of outdated technologies, the transformation of existing ideas into new forms, and the migration of innovations across domain boundaries. The maps are learned through analysis of patents that appear in overlapping windows, tracking how their latent representations shift as the surrounding technological context evolves. These transition operators encode the dynamics of technological progress, capturing patterns such as convergent evolution where disparate technologies merge, divergent innovation where single concepts spawn multiple directions, and paradigm shifts where entire regions of the manifold undergo radical transformation.

In a step 1830, identify invention families as geodesic trajectories through the evolving latent space. This identification process traces the paths of related inventions as they develop over time, revealing the continuous threads of innovation that connect early concepts to their mature realizations. Invention families manifest as geodesic trajectories. These trajectories exhibit characteristic properties including consistent directionality indicating focused technological development, smooth curvature reflecting incremental innovation, and branching patterns where core technologies spawn multiple applications. The geodesic nature of these paths reflects the principle of least action in innovation, where technological development tends to follow paths of minimal resistance through the space of possibilities. By analyzing these trajectories, the method reveals how inventions build upon predecessors, how technological capabilities accumulate over time, and how breakthrough innovations create new directions for future development.

In a step 1840, project novel invention clusters forward using learned transition operators. This projection employs the composed transition maps to extrapolate current innovation patterns into future time periods. The projection process identifies clusters of recent inventions representing technological frontiers and applies learned dynamics to predict their evolution. The forward projection accounts for multiple factors including momentum of current research directions, convergence patterns between previously separate fields, saturation effects in mature technological areas, and emergence of enabling technologies that open new possibilities. The projection generates future manifold regions that represent plausible technological landscapes, maintaining geometric consistency with historical patterns while allowing for novel combinations and breakthrough possibilities that respect the learned dynamics of innovation.

In a step 1850, sample points from projected future manifold regions to generate speculative inventions. This sampling process explores the predicted future technological landscape to identify specific innovation possibilities. Sampling strategies include but are not limited to focused sampling around high-potential regions identified through projection analysis, exploratory sampling in sparse areas representing untapped opportunities, interpolative sampling between projected clusters to identify bridging technologies, and perturbative sampling that tests variations on projected trajectories. Each sampled point represents a potential future invention embedded within the projected technological context. The sampling process maintains geometric coherence, ensuring that generated points respect the manifold structure and exhibit plausible relationships to projected innovation clusters. Multiple samples capture the range of possibilities within predicted technological domains, from incremental improvements to radical innovations.

In a step 1860, decode sampled points into hypothetical patent titles or abstracts representing technological forecasts. This decoding process transforms abstract geometric representations back into human-interpretable descriptions of potential future inventions. The decoder leverages the semantic structure preserved through the encoding and projection process to generate coherent technological concepts that reflect the position and context of each sampled point. Generated titles and abstracts maintain consistency with patent language conventions while introducing novel combinations of concepts that emerge from the geometric positioning within projected manifolds. The decoding process produces outputs that capture both the specific technical features suggested by the geometric location and the broader technological context implied by surrounding manifold structure. These hypothetical patents serve as concrete illustrations of predicted technological directions, providing actionable insights for research planning, investment strategies, and innovation policy.

In a step 1870, validate predictions through geodesic continuity and semantic coherence metrics. This validation ensures that forecasted inventions represent plausible technological developments rather than arbitrary extrapolations. Geodesic continuity validation verifies that predicted inventions lie along smooth extensions of historical innovation trajectories, maintaining consistent development patterns with established technological paths, exhibiting reasonable innovation velocities based on historical rates, and preserving topological relationships with existing technology clusters. Semantic coherence metrics evaluate whether predicted inventions maintain meaningful technological content through analysis of conceptual consistency with domain knowledge, technical feasibility given projected capabilities, market and application relevance, and compatibility with emerging technological ecosystems. The validation process provides confidence measures for each prediction, enabling prioritization of forecasts most likely to represent genuine future innovations. This systematic validation ensures that the method produces actionable technological intelligence grounded in rigorous analysis of innovation dynamics rather than speculative fantasy.

FIG. 19 is a flow diagram illustrating an exemplary method for implementing multi-level cognitive processing through hierarchically nested latent manifolds. In a first step 1900, establish multiple nested latent hyperspaces encoding cognitive abstractions at different conceptual scales. This establishment creates a hierarchical structure where each level represents a different granularity of cognitive representation. The highest levels encode broad abstract concepts, general principles, and overarching patterns that span multiple domains. Intermediate levels capture domain-specific knowledge, categorical relationships, and structured methodologies. Lower levels represent detailed implementations, specific instances, and concrete operational parameters. Each hyperspace maintains its own geometric structure with appropriate dimensionality for its abstraction level, where abstract spaces may have lower intrinsic dimension but higher curvature reflecting conceptual density, while detailed spaces exhibit higher dimension but flatter local geometry accommodating specific variations. The nesting relationship ensures that detailed thoughts exist within the scope of their governing abstractions, creating a natural hierarchy that mirrors how complex knowledge organizes from general principles to specific applications.

In a step 1910, maintain geometric relationships between nested manifolds through projection operators preserving semantic consistency. These projection operators map between different hierarchical levels while preserving essential semantic relationships and structural coherence. The operators implement sophisticated transformations that aggregate detailed information when projecting upward to abstract levels, capturing essential patterns while abstracting away specifics, and instantiate abstract concepts when projecting downward, generating plausible detailed realizations guided by higher-level constraints. Semantic consistency preservation ensures that meanings remain stable across levels through maintenance of relational structures between concepts, preservation of logical dependencies and constraints, and conservation of semantic distance relationships appropriately scaled for each level. The projection operators adapt dynamically as the manifolds evolve, learning from traversal patterns to improve cross-level mappings and maintaining homeomorphic relationships that prevent semantic drift during repeated projections.

In a step 1920, propagate goal potential fields downward through hierarchy while aggregating compression feedback upward. This bidirectional information flow creates a unified cognitive dynamics across all abstraction levels. Goal potential fields defined at abstract levels cascade downward through the hierarchy, becoming progressively more specific and actionable at each level. The downward propagation transforms high-level objectives into concrete subgoals, distributes potential gradients to guide detailed implementations, and maintains goal coherence while allowing level-appropriate interpretations. Simultaneously, compression pressure information aggregates upward from detailed levels, informing abstract levels about implementation complexity, resource constraints, and feasibility boundaries. This upward flow enables abstract reasoning to remain grounded in realistic constraints while providing feedback about which high-level approaches lead to tractable implementations. The bidirectional flow creates a dynamic equilibrium where abstract goals shape detailed actions while implementation realities inform strategic planning.

In a step 1930, navigate between abstraction levels using geometric bridges at manifold intersections. These bridges represent semantic connections that enable fluid movement between conceptual scales without discontinuous jumps. Navigation utilizes specialized geometric structures at level boundaries including transition zones where adjacent levels share overlapping representations, portal regions providing efficient access points between levels, and connector pathways that maintain semantic continuity during level transitions. The navigation process selects appropriate bridges based on current cognitive context, required level of detail, and semantic alignment with ongoing reasoning. Bridge traversal implements smooth interpolation between abstraction levels, gradually adjusting representational granularity, maintaining inferential coherence across transitions, and preserving relevant context while shifting focus. This enables cognitive processes to fluidly zoom in for detailed analysis or zoom out for strategic overview as needed by the task at hand.

In a step 1940, dynamically adjust operating level based on task complexity and required detail resolution. This adjustment mechanism continuously evaluates cognitive demands and selects the most appropriate hierarchical level for current processing. Task complexity assessment considers factors such as the breadth of domains involved requiring higher-level integration, the specificity of required outputs demanding detailed representation, the novelty of problems potentially requiring multiple levels, and time constraints favoring appropriate abstraction levels. The dynamic adjustment implements smooth transitions between levels rather than discrete switches, maintaining partial activation across multiple levels when tasks require integrated processing. The mechanism learns optimal level selection strategies through experience, developing heuristics for rapid level identification and maintaining statistics on task-level associations. This adaptive behavior ensures efficient cognitive resource utilization by operating at the simplest level sufficient for task requirements while enabling rapid escalation to more complex levels when needed.

In a step 1950, perform cross-level bundle reorganization during dreaming to optimize nested structure. This reorganization process operates during inactive periods to improve the hierarchical organization and cross-level connectivity. Bundle reorganization examines thought bundles across all levels to identify opportunities for better hierarchical alignment, including promoting frequently accessed detailed bundles to higher abstraction levels, decomposing overly complex abstract bundles into hierarchical components, and creating new intermediate levels when gaps in the hierarchy impede smooth navigation. The process implements sophisticated recombination algorithms that respect level-appropriate constraints while enabling creative restructuring. Cross-level optimization ensures that related concepts maintain appropriate geometric relationships across the hierarchy, frequently traversed paths between levels become more efficient, and the overall hierarchical structure evolves to match actual usage patterns. This dreaming-phase reorganization enables the hierarchical system to adapt its structure based on accumulated experience, becoming progressively more efficient at supporting the specific types of multi-level reasoning required by its task domain.

In a step 1960, enable seamless flow between abstract concepts and detailed implementations through geodesic pathways. This final step ensures that the hierarchical structure supports fluid cognitive movement across all conceptual scales. Geodesic pathways through the nested manifolds are computed to minimize traversal cost while maintaining semantic coherence, creating smooth reasoning chains that can start with high-level objectives and flow naturally to specific actions, or begin with detailed observations and ascend to general principles. These pathways leverage the optimized hierarchical structure to provide multiple routes between levels, enabling flexible reasoning strategies, redundant paths for robustness, and creative connections between previously unrelated concepts at different scales. The seamless flow supports various cognitive operations including top-down planning from strategy to tactics, bottom-up learning from examples to principles, middle-out reasoning that connects theory with practice, and lateral thinking that bridges across hierarchies. This comprehensive connectivity ensures that the hierarchical cognitive system can fluidly adapt its processing level to match task demands while maintaining the rich interconnections that enable sophisticated multi-scale reasoning.

Figure 20:
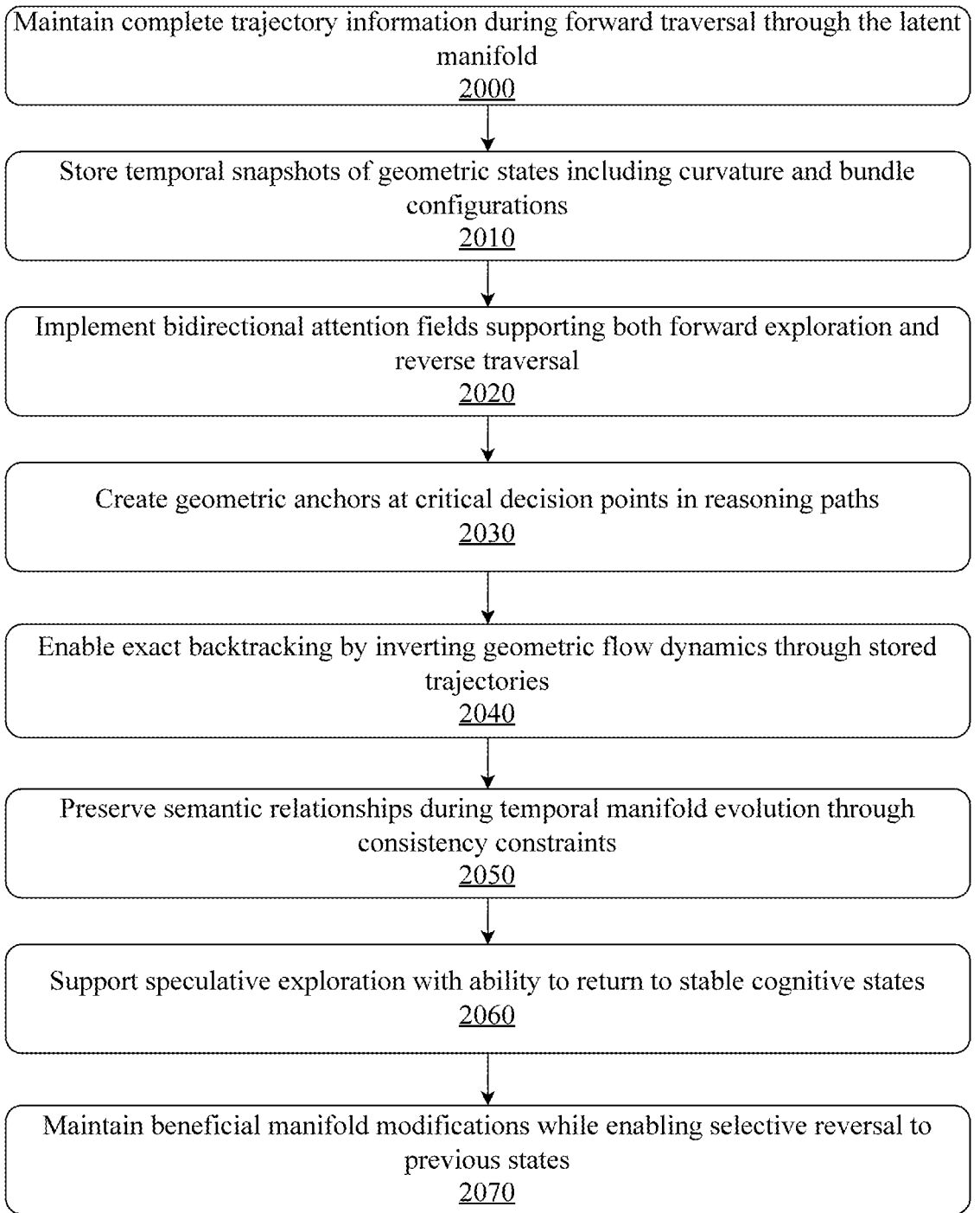
FIG. 20 is a flow diagram illustrating an exemplary method for implementing reversible navigation within dynamic latent manifolds.

FIG. 20 is a flow diagram illustrating an exemplary method for implementing reversible navigation within dynamic latent manifolds. In a first step 2000, maintain complete trajectory information during forward traversal through the latent manifold. This maintenance process creates a comprehensive record of the cognitive path taken, capturing not just the sequence of positions visited but the full geometric context of the traversal. The trajectory information includes but is not limited to the precise coordinates of each point along the path, the velocity and acceleration of attention movement, local curvature values and metric tensor components at each position, and the compression pressure and goal potential fields encountered. This detailed recording enables faithful reconstruction of the cognitive journey, preserving information about why specific paths were chosen, how attention flowed through different regions, what semantic relationships were activated, and which thought bundles were engaged during reasoning. The maintenance mechanism operates continuously during active cognition, creating a rich trace that serves as both a record of reasoning and a foundation for potential backtracking.

In a step 2010, store temporal snapshots of geometric states including curvature and bundle configurations. These snapshots capture the complete state of relevant manifold regions at specific time points, creating a temporal sequence that documents how the cognitive landscape evolves during reasoning. Each snapshot preserves local and global curvature patterns reflecting semantic density and relationships, thought bundle boundaries and internal structures, metric tensor values defining distance relationships, active attention fields and their flow patterns, and compression pressure distributions across the manifold. The storage mechanism implements efficient compression techniques that preserve essential geometric information while managing memory requirements through identification of state changes requiring full snapshots, incremental storage of modifications between snapshots, and hierarchical representation enabling multi-resolution retrieval. These temporal snapshots enable not just backtracking through a static landscape but navigation to previous manifold configurations even as the underlying structure continues to evolve.

In a step 2020, implement bidirectional attention fields supporting both forward exploration and reverse traversal. The attention vector field is enhanced to include reverse flow components that enable backward navigation along previously traversed paths. This bidirectional implementation maintains dual flow potentials at each manifold point, with forward components guided by goal attraction and exploration drives, and reverse components following stored trajectory gradients back toward previous positions. The field dynamics incorporate memory of past traversals, creating preferential flow channels along well-traveled paths while maintaining flexibility for deviation. The bidirectional nature enables smooth transitions between forward and backward navigation, supporting cognitive operations such as retracing steps to reconsider alternatives, returning to decision points for different choices, and comparing forward predictions with backward reconstructions. The implementation ensures that reverse traversal respects the evolved manifold geometry rather than simply replaying stored coordinates.

In a step 2030, create geometric anchors at various decision points in reasoning paths. These anchors mark significant locations in the cognitive journey where important choices were made, multiple paths diverged, or key insights emerged. Anchor creation identifies points through analysis of trajectory bifurcations indicating choice points, local extrema in goal potential suggesting achievement milestones, curvature anomalies marking conceptual transitions, and high compression pressure regions requiring significant cognitive effort. Each anchor stores comprehensive local state information including the complete geometric configuration, available path options and their initial directions, decision criteria and goal states active at that point, and semantic context explaining the significance of the location. These anchors serve as cognitive waypoints that enable efficient navigation to important reasoning states without requiring full trajectory replay, supporting operations like returning to reconsider major decisions or comparing outcomes from different choice branches.

In a step 2040, enable exact backtracking by inverting geometric flow dynamics through stored trajectories. This inversion process reverses the mathematical operations that generated forward motion, creating precise backward paths through the evolved manifold. The flow inversion accounts for the original geodesic equations by reversing time parameters, the influence of compression pressure and goal fields by negating their gradients, the effects of manifold evolution by applying inverse transformations, and the accumulation of path-dependent modifications. The backtracking mechanism enables exact retracing even through complex geometric regions including high-curvature zones where forward paths strongly converged, bifurcation regions where choices were made, and dynamically evolved areas where the manifold has changed. This precise reversal capability ensures that cognitive exploration can be truly reversible, enabling confident speculation knowing that return to stable states is guaranteed.

In a step 2050, preserve semantic relationships during temporal manifold evolution through consistency constraints. As the manifold evolves through use and learning, this preservation mechanism ensures that semantic meanings remain stable enough to support meaningful backtracking. Consistency constraints maintain topological relationships between thought bundles, relative distance orderings between related concepts, essential curvature patterns that define semantic regions, and geodesic connections between ideas. The preservation process implements sophisticated transformation tracking that records how manifold regions evolve over time, applies compensating adjustments during backtracking to account for evolution, and maintains semantic anchors that provide stable reference points. This enables navigation to previous cognitive states even when the underlying geometry has been modified by intervening learning and adaptation, ensuring that backtracking arrives at semantically equivalent rather than merely geometrically identical states.

In a step 2060, support speculative exploration with ability to return to stable cognitive states. This capability enables bold cognitive ventures into uncertain or potentially unstable regions while maintaining safety through guaranteed return paths. Speculative exploration is facilitated through creation of temporary manifold branches for experimental reasoning, suspension of normal stability constraints during exploration, monitoring of cognitive health metrics during speculation, and automatic triggering of return navigation if instability is detected. The return mechanism provides rapid retreat to the nearest stable anchor point, gradual unwinding of speculative modifications, and preservation of valuable discoveries while discarding unstable structures. This creates a cognitive sandbox where novel connections can be explored, unconventional reasoning paths can be tested, and creative insights can emerge, all while maintaining the security of proven stable states.

In a step 2070, maintain beneficial manifold modifications while enabling selective reversal to previous states. This final step implements intelligent preservation of positive changes discovered during exploration while still enabling return to earlier configurations. The selective reversal mechanism analyzes modifications made during forward traversal to identify beneficial changes such as new connections that improve reasoning efficiency, compressed representations that reduce cognitive load, discovered shortcuts between previously distant concepts, and refined curvature patterns that better capture semantic relationships. During reversal operations, the method preserves these beneficial modifications by maintaining them as overlays on reversed base geometry, creating parallel path options that include improvements, and marking enhanced regions for integration into the stable manifold. This selective approach ensures that the cognitive system continuously improves through exploration while maintaining the ability to recover from unsuccessful ventures, creating an optimal balance between stability and adaptability in the evolving geometric substrate of thought.

Hardware Architecture

Figure 21:
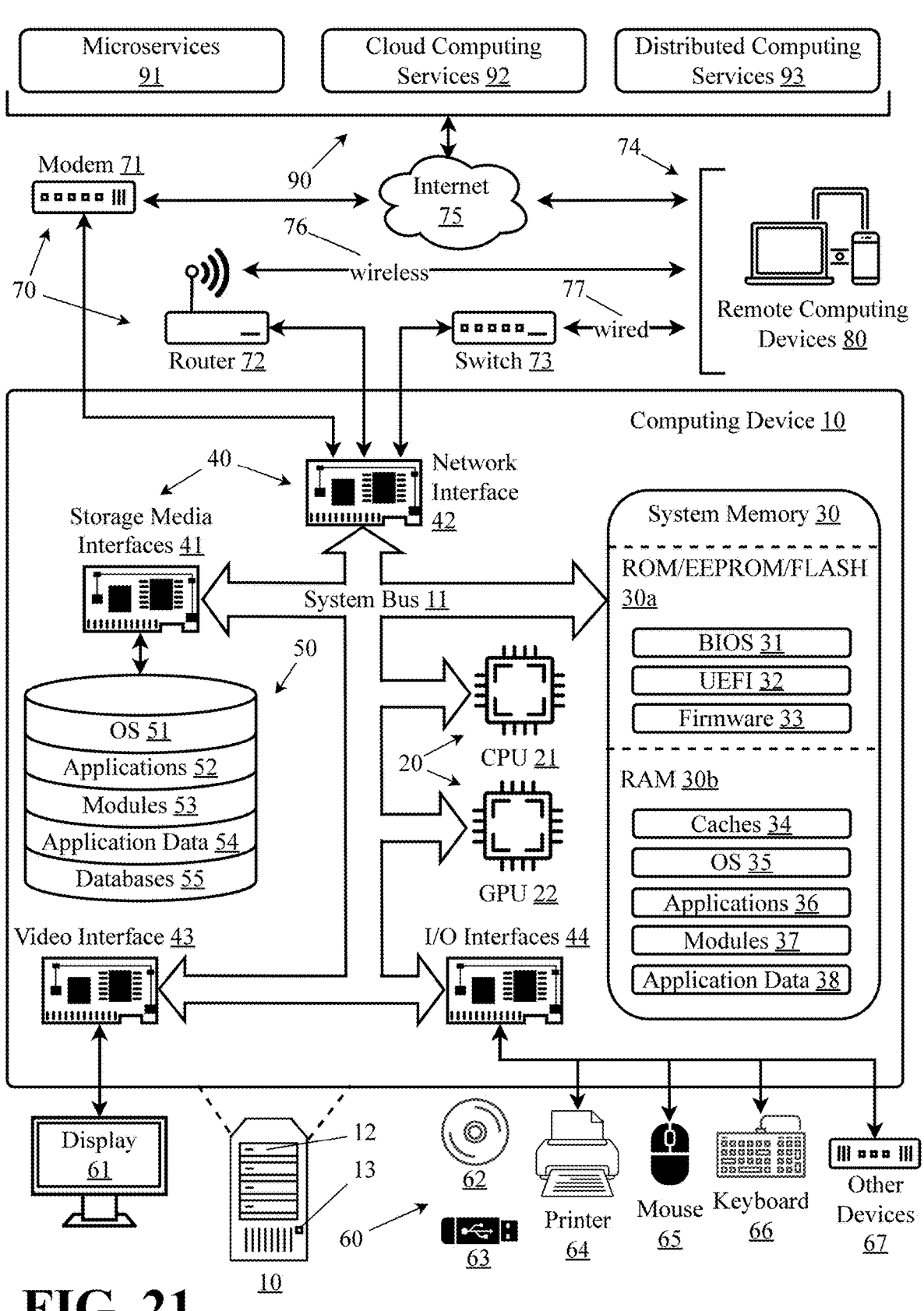
FIG. 21 illustrates an exemplary computing environment on which an embodiment described herein may be implemented.

FIG. 21 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random-access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44. Network interface 42 may support various communication standards and protocols, such as Ethernet and Small Form-Factor Pluggable (SFP). Ethernet is a widely used wired networking technology that enables local area network (LAN) communication. Ethernet interfaces typically use RJ45 connectors and support data rates ranging from 10 Mbps to 100 Gbps, with common speeds being 100 Mbps, 1 Gbps, 10 Gbps, 25 Gbps, 40 Gbps, and 100 Gbps. Ethernet is known for its reliability, low latency, and cost-effectiveness, making it a popular choice for home, office, and data center networks. SFP is a compact, hot-pluggable transceiver used for both telecommunication and data communications applications. SFP interfaces provide a modular and flexible solution for connecting network devices, such as switches and routers, to fiber optic or copper networking cables. SFP transceivers support various data rates, ranging from 100 Mbps to 100 Gbps, and can be easily replaced or upgraded without the need to replace the entire network interface card. This modularity allows for network scalability and adaptability to different network requirements and fiber types, such as single-mode or multi-mode fiber.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may be implemented using various technologies, including hard disk drives (HDDs) and solid-state drives (SSDs). HDDs use spinning magnetic platters and read/write heads to store and retrieve data, while SSDs use NAND flash memory. SSDs offer faster read/write speeds, lower latency, and better durability due to the lack of moving parts, while HDDs typically provide higher storage capacities and lower cost per gigabyte. NAND flash memory comes in different types, such as Single-Level Cell (SLC), Multi-Level Cell (MLC), Triple-Level Cell (TLC), and Quad-Level Cell (QLC), each with trade-offs between performance, endurance, and cost. Storage devices connect to the computing device 10 through various interfaces, such as SATA, NVMe, and PCIe. SATA is the traditional interface for HDDs and SATA SSDs, while NVMe (Non-Volatile Memory Express) is a newer, high-performance protocol designed for SSDs connected via PCIe. PCIe SSDs offer the highest performance due to the direct connection to the PCIe bus, bypassing the limitations of the SATA interface. Other storage form factors include M.2 SSDs, which are compact storage devices that connect directly to the motherboard using the M.2 slot, supporting both SATA and NVMe interfaces. Additionally, technologies like Intel Optane memory combine 3D XPoint technology with NAND flash to provide high-performance storage and caching solutions. Non-volatile data storage devices 50 may be non-removable from computing device 10, as in the case of internal hard drives, removable from computing device 10, as in the case of external USB hard drives, or a combination thereof. However, computing devices will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, knowledge graph databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90. Also, certain processing subtasks may be sent to a microservice 91 for processing with the result being transmitted to computing device 10 for incorporation into a larger processing task. Infrastructure as Code (IaaC) tools like Terraform can be used to manage and provision computing resources across multiple cloud providers or hyperscalers.

This allows for workload balancing based on factors such as cost, performance, and availability. For example, Terraform can be used to automatically provision and scale resources on AWS spot instances during periods of high demand, such as for surge rendering tasks, to take advantage of lower costs while maintaining the required performance levels. In the context of rendering, tools like Blender can be used for object rendering of specific elements, such as a car, bike, or house. These elements can be approximated and roughed in using techniques like bounding box approximation or low-poly modeling to reduce the computational resources required for initial rendering passes. The rendered elements can then be integrated into the larger scene or environment as needed, with the option to replace the approximated elements with higher-fidelity models as the rendering process progresses.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like containerd and container orchestration systems like Kubernetes, is a common approach for deploying and managing applications. Containers are created from images, which are lightweight, standalone, and executable packages that include application code, libraries, dependencies, and runtime. Images are often built from a containerfile or similar, which contains instructions for assembling the image. Containerfiles are configuration files that specify how to build a container image. Systems like Kubernetes natively support containerd as a container runtime. They include commands for installing dependencies, copying files, setting environment variables, and defining runtime configurations. Container images can be stored in repositories, which can be public or private. Organizations often set up private registries for security and version control using tools such as Harbor, JFrog Artifactory and Bintray, GitLab Container Registry, or other container registries. Containers can communicate with each other and the external world through networking. Container provides a default network namespace, but can be used with custom network plugins. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerized resources are used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Federated distributed computing services 93 provide large-scale processing using multiple interconnected computers or nodes to solve computational problems or perform tasks collectively. In federated distributed computing, the processing and storage capabilities of multiple machines are leveraged to work together as a unified system, even when different tiers or tessellations may have limited or even no visibility into the resources and processing layer up or downstream. Federated distributed computing services are designed to address problems that cannot be efficiently solved by a single computer or that require large-scale computational power and require dynamism and workload distribution for economic, security or privacy reasons not well supported by canonical distributed computing resources; e.g. most commonly cloud-based computing applications, resources or analytics. Federated DCG coordinated variants of these services enable superior decentralization and further enhance parallel processing, fault tolerance, and scalability by distributing tasks across multiple tiers or tessellations while enabling computing process dependency calculation with varying degrees of visibility, assurance and privacy or security based on constituent computing system, network, workload and user or provider needs and preferences as well as practical legal and regulatory concerns to include but not limited to data localization, national data transfer restrictions, privacy and consumer protections, wiretap/telecommunications monitoring requirements, encryption and data routing and intermediate processing restrictions.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A computer system comprising a hardware memory, wherein the computer system is configured to execute software instructions stored on nontransitory machine-readable storage media that:

maintain a latent manifold as a geometric substrate for cognitive operations, wherein the latent manifold evolves through use and wherein local curvature reflects semantic density;

implement a distributed thought cache comprising a local thought cache that stores instance-specific thought trajectories and a shared cache space containing generalized thoughts suitable for cross-instance sharing;

encode inputs into latent query trajectories within the manifold, wherein the trajectories capture semantic relationships through geometric properties including geodesic distance and curvature patterns;

determine whether query trajectories intersect cached memory basins within defined geodesic similarity thresholds, wherein memory basins represent regions of high local curvature serving as attractors for memory reentry;

upon cache hits, retrieve nearest thought bundles and reinstate corresponding thought trajectories adapted to current query context through geometric transformations;

upon cache misses, invoke generalization models to synthesize compressed latent thoughts designed for caching and reuse, wherein the compressed thoughts capture abstract reasoning patterns;

synchronize cached thoughts across distributed instances through federated interfaces that transmit geometrically compressed representations while maintaining semantic relationships;

continuously monitor activation energy of cached thoughts based on access frequency and traversal patterns, wherein thoughts with energy below decay thresholds undergo consolidation or removal; and update the latent manifold's local curvature to reflect cache modifications, wherein frequently accessed regions develop deeper attractor basins facilitating future retrieval.

2. The computer system of claim 1, wherein the software instructions further:

compute compression pressure fields derived from local curvature of the latent manifold, wherein regions of high semantic density exhibit higher compression pressure that influences path computation.

3. The computer system of claim 1, wherein the software instructions further:

execute autonomous reorganization of the latent manifold during idle periods, including perturbation of existing structures, synthesis of new connections between disparate regions, and removal of unused or redundant structures.

4. The computer system of claim 1, wherein the software instructions further:

maintain a plurality of bidirectional attention fields within the latent manifold that support both forward exploration toward goals and reverse traversal along previously computed paths, enabling backtracking and path revision.

5. The computer system of claim 1, wherein the software instructions further:

establish a plurality of goal potential fields that create attractive forces within the latent manifold, guiding path computation toward semantically relevant regions for achieving specific objectives.

6. The computer system of claim 1, wherein the software instructions further:

implement hierarchical organization with multiple nested latent manifolds operating at different levels of abstraction, wherein paths can traverse between abstraction levels through geometric bridges.

7. A method for a persistent cognitive computation through geometric representation of thought in a dynamic latent manifold, comprising the steps of:

maintaining a latent manifold as a geometric substrate for cognitive operations, wherein the latent manifold evolves through use and wherein local curvature reflects semantic density;

implementing a distributed thought cache comprising a local thought cache that stores instance-specific thought trajectories and a shared cache space containing generalized thoughts suitable for cross-instance sharing;

encoding inputs into latent query trajectories within the manifold, wherein the trajectories capture semantic relationships through geometric properties including geodesic distance and curvature patterns;

determining whether query trajectories intersect cached memory basins within defined geodesic similarity thresholds, wherein memory basins represent regions of high local curvature serving as attractors for memory reentry;

upon cache hits, retrieving nearest thought bundles and reinstate corresponding thought trajectories adapted to current query context through geometric transformations;

upon cache misses, invoking generalization models to synthesize compressed latent thoughts designed for caching and reuse, wherein the compressed thoughts capture abstract reasoning patterns;

synchronizing cached thoughts across distributed instances through federated interfaces that transmit geometrically compressed representations while maintaining semantic relationships;

continuously monitoring activation energy of cached thoughts based on access frequency and traversal patterns, wherein thoughts with energy below decay thresholds undergo consolidation or removal; and updating the latent manifold's local curvature to reflect cache modifications, wherein frequently accessed regions develop deeper attractor basins facilitating future retrieval.

8. The method of claim 7, further comprising the step:

computing compression pressure fields derived from local curvature of the latent manifold, wherein regions of high semantic density exhibit higher compression pressure that influences path computation.

9. The method of 7, further comprising the step:

executing autonomous reorganization of the latent manifold during idle periods, including perturbation of existing structures, synthesis of new connections between disparate regions, and removal of unused or redundant structures.

10. The method of claim 7, further comprising the step:

maintaining a plurality of bidirectional attention fields within the latent manifold that support both forward exploration toward goals and reverse traversal along previously computed paths, enabling backtracking and path revision.

11. The method of claim 7, further comprising the step:

establishing a plurality of goal potential fields that create attractive forces within the latent manifold, guiding path computation toward semantically relevant regions for achieving specific objectives.

12. The method of claim 7, further comprising the step:

implementing hierarchical organization with multiple nested latent manifolds operating at different levels of abstraction, wherein paths can traverse between abstraction levels through geometric.

* * * * *